(12) United States Patent
Kirac et al.

(10) Patent No.: US 8,868,797 B1
(45) Date of Patent: Oct. 21, 2014

(54) TECHNIQUES FOR AUTOMATED DISCOVERY OF STORAGE DEVICES AND THEIR PERFORMANCE CHARACTERISTICS

(75) Inventors: Ahmet Kirac, Guttenberg, NJ (US); Adnan Sahin, Needham, MA (US); Amnon Naamad, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 13/435,462

(22) Filed: Mar. 30, 2012

(51) Int. Cl. *G06F 3/00* (2006.01)

(52) U.S. Cl. USPC .......................................................... 710/15

(58) Field of Classification Search None
See application file for complete search history.

(56) References Cited

U.S. PATENT DOCUMENTS

| | | | |
|---|---|---|---|
| 5,528,516 A | 6/1996 | Yemini et al. | |
| 5,661,668 A | 8/1997 | Yemini et al. | |
| 6,249,755 B1 | 6/2001 | Yemini et al. | |
| 6,868,367 B2 | 3/2005 | Yemini et al. | |
| 7,184,935 B1 | 2/2007 | Cohen et al. | |
| 7,293,287 B2 | 11/2007 | Fischman et al. | |
| 7,441,023 B2 | 10/2008 | Benjamin et al. | |
| 7,502,971 B2 | 3/2009 | Cohen et al. | |
| 7,546,609 B2 | 6/2009 | Florissi et al. | |
| 7,640,460 B2 | 12/2009 | Bahl et al. | |
| 7,646,731 B2 | 1/2010 | Ballantyne et al. | |
| 7,680,753 B2 | 3/2010 | Sudhindra et al. | |
| 7,720,003 B2 | 5/2010 | Benjamin et al. | |
| 7,761,527 B2 | 7/2010 | Ferreira et al. | |
| 7,783,778 B2 | 8/2010 | Benjamin | |
| 7,930,158 B2 | 4/2011 | Yemini et al. | |
| 7,930,159 B1 | 4/2011 | Florissi et al. | |
| 7,949,637 B1 | 5/2011 | Burke | |
| 7,970,928 B2 | 6/2011 | Sridharan et al. | |
| 8,015,139 B2 | 9/2011 | Bahl et al. | |
| 8,031,634 B1 | 10/2011 | Artzi et al. | |
| 8,032,557 B1 | 10/2011 | Vijendra et al. | |
| 8,307,014 B2 * | 11/2012 | Mehrotra et al. | 707/803 |
| 8,433,848 B1 | 4/2013 | Naamad et al. | |
| 8,566,546 B1 | 10/2013 | Marshak et al. | |
| 8,566,553 B1 | 10/2013 | Marshak et al. | |
| 8,583,838 B1 | 11/2013 | Marshak et al. | |
| 2009/0070541 A1 | 3/2009 | Yochai et al. | |

OTHER PUBLICATIONS

U.S. Appl. No. 12/924,361, filed Sep. 24, 2010, Marshak et al.
U.S. Appl. No. 12/803,570, filed Jun. 30, 2010, Marshak et al.
U.S. Appl. No. 13/135,261, filed Jun. 30, 2011, Sahin et al.

(Continued)

*Primary Examiner* — Henry Tsai
*Assistant Examiner* — Juanito Borromeo
(74) *Attorney, Agent, or Firm* — Muirhead and Satrunelli, LLC

(57) ABSTRACT

Described are techniques for discovering physical device dependencies. A set of baseline response times for logical devices of a data storage system are received. A first of the logical devices is selected and a remaining set of logical devices includes each of the logical devices other than the first logical device. Data operations are issued to the first logical device at a first rate while also issuing data operations to the remaining logical devices. A set of observed response times for the remaining logical devices is received. For each remaining logical device, it is determined whether the logical device has a corresponding observed response time that is significantly more the logical device's baseline response time. A first logical device set is determined having physical device dependencies that includes the first logical device set and each remaining logical device having an observed response time significantly greater than it's baseline response time.

20 Claims, 45 Drawing Sheets

(56) References Cited

OTHER PUBLICATIONS

U.S. Appl. No. 13/135,265, filed Jun. 30, 2011, Sahin et al.
U.S. Appl. No. 13/135,306, filed Jun. 30, 2011, Marshak et al.
U.S. Appl. No. 13/331,010, filed Dec. 20, 2011, Dolan et al.
U.S. Appl. No. 13/429,622, filed Mar. 26, 2012, Dolan et al.
U.S. Appl. No. 13/435,415, filed Mar. 30, 2012, Marshak et al.
U.S. Appl. No. 13/429,669, filed Mar. 26, 2012, Marshak et al.
EMC Smarts IP Availability Manager *Technology for IP Network Management, including Network-Attached Storage*, Nov. 2005, EMC Corporation.

* cited by examiner

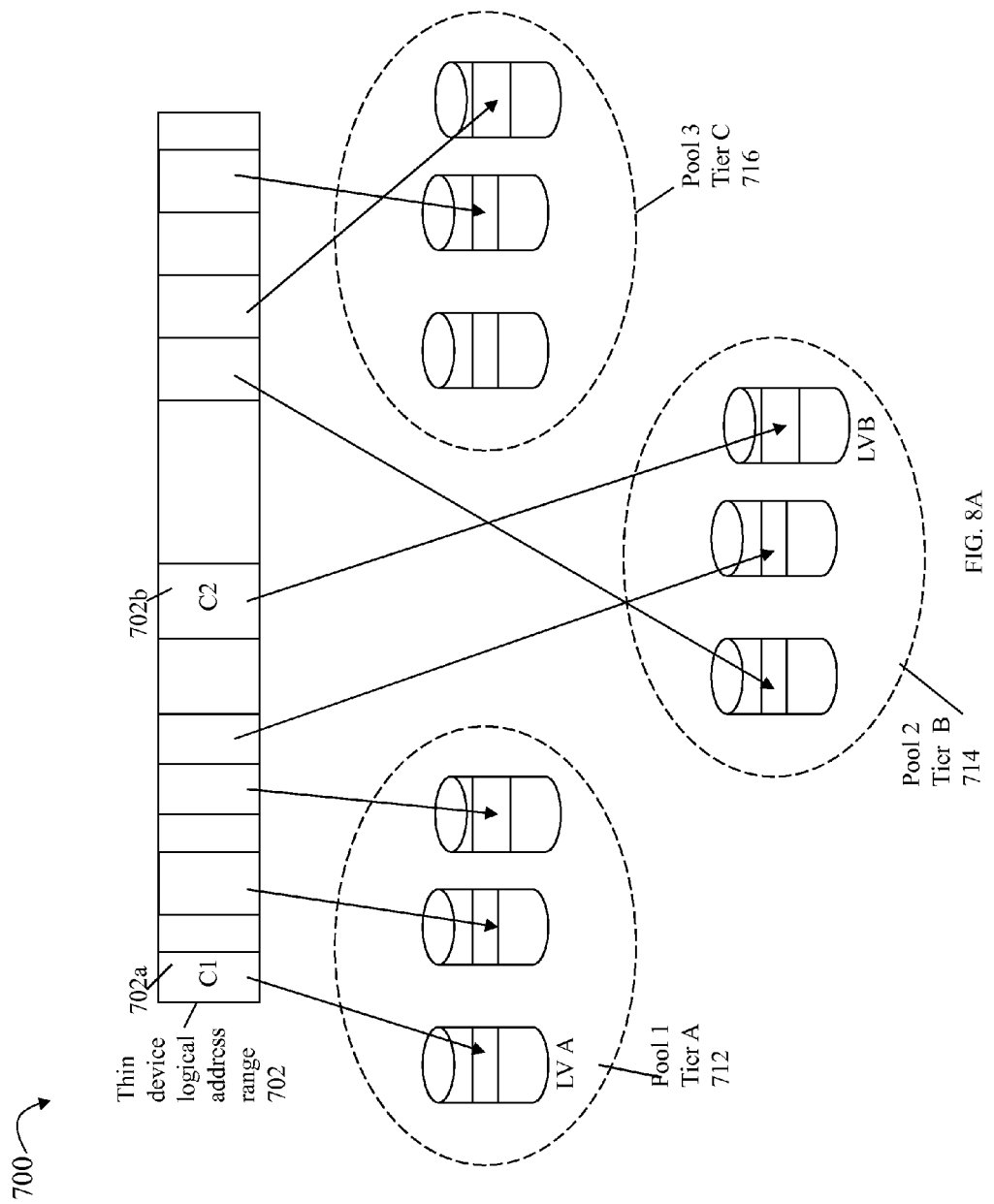

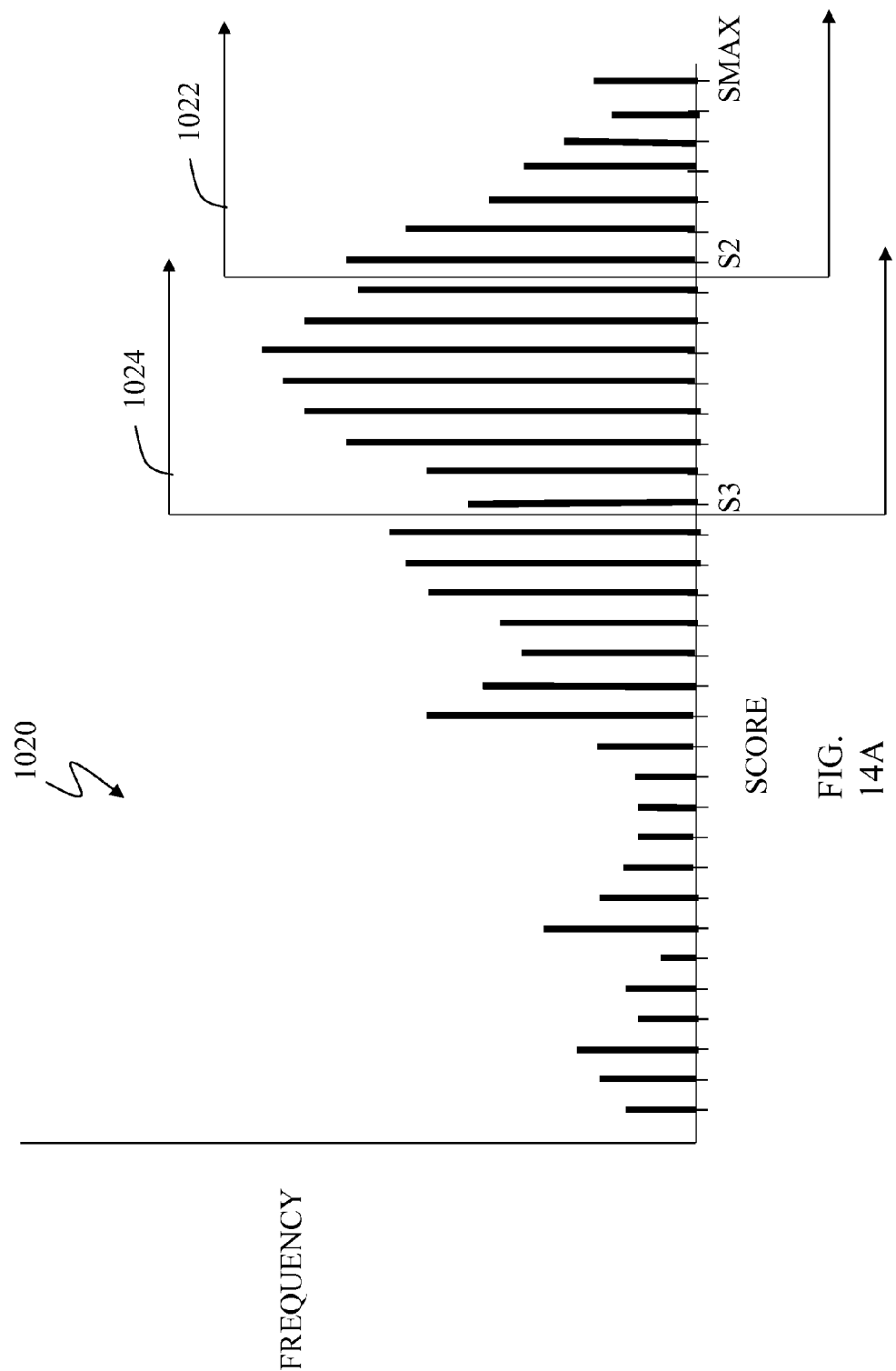

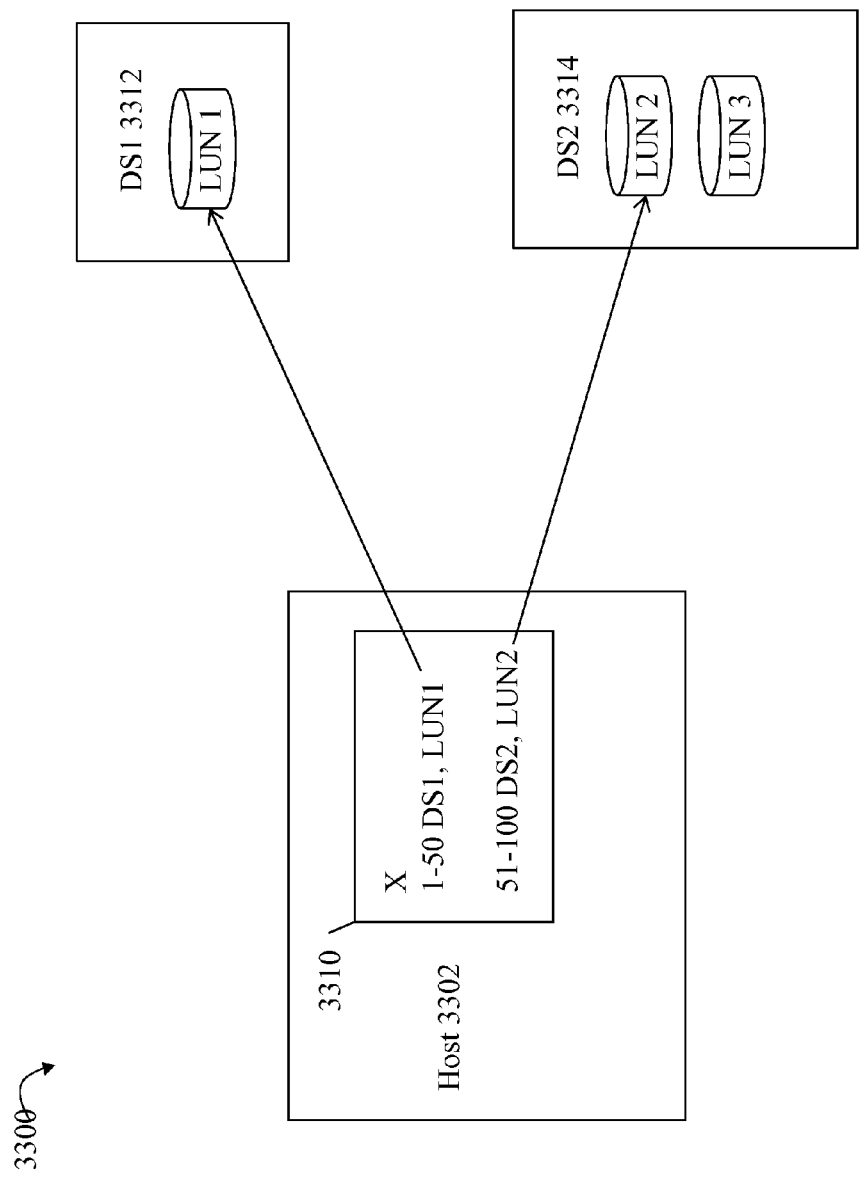

TECHNIQUES FOR AUTOMATED DISCOVERY OF STORAGE DEVICES AND THEIR PERFORMANCE CHARACTERISTICS

BACKGROUND

1. Technical Field

This application generally relates to data storage, and more particularly to techniques used in connection with data storage configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method for discovering physical device dependencies between logical devices comprising: receiving, for a plurality of logical devices of a data storage system, a set of baseline response times obtained when issuing data operations to the plurality of logical devices, each of said plurality of logical devices having storage provisioned on one or more physical devices; selecting a first of the plurality of logical devices, wherein a remaining set of logical devices includes each of the plurality of logical devices other than the first logical device; issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device; receiving a set of observed response times for the remaining set of logical devices; determining, for each logical device of the remaining set of logical devices, whether said each logical device has a corresponding one of the observed response times of the set that is significantly more than a corresponding one of the baseline response times for said each logical device; and determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device. Each logical device of the first logical device set may have at least a portion of data stored on a physical device of a same physical device group of one or more physical devices. Each logical device of the first logical device set other than the first logical device may have at least some data stored on a same physical device as at least some data of the first logical device. The set of observed response times may be obtained using data collected while performing said issuing data operations to the first logical device and while also performing said issuing data operations to each logical device in the remaining set. The step of issuing data operations to each logical device of the remaining set may issue data operations to said each logical device of the remaining set at about a same rate as when a corresponding one of the baseline response times is obtained for said each logical device. The set of observed response times may be an adjusted set of observed response times determined by adjusting an original set of observed response times using the set of baseline response times. The first rate may be higher than a rate at which data operations are issued to the first logical device in obtaining the set of baseline response times. The set of baseline response times may be obtained by maintaining a same average queue depth for each of the plurality of logical devices. The average queue depth for said each logical device may represent an average number of I/O operations outstanding for said each logical device. The average queue depth maintained for each of the plurality of logical devices in obtaining the set of baseline response times may be a first average queue depth and said issuing data operations to each logical device of the remaining set may be at about a same rate as when a corresponding one of the baseline response times is obtained for said each logical device. The first rate may be determined in accordance with maintaining a second average queue depth for the first logical device, the second average queue depth may be larger than said first average queue depth. The first average queue depth may be equal to or less than 1 and said second average queue depth may be 32. Each logical device of the first logical device set may have a corresponding observed response time that is greater than a corresponding one of the baseline response times for said each logical device by a threshold amount determined in accordance with a threshold factor and the corresponding one baseline response time for said each logical device. The threshold factor may be any of one and a half or twice the corresponding one baseline response time for said each logical device thereby resulting in a varying threshold amount for each of the plurality of logical devices. Each logical device of the first logical device set may have a corresponding observed response time that is greater than a corresponding one of the baseline response times for said each logical device by an amount, said amount being at least the threshold factor multiplied by the corresponding one baseline response time for said each logical device. Logical devices of the first logical device set may have data stored on a first physical device group of one or more physical devices. The method may include determining a set of one or more aggregated response times for said first physical device group using response times for the first logical device set; and classifying said one or more physical devices of the first physical device group as being physical devices of a first of a plurality of storage device tiers, said classifying using information including the set of one or more aggregated response times in comparison to expected response times for physical devices of each of the plurality of storage tiers. The method may be executed on any of a host to determine information about a data storage system, a first data storage system to determine information about the plurality of logical devices included in a second data storage system, and an appliance presenting to a client a set of virtualized storage devices having storage provisioned across a plurality of physical devices on one or more data storage systems. A current set of logical devices may be determined by removing the first logical device set from the plurality of logical devices, and the method may include performing said selecting, said issuing data operations, said receiving, said first determining and said second determining with respect to the current set of logical devices rather than the plurality of logical devices.

In accordance with another aspect of the invention is a computer readable medium comprising code stored thereon for discovering physical device dependencies between logical devices, the computer readable medium comprising code stored thereon for: receiving, for a plurality of logical devices of a data storage system, a set of baseline response times obtained when issuing data operations to the plurality of logical devices, each of said plurality of logical devices having storage provisioned on one or more physical devices; selecting a first of the plurality of logical devices, wherein a remaining set of logical devices includes each of the plurality of logical devices other than the first logical device; issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device; receiving a set of observed response times for the remaining set of logical devices; determining, for each logical device of the remaining set of logical devices, whether said each logical device has a corresponding one of the observed response times of the set that is significantly more than a corresponding one of the baseline response times for said each logical device; and determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device. Each logical device of the first logical device set may have at least a portion of data stored on a physical device of a same physical device group of one or more physical devices.

In accordance with another aspect of the invention is a system comprising: a set of one or more data storage systems; and a first component in communication with the one or more data storage systems, the first component including a computer readable medium comprising code stored thereon for: receiving, for a plurality of logical devices of the one or more data storage systems, a set of baseline response times obtained when issuing data operations to the plurality of logical devices, each of said plurality of logical devices having storage provisioned on one or more physical devices; selecting a first of the plurality of logical devices, wherein a remaining set of logical devices includes each of the plurality of logical devices other than the first logical device; issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device; receiving a set of observed response times for the remaining set of logical devices; determining, for each logical device of the remaining set of logical devices, whether said each logical device has a corresponding one of the observed response times of the set that is significantly more than a corresponding one of the baseline response times for said each logical device; and determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8A and 8B are examples illustrating thin devices and associated structures that may be used in an embodiment in accordance with techniques herein;

FIGS. 14, 14A and 16 illustrate histograms that may be used in threshold selection in accordance with techniques herein;

FIGS. 20, 29A and 29B are examples of embodiments in accordance with techniques herein where the optimizer is included on a host;

DETAILED DESCRIPTION OF EMBODIMENT(S)

Figure 1:
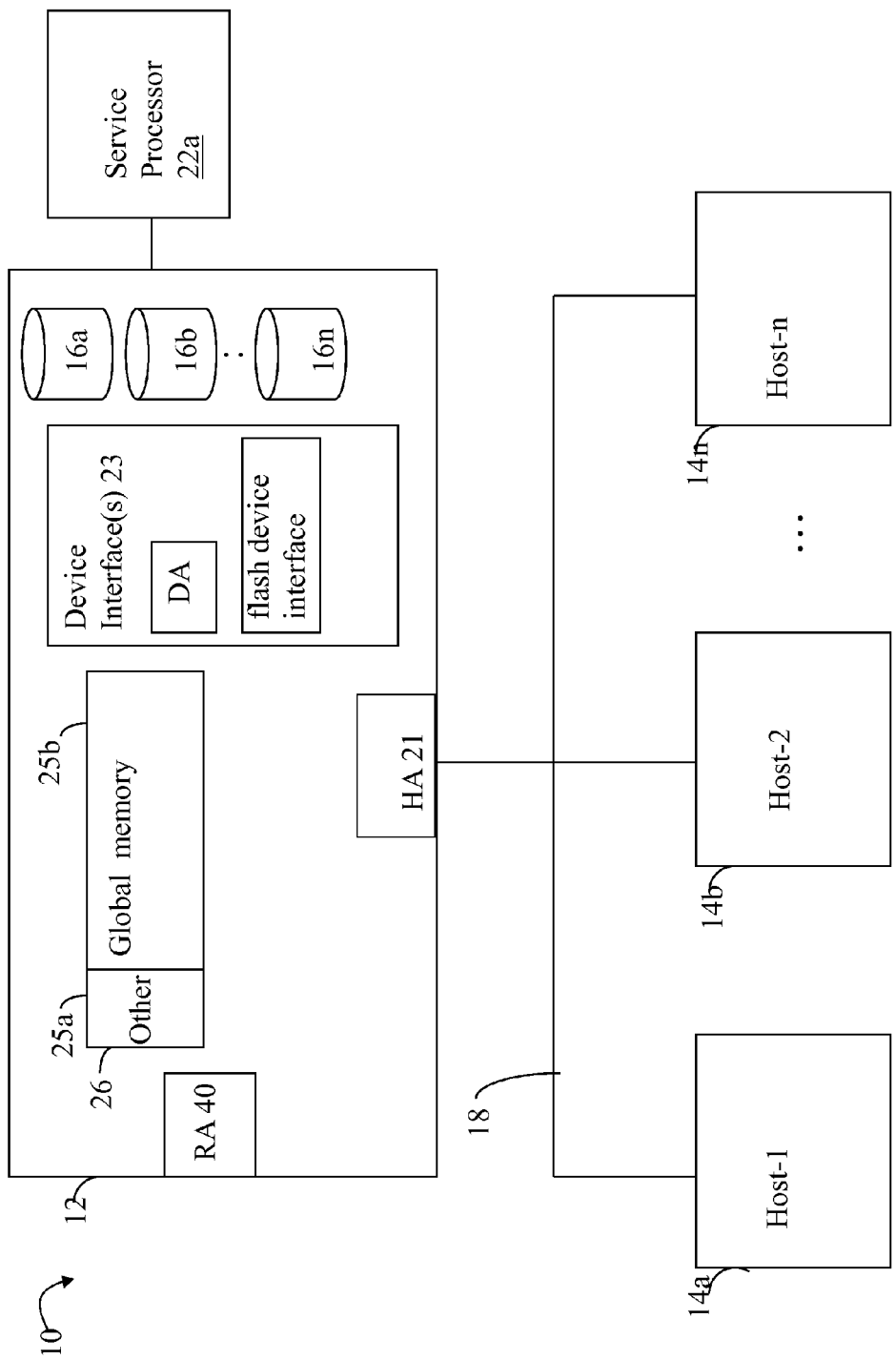
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
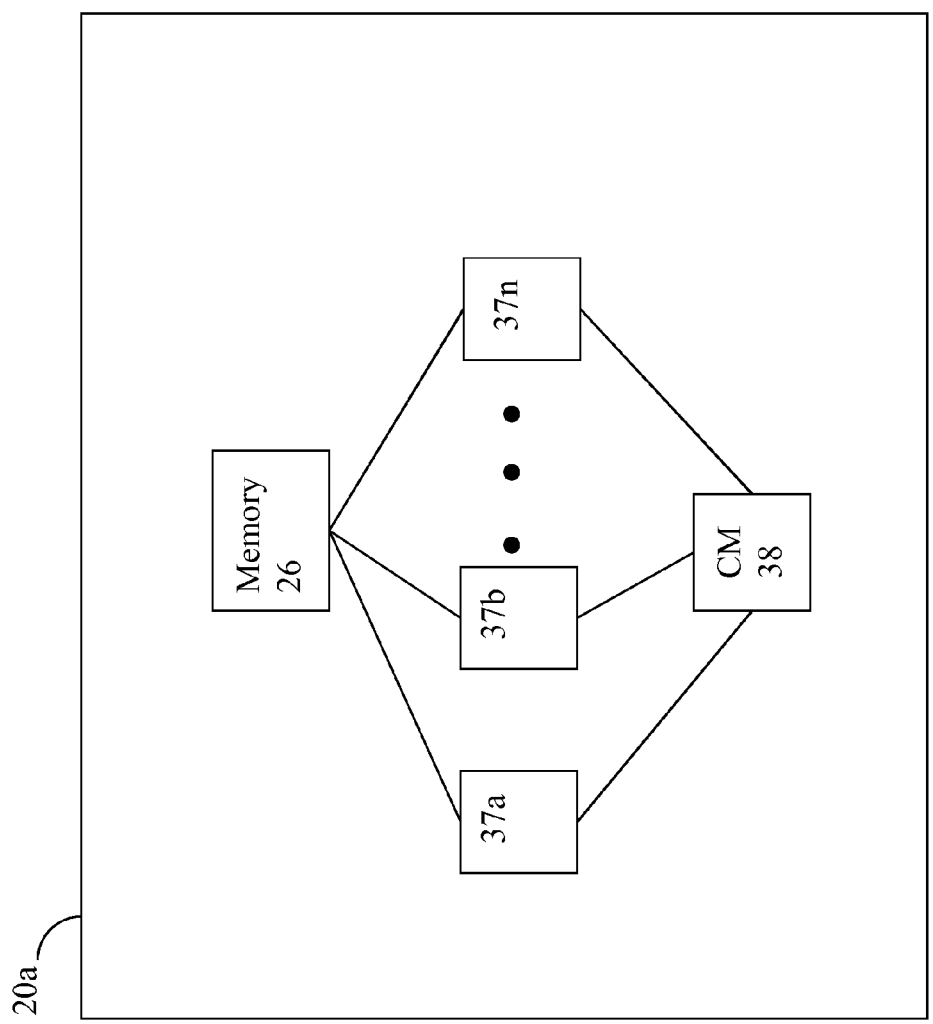
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
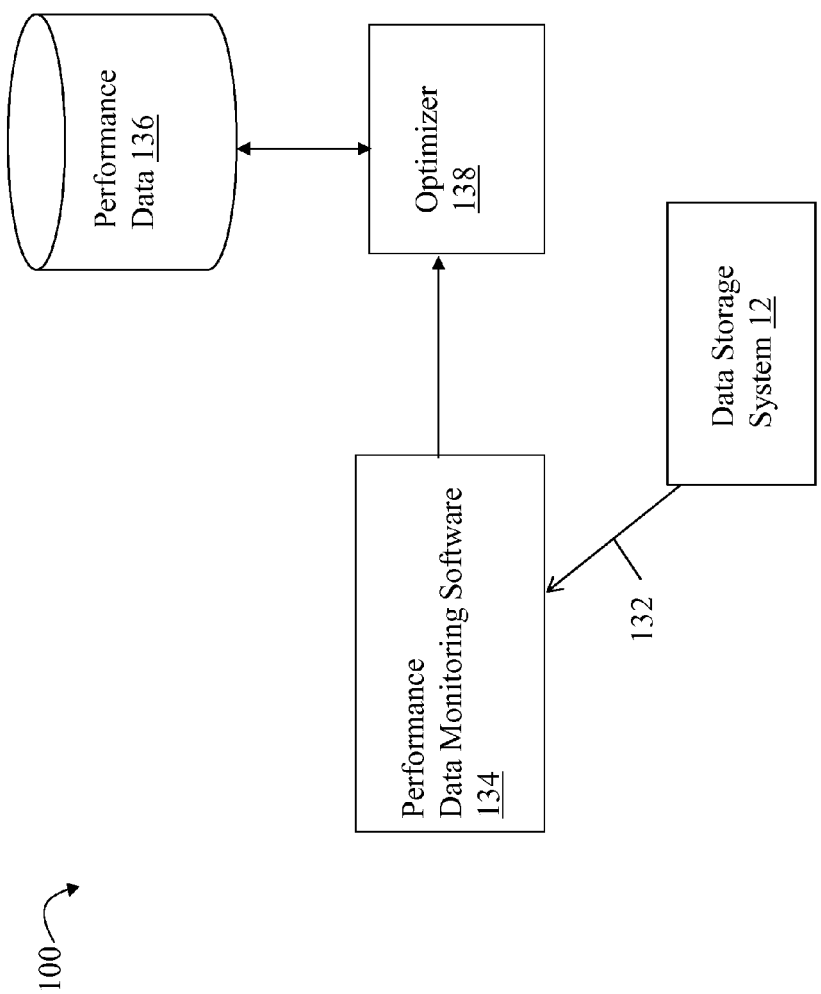
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs) serving as data devices, thin devices (described in more detail elsewhere herein) or other virtually provisioned devices, portions of thin devices, and the like. The workload may also be a measurement or level of "how busy" a device is, for example, in terms of I/O operations (e.g., I/O throughput such as number of I/Os/second, response time (RT), and the like).

The response time for a storage device or volume may be based on a response time associated with the storage device or volume for a period of time. The response time may based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to an LV, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing of the techniques herein set forth in following paragraphs to determine how to allocate or partition physical storage in a multi-tiered environment for use by multiple applications. The optimizer 138 may also perform other processing such as, for example, to determine what particular portions of thin devices to store on physical devices of a particular tier, evaluate when to migrate or move data between physical drives of different tiers, and the like. It should be noted that the optimizer 138 may generally represent one or more components that perform processing as described herein as well as one or more other optimizations and other processing that may be performed in an embodiment.

Described in following paragraphs are techniques that may be performed to determine promotion and demotion thresholds (described below in more detail) used in determining what data portions of thin devices to store on physical devices of a particular tier in a multi-tiered storage environment. Such data portions of a thin device may be automatically placed in a storage tier where the techniques herein have determined the storage tier is best to service that data in order to improve data storage system performance. The data portions may also be automatically relocated or migrated to a different storage tier as the work load and observed performance characteristics for the data portions change over time. In accordance with techniques herein, analysis of performance data for data portions of thin devices may be performed in order to determine whether particular data portions should have their data contents stored on physical devices located in a particular storage tier. The techniques herein may take into account how "busy" the data portions are in combination with defined capacity limits and defined performance limits (e.g., such as I/O throughput or I/Os per unit of time, response time, utilization, and the like) associated with a storage tier in order to evaluate which data to store on drives of the storage tier. The foregoing defined capacity limits and performance limits may be used as criteria to determine promotion and demotion thresholds based on projected or modeled I/O workload of a storage tier. Different sets of performance limits, also referred to as comfort performance zones or performance zones, may be evaluated in combination with capacity limits based on one or more overall performance metrics (e.g., average response time across all storage tiers for one or more storage groups) in order to select the promotion and demotion thresholds for the storage tiers.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy and other criteria. In accordance with techniques herein, an embodiment may determine amounts of the different storage tiers used to store an application's data, and thus the application's storage group, subject to the allocation policy and other criteria. Such criteria may also include one or more performance metrics indicating a workload of the application. For example, an embodiment may determine one or more performance metrics using collected or observed performance data for a plurality of different logical devices, and/or portions thereof, used by the application. Thus, the partitioning of the different storage tiers among multiple applications may also take into account the workload or how "busy" an application is. Such criteria may also include capacity limits specifying how much of each particular storage tier may be used to store data for the application's logical devices. As described in various embodiments herein, the criteria may include one or more performance metrics in combination with capacity limits, performance metrics alone without capacity limits, or capacity limits alone without performance metrics. Of course, as will be appreciated by those of ordinary skill in the art, such criteria may include any of the foregoing in combination with other suitable criteria.

As an example, the techniques herein may be described with reference to a storage environment having three storage tiers—a first tier of only flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
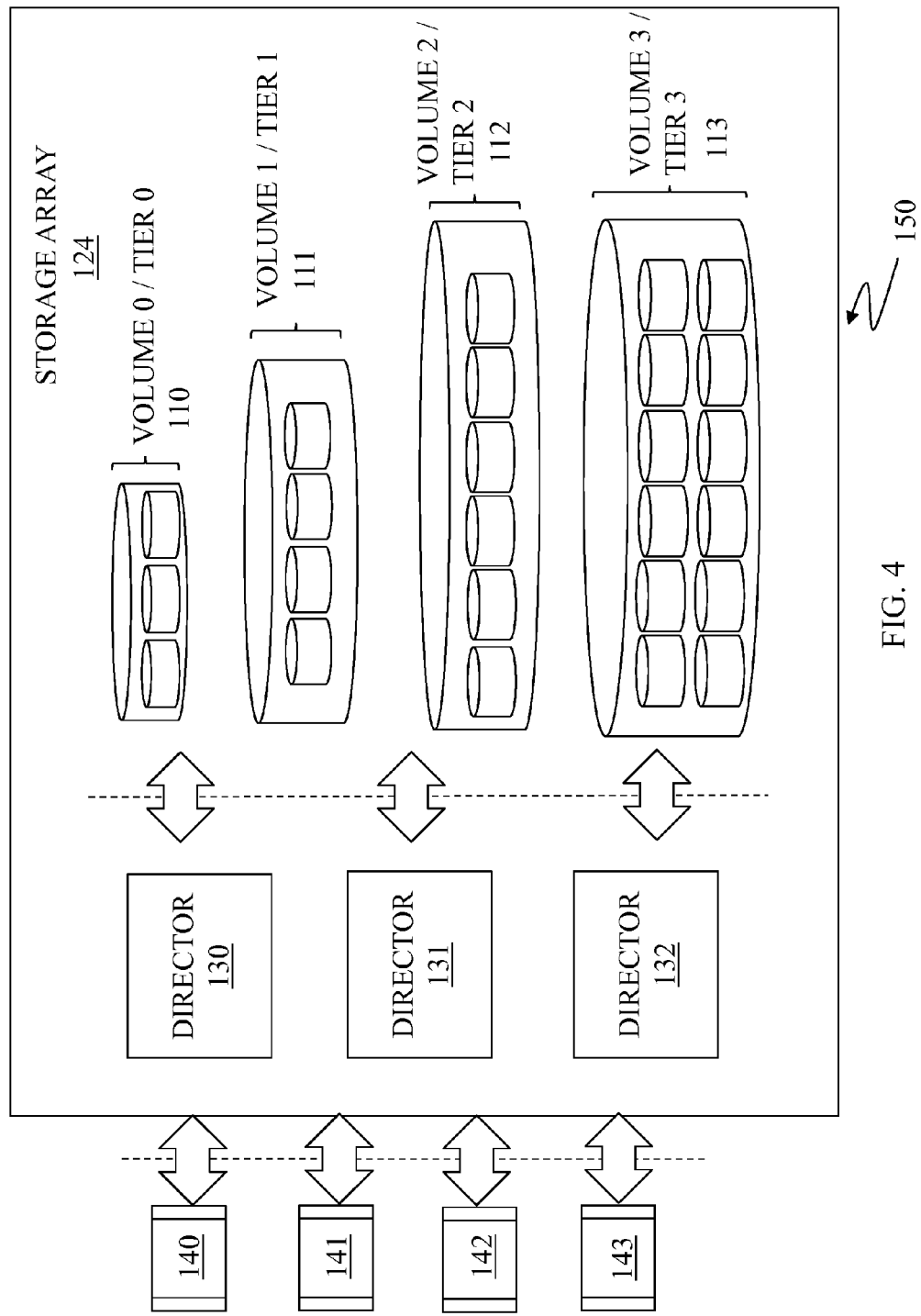
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. The techniques herein may be used to determine amounts or allocations of each storage tier used by each application based on capacity limits in combination with performance limits.

Figure 5A:
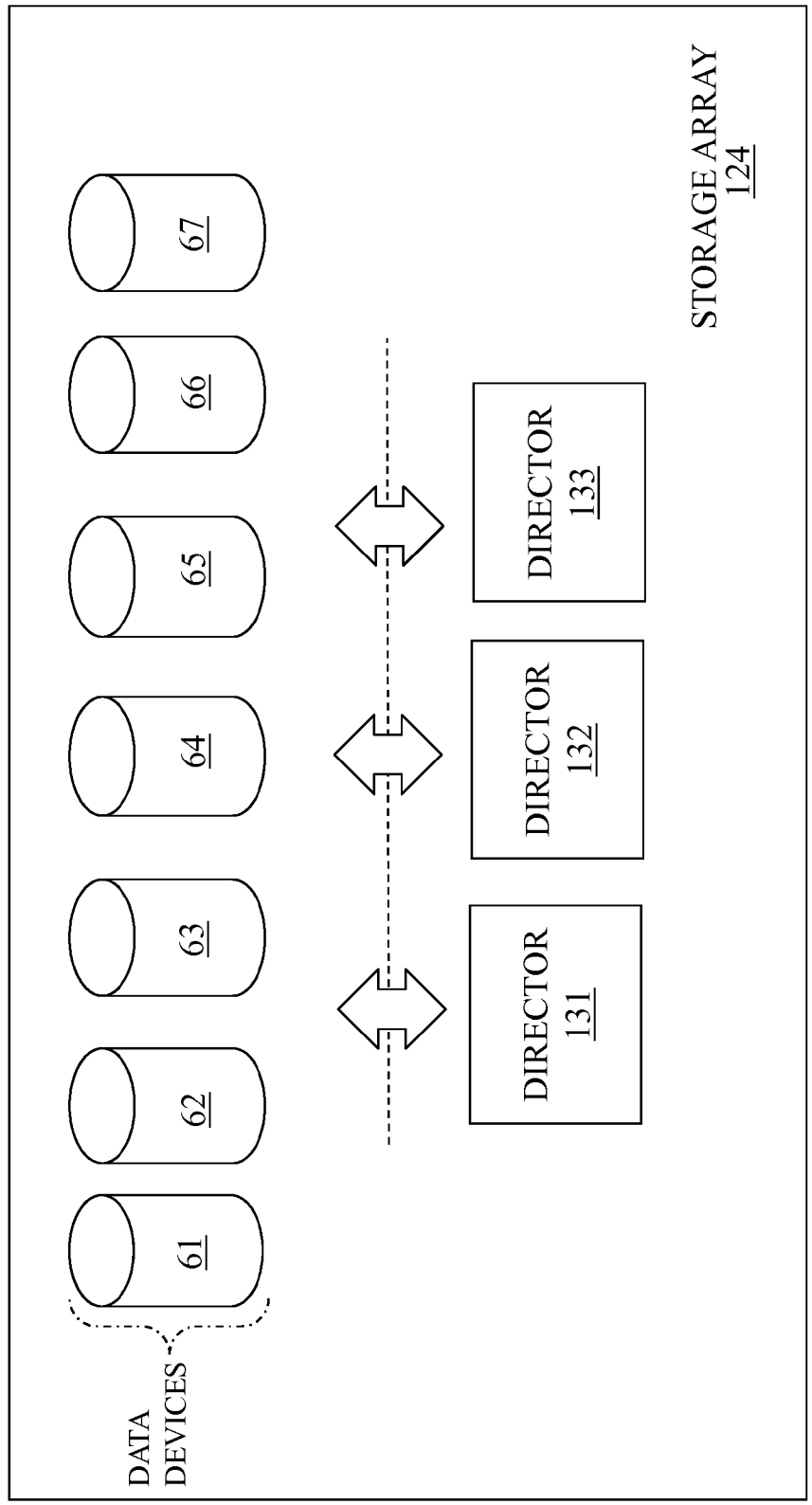

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
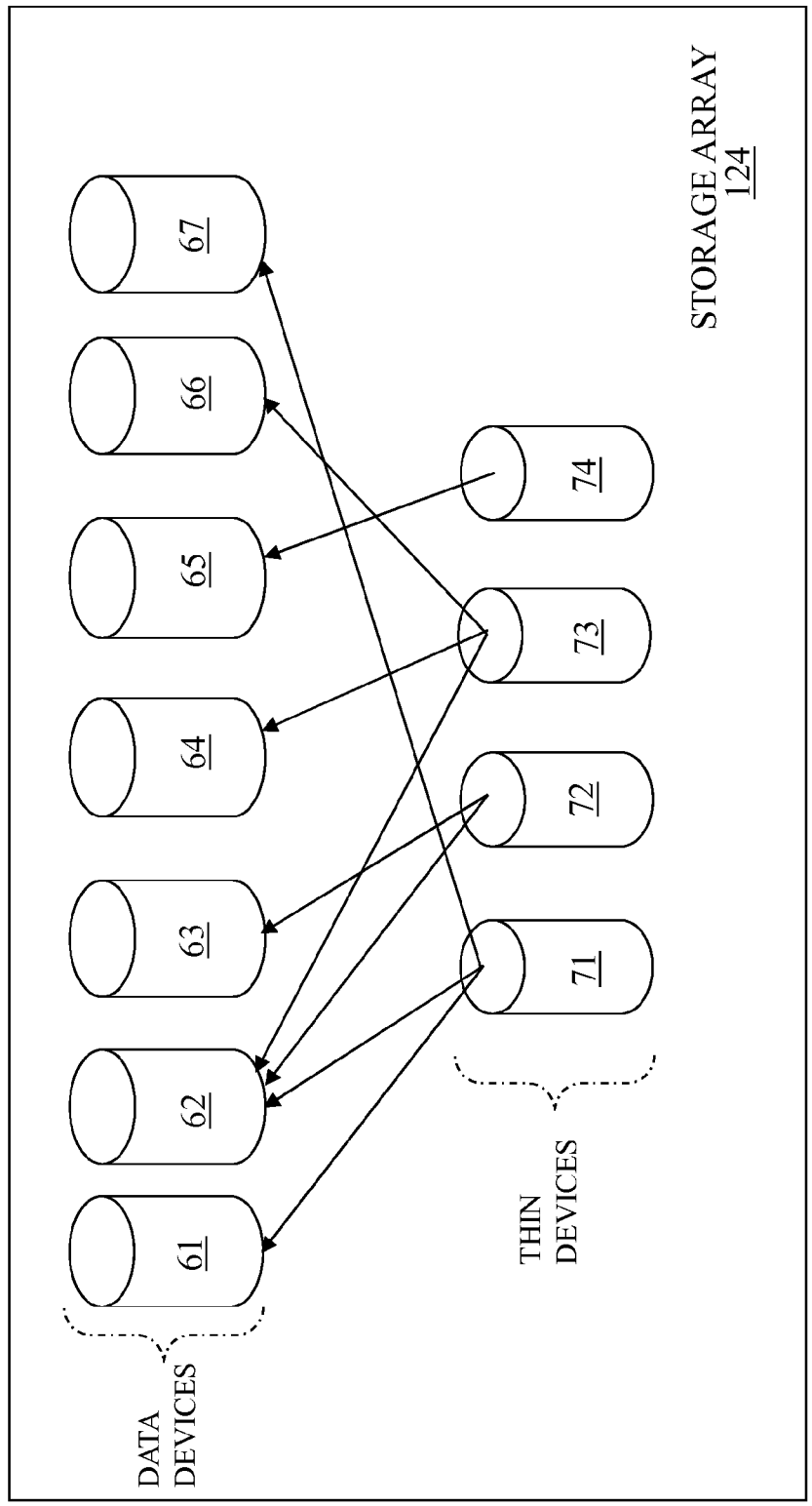

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 5C:
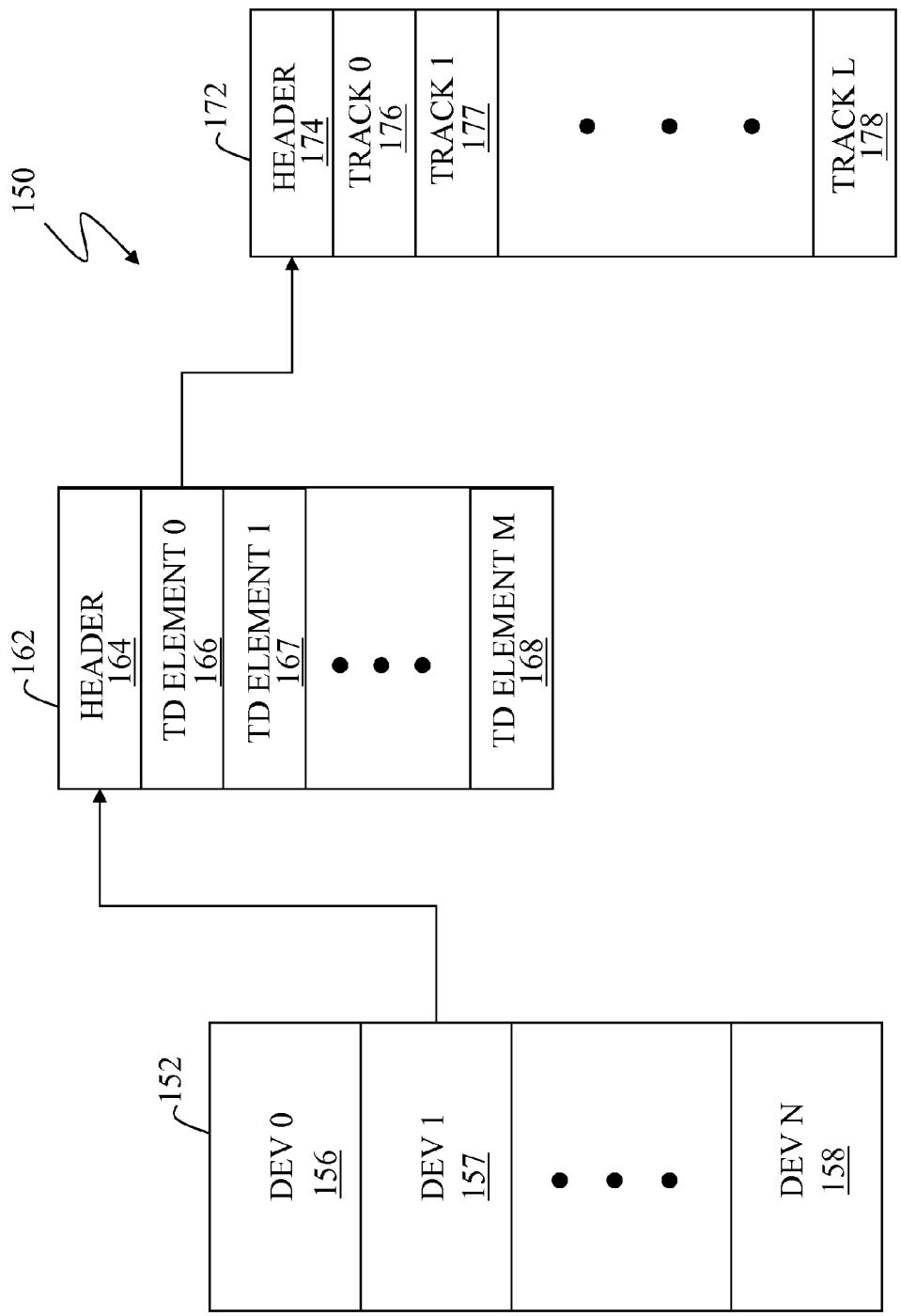
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
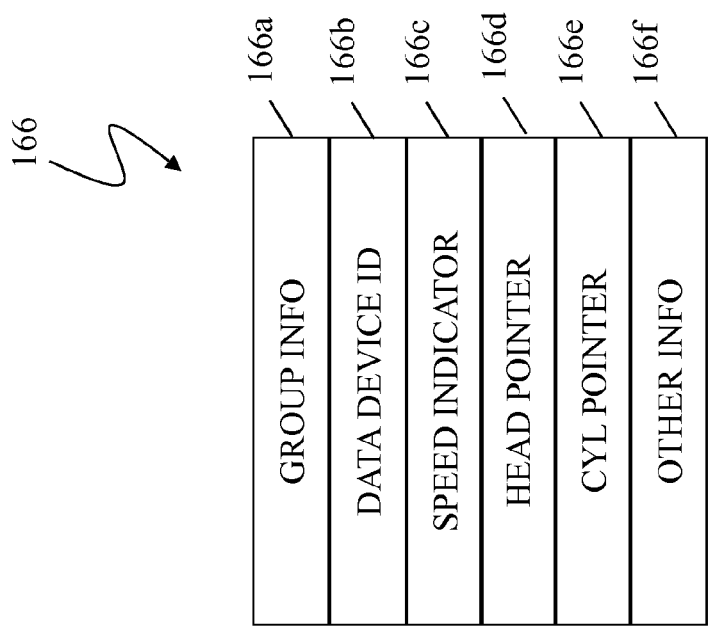
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as'reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

Figure 6:
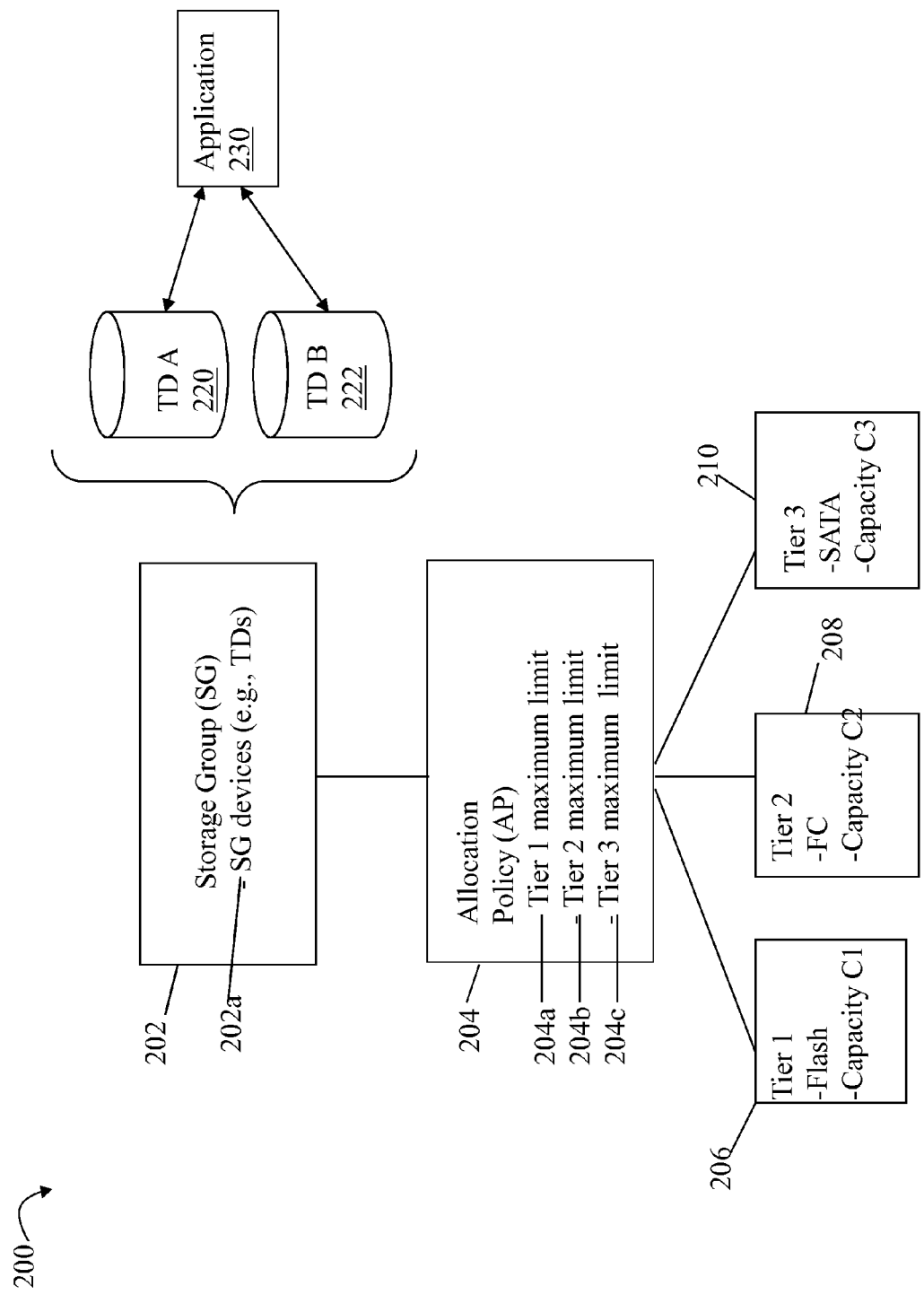
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs used by a single application although an SG may correspond to other logical groupings for different purposes. An SG may, for example, correspond to TDs used by multiple applications.

Each of 206, 208 and 210 may correspond to a tier definition as described elsewhere herein. Element 206 represents a first storage tier of flash drives having a tier capacity limit C1. Element 208 represents a first storage tier of FC drives having a tier capacity limit C2. Element 210 represents a first storage tier of SATA drives having a tier capacity limit C3. Each of C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with techniques herein, the maximum limits 204a, 204b and 204c each represent an upper bound of a storage capacity to which an associated SG is subjected to. The techniques herein may be used to partition less than the amount or capacity represented by such limits An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG 202, and thus an application, based on workload and possibly other criteria when performing a cost benefit analysis, where such amounts are subject to the limits of the SG's AP and also performance limits described in more detail elsewhere herein. At a second point in time, the workloads and possibly other criteria for the applications may change and the optimizer may repartition the storage capacity used by each application subject to the capacity limits of APs and performance limits.

Figure 7:
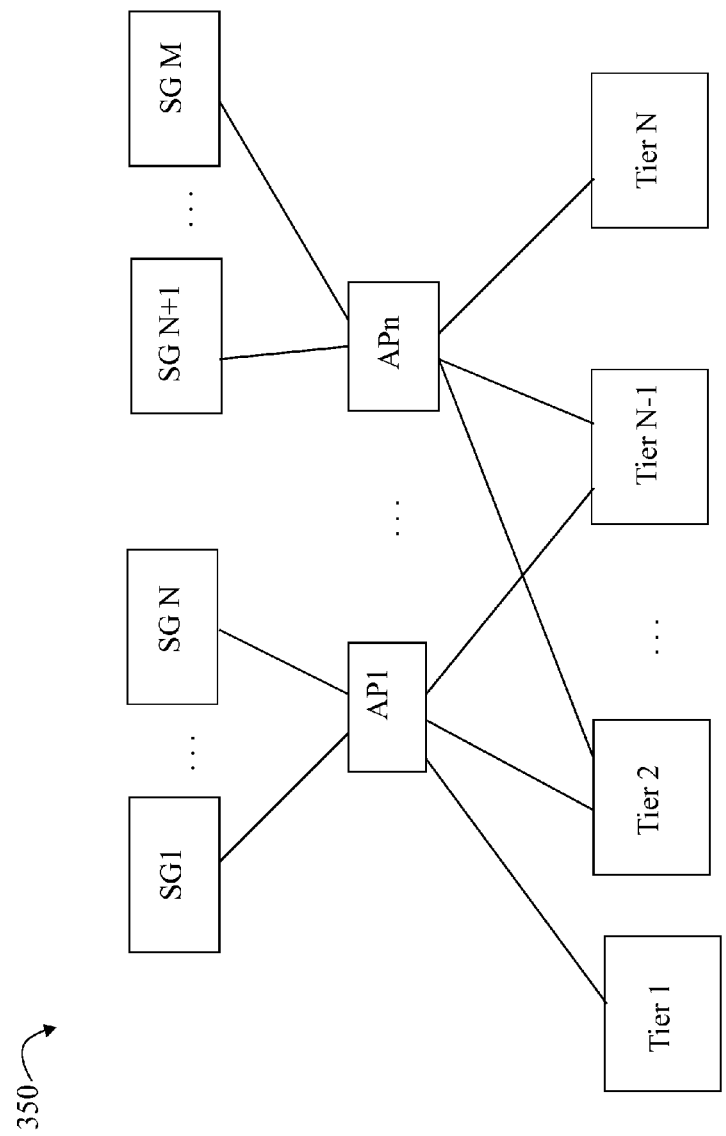

Referring to FIG. 7, shown is an example which more generally illustrates different associations between SGs, APs and tiers in an embodiment in accordance with techniques herein. The example 350 illustrates that an embodiment may have multiple storage tiers (e.g., tiers 1-N), multiple APs (e.g., AP1-N), and multiple SGs (e.g., SG1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 6. Each AP may be associated with one or more SGs. For example SGs1-N may be associated with a same AP1, and SGs N+1 through M may be associated with a same APn.

With reference back to FIG. 6, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage 410c (e.g., indicating a number of bytes or other number of storage units), and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to a TD may be viewed as read and write requests or commands from the DA, controller or other backend physical device interface. Thus, these are operations may also be characterized as an average number of operations with respect to the physical storage device (e.g., average number of physical device reads, writes, and the like, based on physical device accesses). This is in contrast to observing or counting a number of particular types of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. Described in following paragraphs are techniques that may be used in connection with collecting performance data about thin devices where such information may be used to determine which chunks of thin devices are most active relative to others. Such evaluation may be performed in connection with determining promotion/demotion thresholds use in evaluating where to locate and/or move data of the different chunks with respect to the different storage tiers in a multi-storage tier environment. In connection with examples in following paragraphs, details such as having a single storage pool in each storage tier, a single storage group, and the like, are provided for purposes of illustration. Those of ordinary skill in the art will readily appreciate the more general applicability of techniques herein in other embodiments such as, for example, having a storage group including a plurality of storage pools, and the like.

Referring to FIG. 8A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 8B:
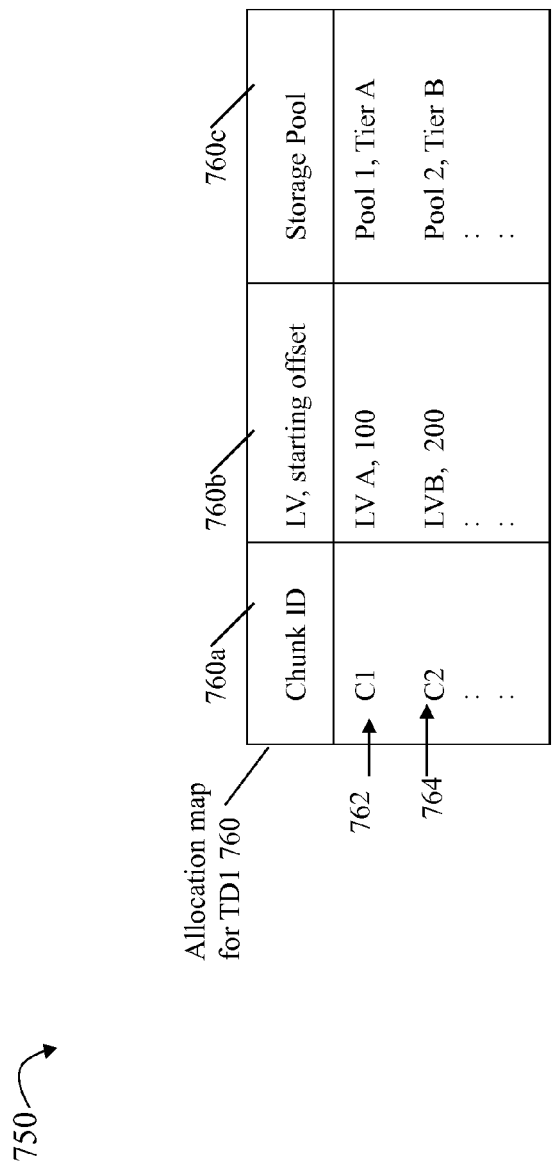

Referring to FIG. 8B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 8A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760c denotes the storage pool and tier including the LV of 760b. For example, entry 762 represents chunk C1 illustrated in FIG. 8A as 702a and entry 764 represents chunk C2 illustrated in FIG. 8A as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B. Such information as illustrated and described in connection with FIG. 8B may be maintained for each thin device in an embodiment in accordance with techniques herein.

In connection with collecting statistics characterizing performance, workload and/or activity for a thin device, one approach may be to collect the information per chunk or, more generally, for the smallest level of granularity associated with allocation and de-allocation of storage for a thin device. Such statistics may include, for example, a number of reads/unit of time, #writes/unit of time, a number of prefetches/unit of time, and the like. However, collecting such information at the smallest granularity level does not scale upward as number of chunks grows large such as for a single thin device which can have up to, for example 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 9:
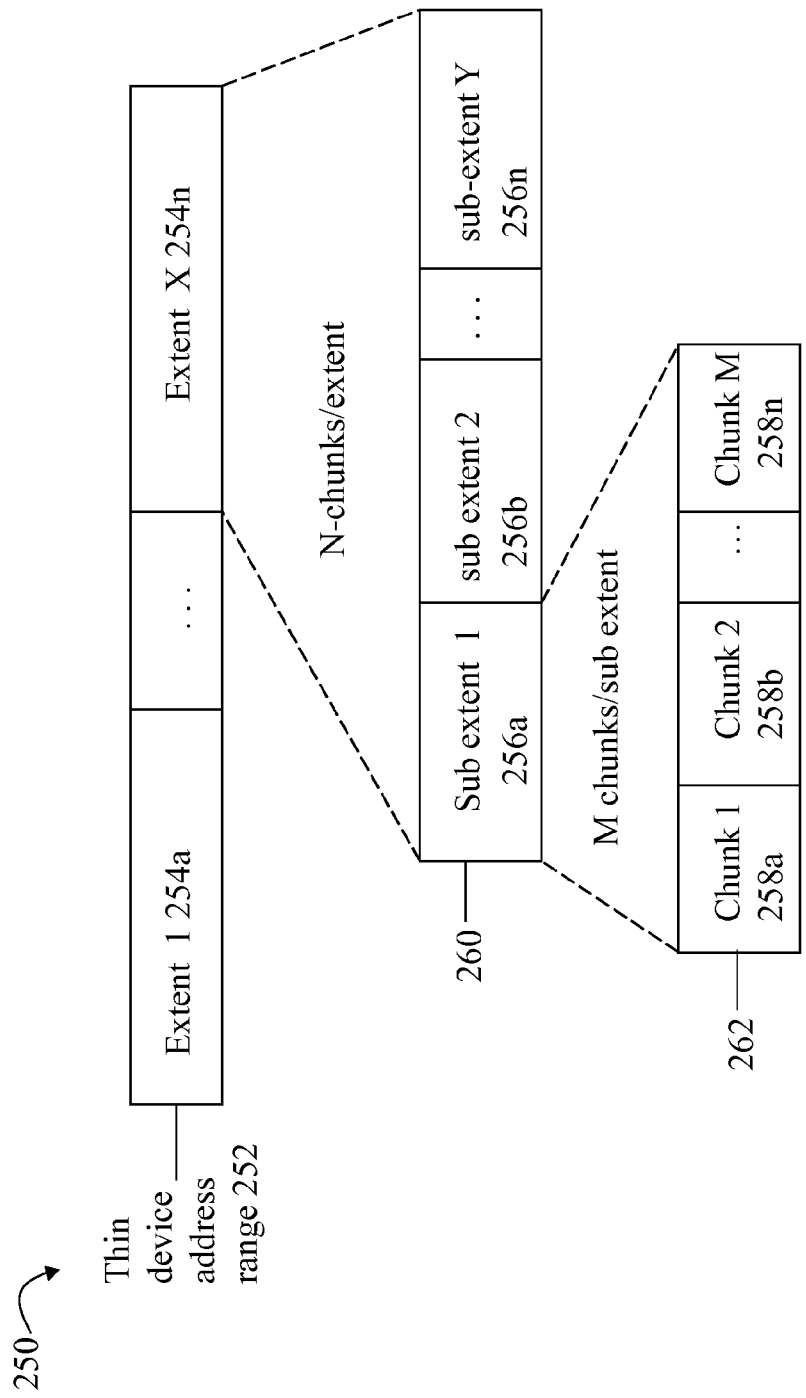
FIG. 9 is an example illustrating data portions comprising a thin device's logical address range.

Referring to FIG. 9, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include sub extents 256a-256n. Although only detail is illustrated for extent 254n, each of the other extents of the thin device also includes a same number of sub extents as illustrated for 254n. Each of the sub extents 256a-256n may represent a grouping of "M" chunks. Element 262 illustrates that sub extent 1 256a may include chunks 258a-258n. Although only detail is illustrated for sub extent 256a, each of the other sub extents 256b-256n also includes a same number of "M" chunks as illustrated for 256a. Thus, each of the extents 254a-254n may represent an grouping of "N" chunks, where $$N = \#\text{sub extents/extent} * M \text{ chunks/subextent} \quad \text{EQUATION 1}$$

An embodiment in accordance with techniques herein may collect statistics for each extent and also other information characterizing activity of each sub extent of a thin device. Statistics for each extent may be characterized as either long term or short term. Short term refers to statistics which may reflect performance, workload, and/or I/O activity of an extent with respect to a relatively short window of time. Thus, short term statistics may reflect recent extent activity for such a short time period. In contrast and relative to short term, long term refers to statistics reflecting performance, workload and/ or I/O activity of an extent with respect to a longer period of time. Depending on the evaluation being performed, such as by the optimizer, it may be desirable to place greater weight on short term information than long term, or vice versa. Furthermore, the information maintained per sub extent may be used as needed once particular extents of interest have been identified.

Figure 10:
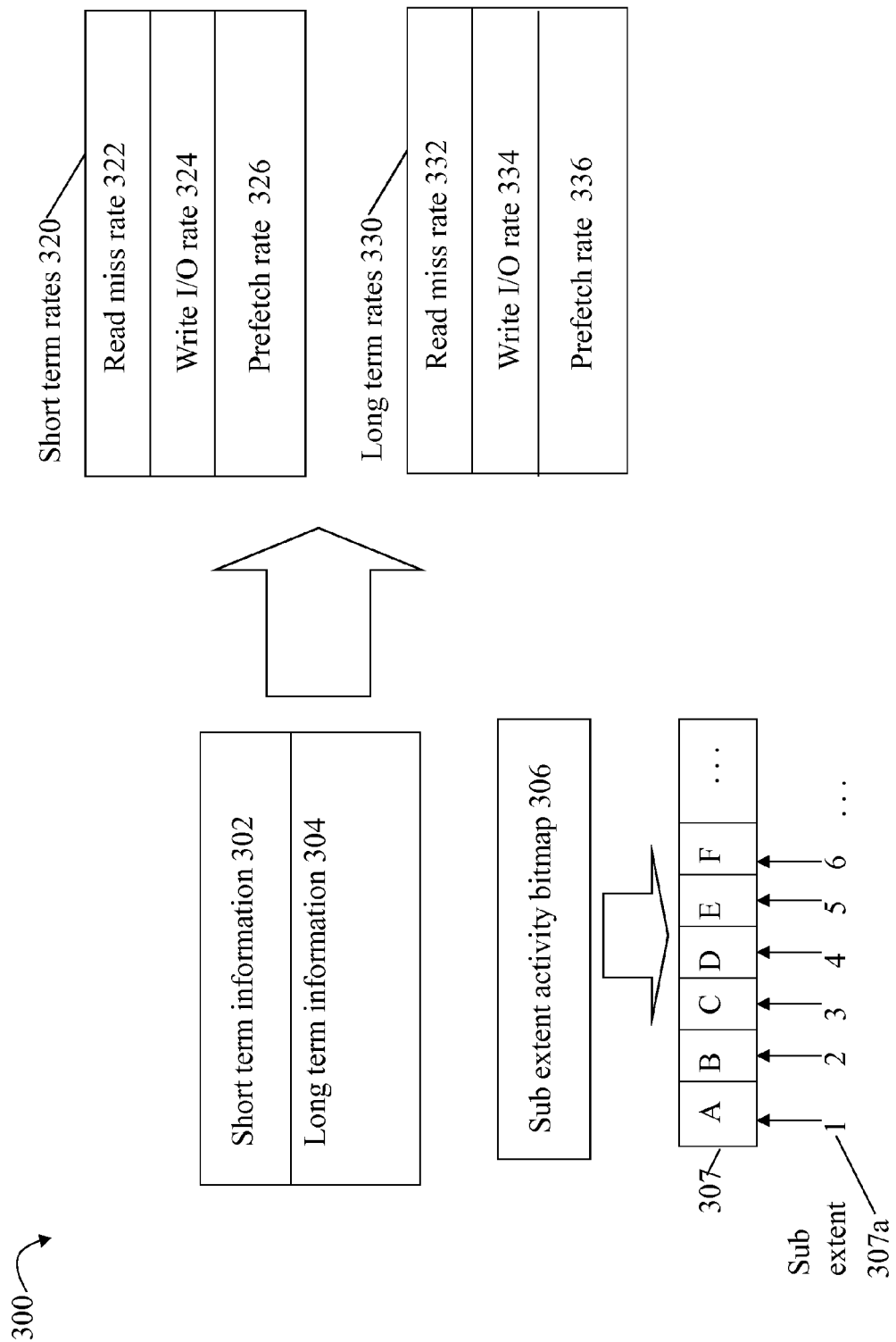
FIG. 10 is an example of performance information that may be determined in connection with thin devices in an embodiment in accordance with techniques herein.

Referring to FIG. 10, shown is an example of information that may be collected and used in connection each extent in an embodiment in accordance with techniques herein. The example 300 illustrates that short term information 302, long term information 304 and a sub extent activity bitmap 306 may be collected for each extent. The short term information 302 and long term information 304 may be used in connection with determining short term rates 320 and long term rates 330 for each extent. The statistics included in 302, 304, 320 and 330 may reflect activity with respect to the entire extent. The activity bitmap 306 is illustrated in further detail by element 307 as including an entry for each sub extent in the associated extent. Entries of 307 are denoted by A, B, C, and the like. Each of the entries of 307 represents aggregated or collective activity information for a corresponding sub extent denoted by the numeric identifiers 307a of 1, 2, 3, etc. Each entry of 307 may include one or more bits used to encode an activity level with respect to all chunks of a corresponding sub-extent. For example, the entry of 307 denoted as A represents an activity level for all chunks in sub extent 1. An embodiment may use any number of bits for each entry of the activity bitmap 306, 307. For example, in one embodiment, each entry of the activity bitmap may be 2 bits capable of representing any of 4 integer values—0, 1, 2, and 3.

As will be described in following paragraphs, the short term rates 320, long term rates 330 and sub extent activity bitmap 306 may be used in connection with a variety of different evaluations such as by the optimizer 138. Generally, the activity level information or data for an extent such as illustrated in FIG. 10 may be referred to as extent activity level information including one or more metrics indicating an activity level for the extent. The extent activity level information may comprise short term activity information (e.g., such as 302 and/or 320) and long term activity information (e.g., such as 304 and 330).

In one embodiment, the short term rates 320 for an extent may include a read miss rate (e.g., random read miss (RRM) rate) 322, a write I/O rate 324 and a pre-fetch rate 326 for the extent. The long term rates 330 for an extent may include a read miss rate 332 (e.g., number of read misses/unit of time, where a read miss refers to a cache miss for a read), a write I/O rate 334 (e.g., number of writes/unit of time) and a pre-fetch rate 336 (e.g., number of pre-fetches/unit of time) for the extent. As known in the art, data may be pre-fetched from a physical device and placed in cache prior to reference or use with an I/O operation. For example, an embodiment may perform sequential stream I/O recognition processing to determine when consecutive portions of a thin device are being referenced. In this case, data of the sequential stream may be pre-fetched from the physical device and placed in cache prior to usage in connection with a subsequent I/O operation. In connection with a portion of data at a first point in a sequential stream associated with a current I/O operation, data subsequent to the first point may be pre-fetched such as when obtaining the portion from a physical device in anticipation of future usage with subsequent I/Os. The short term pre-fetch rate 326, as well as the long term pre-fetch rate 336, may also be referred to as denoting a number of sequential reads or sequential read miss operations performed since such pre-fetching may occur in response to determination that a read operation is performed for data which is not in cache (read miss) and the read operation is for data included in a series of sequentially read data portions as described above. The read miss rates 322 and 332 may represent random read miss (RRM) rates where such read misses (e.g., data requested not currently in cache) are associate with read operations not included in connection with reading data of a sequential stream (e.g., all read misses not used in connection with computing 326 and 336).

Each of the foregoing rates of 320 and 330 may be with respect to any unit of time, such as per second, per hour, and the like. In connection with describing elements 302 and 304 in more detail, what will be described is how an embodiment in accordance with techniques herein may determine the short term rates 320 and long term rates 330 using a decay function and decay coefficients.

In an embodiment in accordance with techniques herein, a decay coefficient may be characterized as a weighting factor given to previous activity information. The higher the coefficient, the greater the weight given to previous activity information for the extent. Thus, the adjusted activity level of an extent at a current time, "An", may be generally represented as a function of a current observed or actual activity level for the current time, "$a_n$", a decay coefficient, "r", and previous adjusted activity level for the previous time period or sampling period, "$A_{n-1}$". In connection with the foregoing, "A" may represent an adjusted activity level, "n" may denote the current time period or sampling period and "n-1" may denote the immediately prior or previous time period or sampling period at which the activity for the extent was determined. In other words, "$a_n$" is adjusted to take into account previous activity as represented by "$A_{n-1}$" and "An" represents the resulting adjusted value of "$a_n$". With respect to a statistic or metric such as a number or read misses, "$a_n$" and "An" may each represent an integer quantity or number of read misses within a current sampling period, "n". The foregoing may generally be represented as:

$$An = a_n + (r^* A_{n-1}) \quad \text{EQUATION 2}$$

wherein $a_n$ is the actual observed activity metric for the current or "nth" sampling period, "r" is a decay coefficient, "$A_n$" is the adjusted activity metric for the current or "nth" sampling period, and "$A_{n-1}$" is the adjusted activity metric from the previous or "n-1" sampling period.

Beginning with an initial time period or sampling period, denoted by i="0" (zero), the adjusted activity A0 may be initially that which is observed, a0. Subsequent observed or actual activity levels may be adjusted as described above. Generally, "$a_i$" may denote an actual or observed value obtained for an activity metric for a sampling period "i", where "i" is an integer greater than or equal to 0. "Ai" may similarly denote an adjusted activity metric (or adjusted value for "a;") for a sampling period "i", where "i" is an integer greater than or equal to 0. Thus, for consecutive sample periods at which actual or observed activity metrics are obtained (as denoted by lower case "$a_i$"s), corresponding adjusted activity levels (e.g., "A" values) may be determined as follows:

$A0=a0$/*Adjusted activity level $A0$, at time=0 or initially*/

$A1=a1+(r^*A0)$/*Adjusted activity level $A1$, at first sampling period, $i=1$*/

$A2=a2+(r^*A1)$/*Adjusted activity level $A2$, at second sampling period, $i=2$*/

:

and so on for subsequent sampling periods 3, 4, and the like, based on EQUATION 2.

In connection with EQUATION 2, $0 \leq r < 1$, where "r" is a decay coefficient or weight given to previous activity. Varying "r" in EQUATION 2 results in accordingly varying the weight given to past or previous activity. If r=0, then no weight is given to previous or historic values. Thus, the closer "r" is to 0, the lesser weight given to previous activity. Similarly, the closer "r" is to 1, the greater the weight given to previous activity. In connection with determining an adjusted activity level, An, using EQUATION 2 for short term and long term, different decay coefficients may be selected. Generally "r" for short term is less than "r" used in connection with long term activity. For example, in one embodiment, "r" used in connection short term activity levels may be 50% or 0.50 or smaller. "r" used in connection with long term activity levels may be 80% or 0.80 or larger. The foregoing are exemplary values that may be selected for "r" in connection with short term and long term activity levels depending on the weight to be given to previous activity. In connection with short term activity, a decay coefficient may be selected in accordance with providing a relatively short term rate of decay for an activity level metric determined at a point in time. For example, a short term rate of decay may provide for a rate of decay for an activity level metric on the order of one or more hours (e.g., less than a day). In connection with long term activity, a decay coefficient may be selected in accordance with providing a relatively long term rate of decay for an activity level metric determined at a point in time. For example, a long term rate of decay may provide for a rate of decay for an activity level metric on the order of one or more days, a week, and the like. Thus, an activity metric at a first point in time may have a weighted or residual effect on an adjusted activity level determined at a later point in time in accordance with the selected decay coefficient indicating the rate of decay of the activity metric.

As mentioned above, EQUATION 2 results in a metric or count, such as a number of read misses, number of writes, or number or pre-fetches during a sample period. It may be desirable to also determine a rate with respect to a unit of time, such as per second, per hour, and the like, for each of the foregoing adjusted activity metrics An. A rate with respect to a unit of time for the adjusted activity level An may be represented as:

$$Ar = An^*(1-r)/(1-r^{n-1}) \quad \text{EQUATION 3}$$

where

Ar=the adjusted activity rate per unit of time, r=decay coefficient or weight as described above, n=denotes an "nth" sampling period as described above, An=adjusted activity level determined for a given sampling period "n" (e.g. using EQUATION 2 as described above).

Generally, the higher the decay coefficient, r, the slower the change in Ar as may be the desired case with long term Ar values. Thus an embodiment may select decay coefficients for use with long term and short term Ar values so that, when plotted with respect to time, long term Ar values generally have a smaller slope than that associated with short term Ar values.

Figure 11:
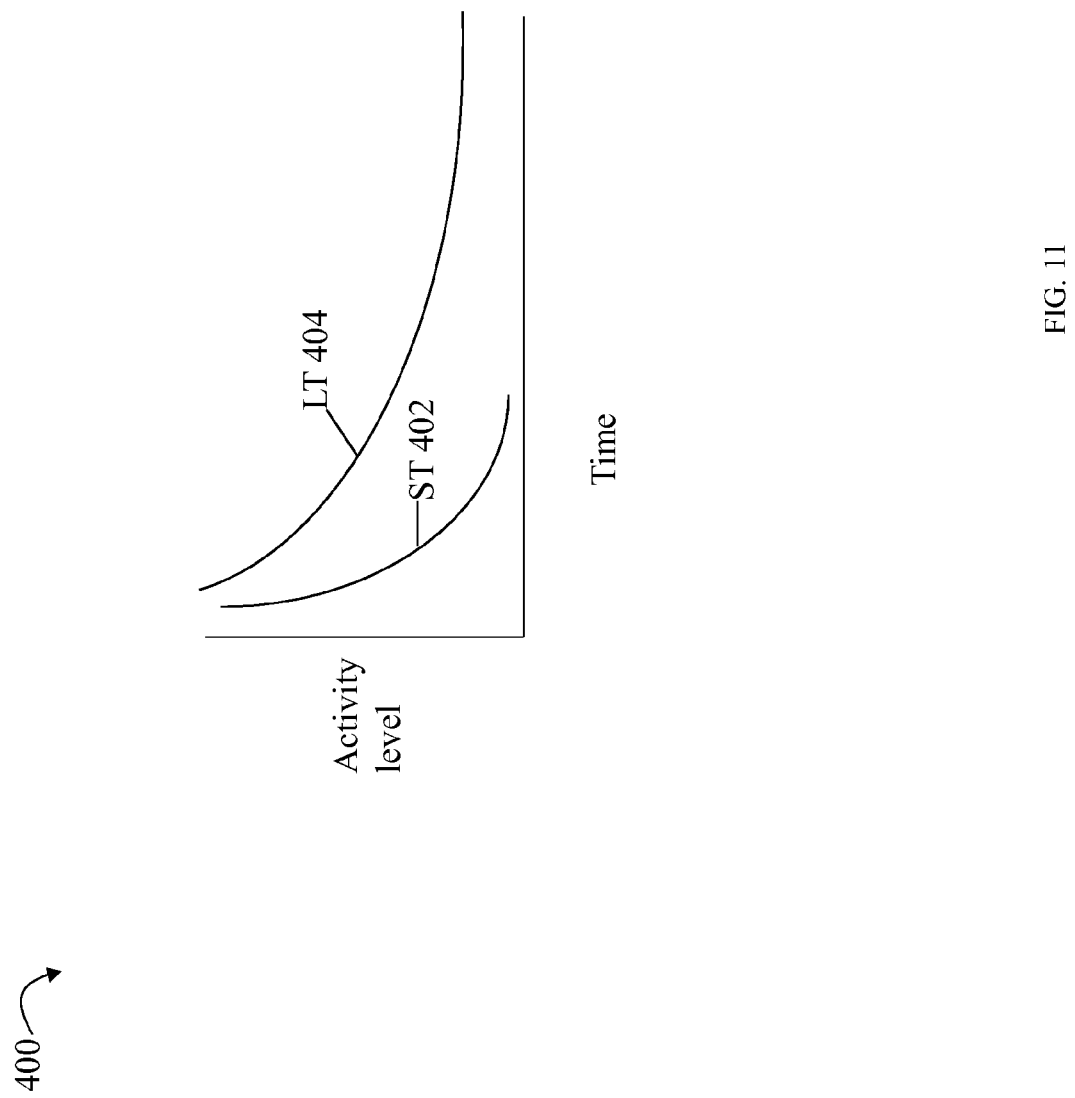
FIG. 11 is a graphical illustration of long term and short term statistics described herein.

Referring to FIG. 11, shown is an example graphically illustrating the general shape of curves for long term (LT) and short term (ST) values in an embodiment in accordance with techniques herein. The activity level values (Y-axis values) are plotted with respect to time (X-axis). The activity level values may be determined using EQUATIONS 2 and/or 3. Curve 402 may be produced using one of EQUATIONS 2 and 3 where a first value for the decay coefficient "r" is selected for ST usage. Curve 404 may be produced using one of EQUATIONS 2 and 3 where a second value for the decay coefficient "r" is selected for LT usage. The values selected for "r" in connection with 402 and 404 may be relative so that the first value for "r" used with 402 is less than the second value for "r" used with 404.

In one embodiment, each of the different An values determined using EQUATION 2 may be converted to a corresponding Ar value using EQUATION 3 when desired.

In connection with the foregoing, for example, with respect to a number of read misses, "$a_n$" represents the number of such operations that have occurred in a current sample period, n. For example, if a sample period=10 minutes so that statistics for an extent are collected and/or computed every 10 minutes, "$a_n$" represents the number of read misses that occurred in the last 10 minute sample period or time interval. $A_{n-1}$ represents the previous or last A calculation (e.g., as determined using EQUATION 2) from the previous sample period, denoted "n−1".

With reference back to FIG. 10, an embodiment may collect short term information 302 as counter values indicating a count or number of each type of operation for a current time period or sampling period "n". The following may represent different "$a_n$" values as included in the short term information 302 for an extent: read miss count (number of read misses for the extent during the sampling period), pre-fetch count (number of pre-fetches for the extent during the sampling period) and write count (number of writes for the extent during the sampling period).

The short term information 302 may also include storing previous A values as determined for the sampling period "n−1" using EQUATION 2 above. For example, short term information 302 may also include storing three (3) previous adjusted activity level values or A values for sampling period "n−1" using EQUATION 2 above for the read miss count, pre-fetch count and write count.

The short term information 302 may also include a timestamp value indicating the timestamp associated with the previous sampling period "n−1".

Using the above-mentioned short term information 302, an embodiment may calculate updated short term rates 320 using EQUATION 3 for a sampling period "n" for a selected "r" as a short term decay coefficient. With each new sampling period, the short term information may be accordingly updated so that which is associated with sampling period "n" subsequently becomes associated with sampling period "n−1".

The long term information 304 may include long term rates or Ar values as determined using EQUATION 3 for a read miss rate (e.g., number of read misses/second), a pre-fetch rate (e.g., number of pre-fetches/second) and a write rate (e.g., number of writes/second). The long term information 304 may also include a time duration interval used for determining an adjusted Ar value for the current time or sampling period "n". For example, the time duration interval may represent the amount of time for which statistics are collected and used in connection with long term Ar values. An embodiment may store a set of long term Ar values rather than calculate such Ar values on demand from other stored information as in the case above for short term rates 320 (e.g., where short term information 302 is stored and used to calculate short term rates 320 on demand). Thus, in such an embodiment, the long term rates 330 may be included the long term information 304 where such long term rates 330 may be updated with each sampling period. In one embodiment with the arrival of a new sampling period "n", the long term information 304 may include Ar values for the foregoing statistics as determined using EQUATION 3 for a sampling period "n−1". These long term Ar values for "n−1" may each be multiplied by the time duration interval to determine $A_{n-1}$, an adjusted metric for the long term time period. The foregoing $A_{n-1}$ value may then be used with EQUATION 2 to determine An for the current sampling period "n" using a selected "r" as a long term decay coefficient. Using An, EQUATION 3 may then be used to obtain updated long term rates Ar values. With each new sampling period, the long term information may be accordingly updated so that which is associated with sampling period "n" subsequently becomes associated with sampling period "n−1".

With reference back to FIG. 10, described above is an activity bitmap 306 having an entry per sub extent where each such entry may indicate an aggregate or collective activity level with respect to all chunks of the associated sub-extent. The number of different activity level states that may be represented for each sub extent depends on the number of bits per entry of the activity bitmap. In one embodiment, each entry of the activity bitmap may be 2 bits as described above so that each entry may be an integer in the inclusive range of 0.3. Processing may be performed to decrement each entry having a non-zero value by 1 every predetermined time period, such as every 12 hours. Each time there is any I/O operation to a sub extent since the sub extent was located or moved to its current physical location, the sub extent's entry in the activity bitmap 306 may be set to 3. Thus, each entry in the bitmap may represent activity level information for up to 3 of the predetermined 12 hour time periods. An embodiment may also have a different number of bits per entry to represent a larger number of predetermined time periods. Based on the foregoing, the lower the value of a bitmap entry for a sub extent, the longer the amount of time that has lapsed since the sub extent has had any I/O activity.

Figure 12:
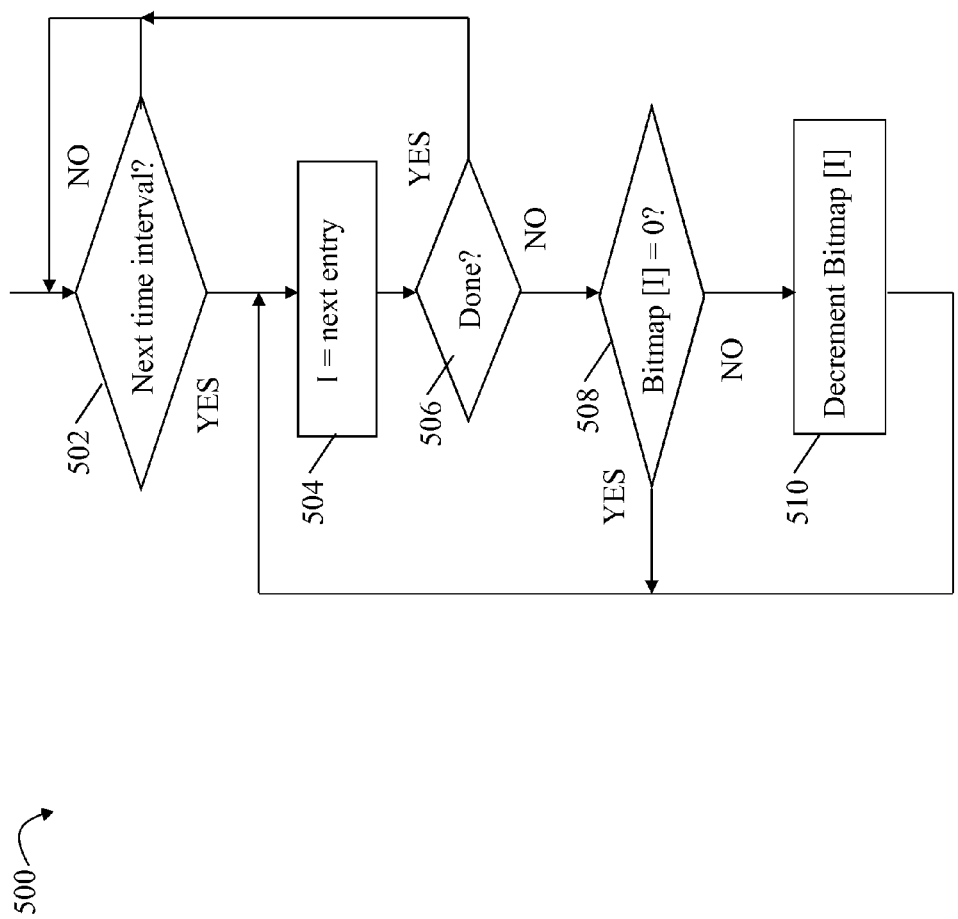
FIGS. 12, 15, 17, 18, 19, 21, 23B, 26, and 29C are flowcharts of processing steps that may be performed in an embodiment in accordance with techniques herein.

Referring to FIG. 12, shown is a flowchart of processing steps that may be performed in connection with each activity bitmap associated with an extent in an embodiment in accordance with techniques herein. The flowchart 500 summarizes processing described above where each bitmap for each extent may be traversed with the occurrence of a predetermined time interval, such as every 12 hours. At step 502, a determination is made as to whether the next time interval has lapsed. If not, processing waits at step 502 until step 502 evaluates to yes and control proceeds to step 504. At step 504, I is initialized to the next entry in the bitmap. I represents a loop counter when traversing through the bitmap and denotes the bitmap entry currently selected for processing. At step 506, a determination is made as to whether the entire bitmap has been processed. If step 506 evaluates to yes, control proceeds to step 502 until an amount of time again lapses equal to that of the time interval. If step 506 evaluates to no, control proceeds to step 508 where a determination is made as to whether the current bitmap entry (e.g. bitmap [I]) is zero. If so, control proceeds to step 504. Otherwise, control proceeds to step 510 where the current bit map entry is decremented by one (1) and control proceeds to step 504 to process the next entry in the bitmap.

The activity bitmap may be used in connection with determining an activity level associated with each sub extent, the smallest amount of data that can be associated with a data movement operation to relocate data from one physical device to another. It should be noted that an embodiment may have functionality and capability to physically move data in units or amounts less than a sub extent. However, when performing processing to determine data movement candidates, such as by the optimizer, such processing may consider candidates for data movement which have a minimum size of a sub extent. That is, all data of the sub extent may be either moved or relocated as a complete unit, or remains in its current location. In connection with a sub extent when performing a data movement, it may be that not all chunks of the sub extent are actually moved. For example, suppose a sub extent is 10 chunks and the sub extent is to be moved from a first storage tier, such as from SATA or FC, to a second storage tier, such as flash. It may be that 9/10 chunks of the sub extent are unallocated or already in flash storage with only 1 chunk stored in the first storage tier. In this case, processing only needs to actually move the single chunk from the first storage tier to flash since the remaining 9 chunks are either already in the flash tier or unallocated. With a sub extent, the amount of data actually moved may be at most the size of the sub extent but may be less depending on, for example, whether all chunks of the thin device sub extent are allocated (e.g., actually map to physical storage), depending on the current physical device upon which chunks of the sub extent are located prior to movement, and the like. It should be noted that chunks of a sub extent may be located in different storage tiers, for example, depending on where the chunk's data is stored such as at the time when written as well as the result of other conditions that may vary with embodiment.

As an example use of the activity bitmap is in connection with promotion and demotion. As an example use of the activity bitmap, the bitmap may be used to determine selective sub extents which exhibit the highest activity level such as those having counters=3 (e.g., "hot" or active areas of the extent). These sub extents may be candidates for promotion or data movement to a higher performing storage tier and may be given preference for such promotion and data movement over other sub extents having activity bitmap entries which are less than 3. In a similar manner, the activity bitmap may be used to identify the "coldest" or inactive sub extents. For example, sub extents having bit map entries=0 may be candidates for demotion to a lower performing storage tier.

In connection with promotion data movements, an embodiment may want to be responsive to a change in workload with respect to the short term. With demotion, an embodiment may not want to move data as quickly as with promotion and may also want to consider longer term workloads prior to moving such data to a lesser performing storage tier. With promotion, an embodiment may give greater weight to ST workload and activity data. With demotion, an embodiment may additionally consider LT workload and activity rather than just such ST information.

The information as described and illustrated in FIGS. 10-12 above may be used for a variety of different purposes and evaluations. For example, an embodiment may use one or more of the short term rates to identify one or more active extents based on such aggregated extent-level activity data. Subsequently, once an active extent is identified such as a candidate for promotion, the extent's activity bitmap may be examined to determine which sub extents are most active. Processing may be performed to selectively move some of the sub extents of the active extent (e.g., those with counters=3) to a higher performing storage tier.

As another example, the activity bitmaps of extents may be used to determine a promotion ranking used to identify which extent may be promoted prior to one or more other extents. To further illustrate, an embodiment may have two extents, both which are candidates for promotion. The two extents may exhibit similar activity levels based on aggregate extent-level information such as based on short term rates 320 for each extent. The extent having the lesser number of active sub extents may have a higher priority for movement than the other extent. For example, processing may be performed to count the number of non-zero bit map entries for each of the two extents. The extent having the lower count may have a higher priority than the other extent having a higher count. In other words, the extents may be ranked or ordered for promotion based on a number or count of non-zero bit map entries. The extent having the lower count may be characterized as also exhibiting the greatest activity level density based on the foregoing counts of the activity bitmaps.

As another example in connection with demotion, an embodiment may use one or more of the short term rates 320 in combination with one or more of the long term rates 330 to identify one or more inactive extents based on such aggregated extent-level activity data. Subsequently, once an inactive extent is identified, the extent's activity bitmap may be examined to determine which sub extents are inactive and should be demoted rather than automatically demoting all sub extents of the inactive extent. Processing may be performed to selectively move some of the sub extents (e.g., those with counters=0, counters less than some threshold such as 1, and the like) to a lower performing storage tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

The different levels of activity information described herein as obtained at a thin device level, extent level, and sub extent level provide a hierarchical view for characterizing activity of different portions of thin devices. Activity information at higher device levels may be used to first identify devices which may be candidates for data movement, such as between storage tiers (e.g. for promotion and/or demotion). In connection with thin devices, once such a first device is identified, additional detail regarding the first device's activity as reflected in extent activity level information may be used to identify an extent of the first device as a candidate for data movement. Subsequently, the activity bitmap for the extent identified may then be used to determine one or more sub extents of the identified extent for data movement. The techniques herein may be used for collecting and tracking activity of thin devices. Use of the decay coefficients and equations for determining adjusted activity levels to account for previous activity levels provides an effective way of tracking workload and activity over time without having to keep a large database of historical statistics and metrics for long and short time periods.

In addition to the activity information described above for each extent and sub extent of a thin device, an embodiment may also track device level activity information for logical devices (e.g., thin devices, LVs, and the like) and physical devices in a data storage system as also noted. Additionally, an embodiment may track activity information for thin device pools. When a DA or other device interface services an I/O, the DA may not typically have any knowledge regarding thin devices as may be known from the host's point of view. In connection with collecting data for use with techniques herein, each DA may be provided with additional mapping information regarding thin devices and where storage for the thin devices is allocated (e.g., such as described by the allocation map). The DA may use this information to determine what thin device (if any) is associated with a given back end I/O request. When the DA is servicing a back end I/0 request, the DA may record information about the I/O including information about the thin device associated with the I/O request. Such additional information about the thin device may be used in order to perform statistics collection of activity data for the thin devices in accordance with techniques herein.

In addition to the statistics and activity data described above, an embodiment may also collect and store information regarding expected I/O size information for each extent, thin device (or other logical device), physical device, and the like. Such information may be determined in any one or more suitable ways in an embodiment. For example, an embodiment may determine expected I/O sizes that represent the average size with respect each of the particular types of I/O operations for which statistics are collected. In connection with the embodiment herein, the types of I/O operations for which statistics are collected may be as described above for read miss or random read miss (RRM), pre-fetch (P) or sequential read miss (SRM), and write (W). In a manner similar to that as described elsewhere herein for other statistics, the average I/O sizes may be determined based on size information collected for observed I/O operations. The collected size information based on observed I/Os may be used in determining or modeling expected I/O sizes in connection with equations, such as EQUATION 4, described elsewhere herein when determining various scores. For example, an embodiment may determine a first average I/O size based on I/O sizes of write operations observed for a time period, a second average I/O size based on I/O sizes for SRM operations for a time period, and a third average I/O size based on I/O sizes for RRM operations for a time period. The foregoing average I/O sizes may be tracked with respect to each extent and other levels (e.g., thin device, physical device, etc) in a manner similar to that as described above such as in FIG. 10 for other statistics. An embodiment may also use other approaches which may be further simplified. For example, rather than track such I/O size information for each extent, an embodiment may determine an average I/O size with respect to each particular type of I/O operation (W, RRM and SRM) as an aggregate across one or more devices, such as for a physical device, pool of physical devices, thin device, and the like, and then determine an average I/O size with respect to all extents or data portions thereof. In one embodiment, the expected I/O size for any desired I/O operation type such as used in connection with EQUATIONs 4 and 5 described elsewhere herein, may be computed as an average I/O size based on previously gathered data including metrics related to total amount of data (in bytes, megabytes, or other size unit) for a given time period and total number of I/O operations (for the time period over which the total amount of data is determined). More formally, the average I/O size used as an expected I/O size for a given I/O type may be represented as:

Ave size for given I/O type=TOTAL_DATA_TRANSFER/TOTAL_OPS    EQUATION 3A where

"Ave size for given I/O type" is the average or expected I/O size for a given I/O operation type (e.g., Read, Write, Read miss, etc.);

"TOTAL_DATA_TRANSFER" is the total amount of data (e.g., in bytes, megabytes or other size unit) for the desired I/O operation type for a given time period; and "TOTAL_OPS" is the total number of I/O operations observed during the time period for which the TOTAL_DATA_TRANSFER is observed.

It should be noted that EQUATION 3A is one way in which an embodiment may estimate that averages as may be used in connection with expected I/O sizes as described elsewhere herein. Another way an embodiment may determined average I/O sizes is based on a an equation using weighted averages, using information as may be gathered using the allocation map as described elsewhere herein (e.g., to gather information for data portions based on I/Os directed to the physical device where such data portions are stored), and more generally any suitable technique.

In connection with techniques in following paragraphs, the extent-based short term and long term statistics or metrics as described in FIG. 10 may be used in determining scores indicating the activity of extents. In one embodiment, the score may be a weighted value based on a combination of all six metrics 322, 324, 326, 332, 334 and 336 of FIG. 10 although an embodiment may generally use any metrics in determining such scores. In an embodiment herein, a promotion score for an extent may be represented in EQUATION 4 as:

$$((P1*P7*s\_rrm)+(P2*P8*s\_w)+(P3*P9*s\_p)+\\(P4*P10*l\_rrm)+(P5*P11*l\_w)+(P6*P12*l\_p))/(\#Active\ Subext+1)$$

where s_rrm is the rate of short term random read misses (322), s_w is the rate of short term writes (324), s_p is the rate of short term pre-fetches or SRMs (326), l_rrm is the rate of long term random read misses (332), l_w is the rate of long term writes (334), and l_p is the rate of long term pre-fetches or SRMs. The coefficients P1-P12 may be set as appropriate and are described in more detail elsewhere herein. It should be noted that "#Active Subext" represents the number of active subextents or subportions of an extent or other larger data portion for which the score is being determined Examples of evaluating when a subextent or other subportion is active are described elsewhere herein. It should be noted that metrics used in connection with determining promotion and/or demotion score may take into account I/O size.

The coefficients P1-P6 may represent weights assigned to the different operation types denoting how much weight is given to each particular operation type (e.g., which of random read miss (RRM), pre-fetch (P) or sequential read miss (SRM), write (W)) and the long term and short term variants of expected rates at which such operation types are expected (e.g., predicted or modeled) to occur in the future. In one aspect, the coefficients P1 and P4 represent the weighted preference given to the RRM operation type relative to the other operations types of SRM (or P) and W. In particular, P1 represents the weighted preference given to the short term operation count or rate for the RRM operation type and P4 represents the weighted preference given to the long term operation count or rate for the RRM operation type. In a similar manner, the coefficients P2 and P5 represent the weighted preference given to the W operation type relative to the other operations types of SRM (or P) and RRM. In particular, P2 represents the weighted preference given to the short term operation count or rate for the W operation type and P5 represents the weighted preference given to the long term operation count or rate for the W operation type. Furthermore, the coefficients P3 and P6 represent the weighted preference given to the P or SRM operation type relative to the other operations types of W and RRM. In particular, P3 represents the weighted preference given to the short term operation count or rate for the P or SRM operation type and P6 represents the weighted preference given to the long term operation count or rate for the P or SRM operation type. The weights or coefficients P1-P6 may be generally referred to as operation type weights. In some embodiments, values for P1-P6 may be dynamically selected each time a new set of statistics or metrics (e.g., 320 and 330 of FIG. 10) are utilized in performing processing described herein. Values for P1-P6 may be generally selected based on expected storage tier workload characteristics and particular performance characteristics of physical drives in the different tiers. Examples of how values for P1-P6 may be selected are described in more detail elsewhere herein. It should be noted that an embodiment may also use a combination of fixed values for P1-P6 when determining a score in connection with evaluating which data portions to store in one or more of the storage tiers and may use dynamically determined values for P1-P6 when determining a score in connection with evaluating which data portions to store in one or more others of the storage tiers. For example, an embodiment may use dynamically selected values for P1-P6 when determining a promotion score of EQUATION 4 for use when evaluating which data portions to store in a target high performing SSD or flash-based storage tier, and may otherwise use a same set of fixed values for P1-P6 when determining a promotion score of EQUATION 4 for use when evaluating which data portions to store in a non-SSD or non-flash-based storage tiers (e.g., storage tiers comprising rotational disk drives). In an embodiment, the fixed values used for P1-P6 for non-SSD-based tiers may be 12, 4, 4, 3, 1, and 1, respectively. Of course, different values may be used to emphasize or deemphasize different I/O characteristics in connection with determination of the promotion raw score. Thus, different values for weights P1-P6 may be selected for use depending on which target tier the promotion score is being calculated for. Such values may be dynamically and continually determined based on current expected workload characteristics of a storage tier at different points in time. An embodiment may also selected weights for P1-P6 which are fixed or static throughout operation and performance of the techniques herein where such a fixed set of the same weights may be used for one or more storage tiers.

The coefficients P7-P12 may represent additional weights assigned or associated with each particular variant combination of operation type (e.g., RRM, SRM or P, and W) and short term or long term for each operation type. Generally, the coefficients P7-P12 may represent weighting factors that may be characterized as varying with, dependent on, or a function of, expected I/O size for the three different operation types of RRM, SRM or P, and W. In particular, P7 and P10 represent weighting factors that vary with, or are a function of, expected I/O size for the RRM operation type. P8 and P11 represent weighting factors that vary with, or are a function of, expected I/O size for the W operation type. P9 and P12 represent weighting factors that vary with, or are a function of, expected I/O size for the P or SRM operation type. Weights P7-P12 may also be referred to herein as I/O size or data transfer weights. As noted above, EQUATION 3A is one way in which the expected I/O size may be determined for use in connection with determining such weights. It should also be noted that as a variation to the above where in one embodiment, size weights as represented using P7-P12 may be applied to only the short term metrics (e.g., always use a size weight of 1 for weights P10, P11 and P12 for long term metrics).

In some embodiments, values for P7-P12 may be dynamically selected each time a new set of statistics or metrics (e.g., 320 and 330 of FIG. 10) are utilized in performing processing described herein. Values for P7-P12 may be generally selected based on expected storage tier workload characteristics and particular performance characteristics of physical drives in the different tiers. For example, as described in more detail elsewhere herein, if particular storage tiers have physical drives where a response time or other measurement of performance does not exhibit a substantial dependency upon I/O size, then values for P7-P12 may be 1 so as not to introduce any bias based upon expected I/O sizes for the different operation types. Examples of how values for P7-P12 may be selected are described in more detail elsewhere herein. It should be noted that an embodiment may also use fixed values for P7-P12 when determining a score in connection with evaluating which data portions to store in one or more of the storage tiers and may use dynamically determined values for P7-P12 when determining a score in connection with evaluating which data portions to store in one or more others of the storage tiers. For example, an embodiment may use dynamically selected values for P7-P12 when determining a promotion score of EQUATION 4 for use when evaluating which data portions to store in a target high performing SSD or flash-based storage tier and may otherwise use a set of fixed values for P7-P12 of 1 for all of P7-P12 when determining a promotion score of EQUATION 4 for use when evaluating which data portions to store in a non-SSD or non-flash-based storage tiers (e.g., storage tiers comprising rotational disk drives). Of course, different values may be used to emphasize or deemphasize different I/O characteristics in connection with determination of the promotion raw score. Thus, different values for weights P7-P12 may be selected for use depending on which target tier the promotion score is being calculated for.

Values of P7-P12 may be selected as a function of expected I/O sizes for the different operation types. For example, P7 and P10 may be determined as a function of the expected I/O size of the RRM operations with respect to the extents for which the promotion score is being determined. P8 and P11 may be determined as a function of the expected I/O size of the W operations with respect to the extents for which the promotion score is being determined. P9 and P12 may be determined as a function of the expected I/O size of the SRM or P operations with respect to the extents for which the promotion score is being determined.

Values for P7-P12 may be based on each storage tier and drive technology depending on the sensitivity of response time to I/O size. Thus, the drive technology may be used in selecting that particular values for P7-P12 such as using curves of FIGS. 13D and 13E where the more sensitive or greater dependency between response time and I/O size, the greater the variation in values of the bias or weights assigned.

The demotion score for an extent may be represented in EQUATION 5 as:

$$(P4*P10*s\_rrm)+(P5*P11*s\_w)+(P6*P12*s\_p)+ \\ (P1*P7*l\_rrm)+(P2*P8*l\_w)+(P3*P9*l\_p)$$

where s_rrm, s_w, p1, etc. are as set forth above.

As noted above in connection with the exemplary EQUATIONS 4 and 5 for computing, respectively, the promotion and demotion scores, the same set of coefficients may be used. Alternatively, an embodiment may, however, use a different set of coefficients for computing the promotion and demotion scores.

In a multi-tiered storage system as described herein, an application having its data stored on thin devices of a storage group may be allowed to use multiple tiers of storage. In order to be able to use the storage of the tiers efficiently and also move a minimal number of chunks between tiers, chunks which are the most active or "hot" need to be located in the higher tiers (e.g., promoted to such tiers if not already located there) and chunks which are least active or "cold" need to be located in lower storage tiers (e.g., demoted to such tiers if not already located there). After identifying the hot and cold chunks, processing may be performed to determine how much of the hot chunks should be placed in the different storage tiers in order to efficiently utilize the higher performing tiers, such as flash tiers, while also avoiding overloading any given tier with I/O request or I/O transfer activity to the point that overall performance (e.g., across all tiers in the AP, across one or more SGs, for the whole data storage system, and the like with respect to the physical devices under consideration) would have been better had less of the workload been placed in the tier. In connection with the foregoing, techniques are described in following paragraphs which determine promotion and demotion thresholds of a data movement policy that may be associated with one or more SGs. The data movement policy as described herein in the context of thin devices affects what data portions of thin devices are data movement candidates and may be moved to another tier. The selection of promotion and demotion thresholds may be made by considering criteria including performance limits (e.g., response time, number of I/Os per time period, and the like) and capacity limits. The performance limits may be flexible or adaptable and specified for each storage tier. The capacity limits may also be specified for each storage tier and may include capacity limits included in an AP for the affected one or more SGs. The techniques model response time of target storage tiers when evaluating different alternative hypothetical considerations in which performance limits are varied for each tier when selecting promotion and demotion thresholds. The different sets of performance limits in combination with capacity limits are evaluated by modeling the expected target tier performance and then determining an overall performance metric representing an aggregate modeled performance metric across all target storage tiers for all affected SGs. In one embodiment, the overall performance metric may be an average response time determined with respect to all target storage tiers using the modeled response time as determined for each such tier. The average response time is used to compare the overall modeled performance for the storage tiers when evaluating different sets of performance limits for each target tier. Each set of performance limits specified for multiple tiers may be used as a way to provide weighting factors for I/O workload distribution across the tiers in order to reflect the performance differences of the different tier storage technologies. Utilizing such "what if" analysis to evaluate different sets of performance limits coupled with capacity limits provides for determining promotion and demotion thresholds that may be used by the DA, or more generally, other backend data storage system components, in connection with performing data movements in accordance with workload or performance impact across all target storage tiers to increase overall performance.

In connection with techniques herein as mentioned above, response time may be considered as performance criteria alone, or in combination with other performance criteria in combination with capacity limits, when determining promotion and demotion thresholds affected what data portions of a thin device may be moved between physical storage devices in different storage tiers. The techniques herein consider different performance characteristic information and curves that may vary with each storage tier, type of physical device, device vendor, and the like. In particular, performance curves for the different storage tiers may be determined and used to model target tier and also overall SG performance across storage tiers as part of processing to evaluate different sets of performance limits in combination with capacity limits. As an example, consider a workload of N I/O operations/second. The response time experienced for the same workload varies with storage tier due to the underlying capabilities of each tier's technology. As such, performance curves may be used in connection with techniques herein to model expected response times if a particular data movement is performed in accordance with candidate promotion and demotion thresholds.

Figure 13:
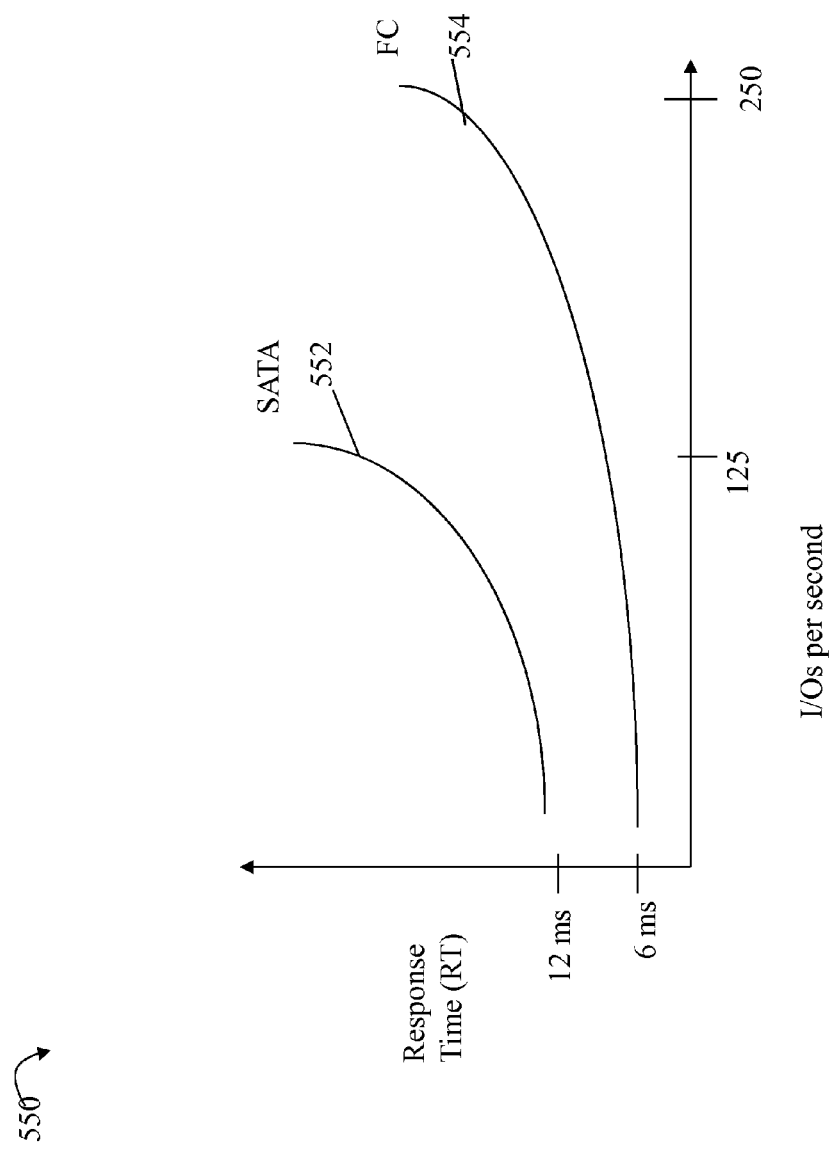
FIGS. 13 and 13A-13E are examples of performance curves that may be used to model device response time and in selection of weights for scoring calculations in an embodiment in accordance with techniques herein.

Referring to FIG. 13, shown is an example of performance characteristic information illustrated in the form of curves for different storage tiers such as may be based on different disk drive types. The example 550 illustrates general curve shapes as may be associated with a SATA drive (as represented by 552) and an FC disk drive (as represented by 554) in connection with processing rate (X-axis in terms of IOs/second) vs. response time (Y-axis). As may be seen from the illustration 550, for a same processing rate of I/Os/second, different RTs are obtained for each of a SATA drive and an FC disk drive. As such, when moving data storage tier of SATA drives to a storage tier of FC drives, differences in performance characteristics such as response times are taken into consideration in accordance with techniques herein. An embodiment may store data as represented by the curves of FIG. 13 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table. When considering moving data between devices of different types or more generally having different device characteristics, such tables of performance characteristic information may be used to determine, for a given processing rate of I/Os per second, a modeled RT for each of the different device types. For example, consider a first storage tier of SATA drives and a second storage tier of FC disk drives. In modeling performance based on a proposed data movement, an aggregated or total processing rate for each target tier may be determined, for example, using performance data collected. For such a total processing rate on the X-axis, a corresponding modeled RT value (Y-axis) may be obtained for each storage tier using tables or curves, such as illustrated in FIG. 13. An embodiment may use appropriate performance curves for each of the different storage tiers and associated technologies of the tiers. The performance curves may be obtained for each storage tier based on observed or collected data through experimentation. The particular parameters or metrics of collected data used to obtain performance curves to model expected RT may vary with storage tier and underlying technology. For example, as described in U.S. patent application Ser. No. 12/924,361, filed Sep. 24, 2010, TECHNIQUES FOR MODELING DISK PERFORMANCE, which is incorporated by reference herein, performance curves for modeling response times for disk drives is described using total number of I/Os and I/O size. Other technologies such as flash-based drives may use other parameters in modeling to determine the appropriate performance curve. For example, one approach to modeling flash-based drives may utilize observed performance data related to total number of I/Os, I/O size, and a ratio of read operations/write operations. Additionally, data modeling for different storage drives may utilize a feedback process. At a point in time, there is a set of data representing the performance curve for a particular drive. The actual measured RT of the drive for a given workload in terms of I/Os per second, for example, may be compared to a modeled RT value determined using the performance curve for similar model parameter values. Adjustments may be made to the modeled performance curve based on differences between the measured RT and modeled RT.

In connection with estimating thin device workloads, various metrics that may be used are described herein and also in U.S. patent application Ser. No. 12/924,396, filed Sep. 25, 2010, TECHNIQUES FOR STATISTICS COLLECTION IN CONNECTION WITH DATA STORAGE PERFORMANCE, which is incorporated by reference herein. Workload for thin devices may be determined in a variety of different ways in connection with determining the contributions of the thin device data portions that may be stored in multiple thin device pools. One approach may be to examine the allocation map and determine the workload of data portions based on I/Os directed to the physical device where such data portions are stored. However, an embodiment may use alternative approaches to estimate thin device workload due to additional resources consumed in connection with use of the allocation map which may adversely impact performance. When data portions of a thin device are moved from a first storage tier to a second storage tier, the related workload of such data portions are moved to the target tier. In one embodiment, storage for thin devices may be evenly distributed across a pool of data devices comprising a thin device pool. This results in even distribution of capacity and I/O workload thereby making it possible to correlate I/O workload and capacity allocation at the pool level rather than reading the allocation map for each thin device. In other words, a workload for a thin device data portion having storage allocated from a thin device pool of data devices may be estimated by collecting thin device pool statistics and then apportioning an amount of the workload indicated by the collected data distributed evenly across all data portions stored in the pool.

In connection with FIG. 13, it should be noted that the performance curve of modeled response time is a function of I/O rate (e.g. IOPS or I/Os per second). Performance curves may also be modeled for response time as a function of IOPS and also I/O size for the different storage tiers (e.g., physical device characteristics of physical devices in a particular tier).

Figure 13A:
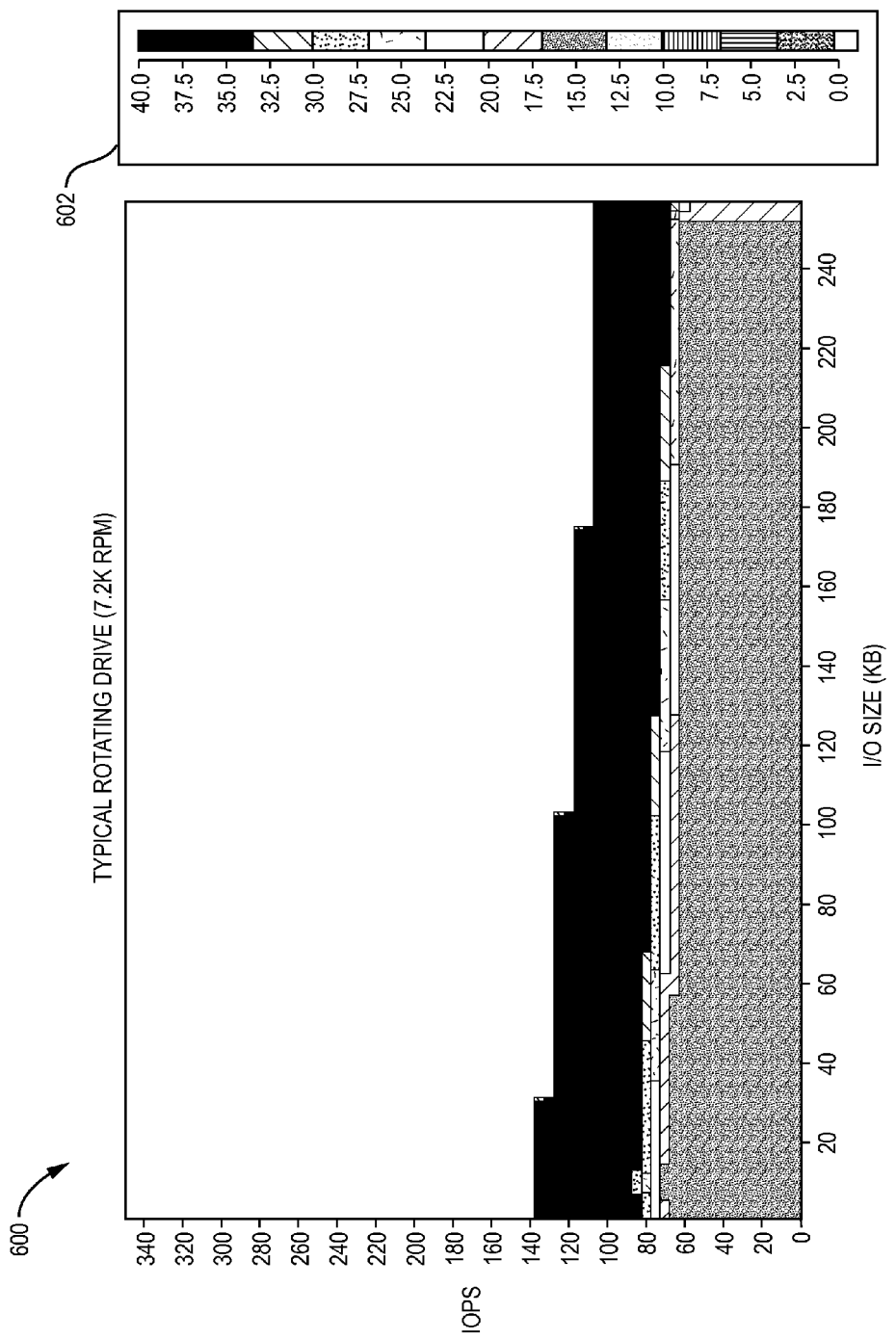

Referring to FIG. 13A, shown is an example 600 illustrating a performance curve for modeled response time as a function of IOPS (Y-axis) and I/O size (average for physical drive in kilobytes (KBs)) for a 7.2K RPM rotating drive. Element 602 illustrates a scale of response times from 0-40 milliseconds where the particular pattern indicated on the scale for a response time is denoted on the X-Y graph of 600 for various combinations of IOPs and I/O sizes. Based on the example 600, it may be generally observed that the I/O size does not have a significant or substantial impact on response time (e.g., response time is not highly dependent on, or sensitive to changes in, I/O size) for the particular physical drive.

Figure 13B:
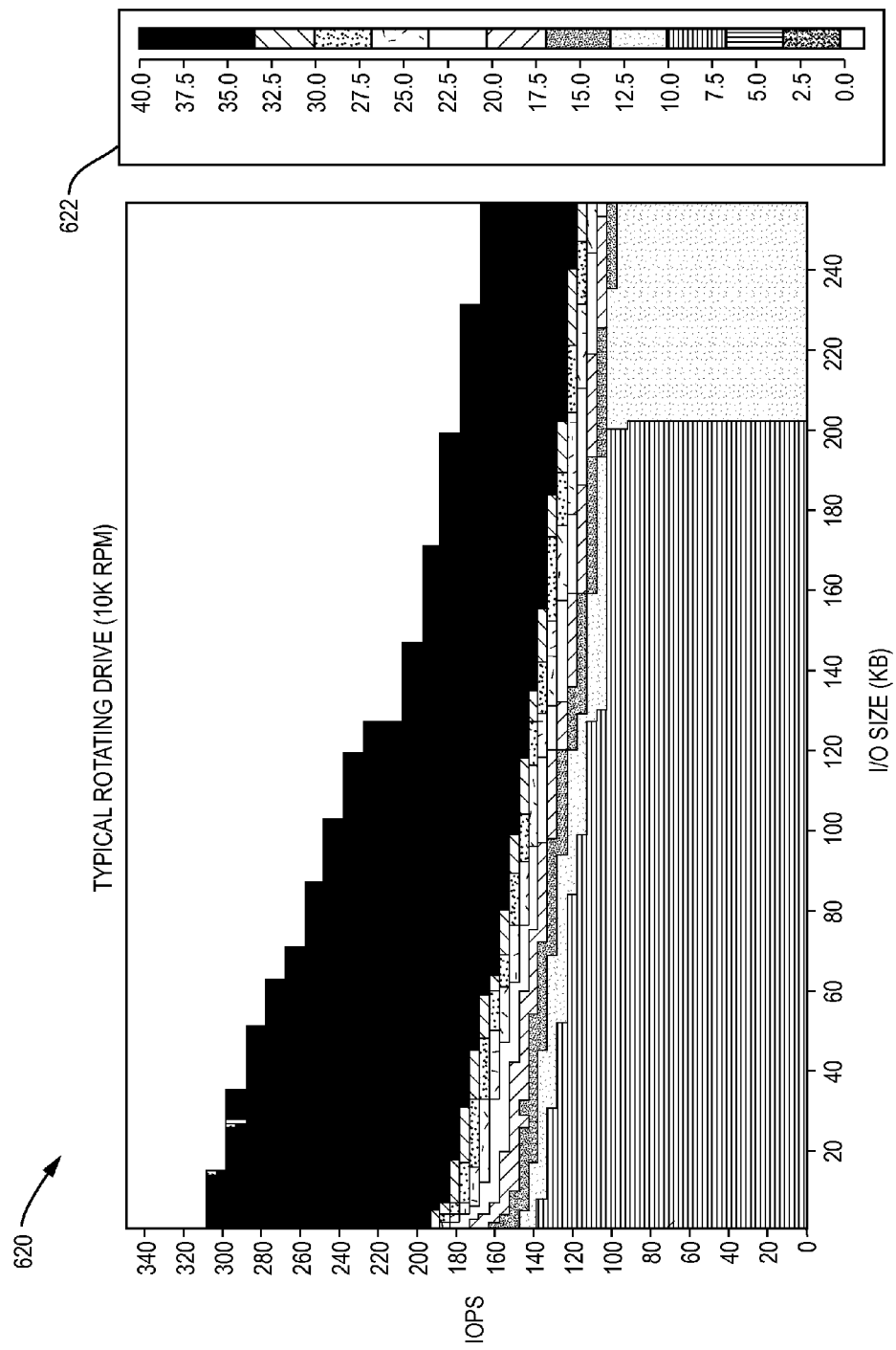

Referring to FIG. 13B, shown is an example 620 illustrating a performance curve for modeled response time as a function of IOPS (Y-axis) and I/O size (average for physical drive in kilobytes (KBs)) for a 10K RPM rotating drive. Element 622 illustrates a scale of response times similar to 602 where the particular pattern indicated on the scale for a response time is denoted on the X-Y graph of 620 for various combinations of IOPs and I/O sizes. Based on the example 620, it may be generally observed that I/O size for the 10K RPM rotating disk drive has a slightly greater dependency than that of FIG. 13A but that the I/O size for the 10K RPM does not have a significant or substantial impact on response time (e.g., response time is not highly dependent on, or sensitive to changes in, I/O size) for the particular physical drive.

Figure 13C:
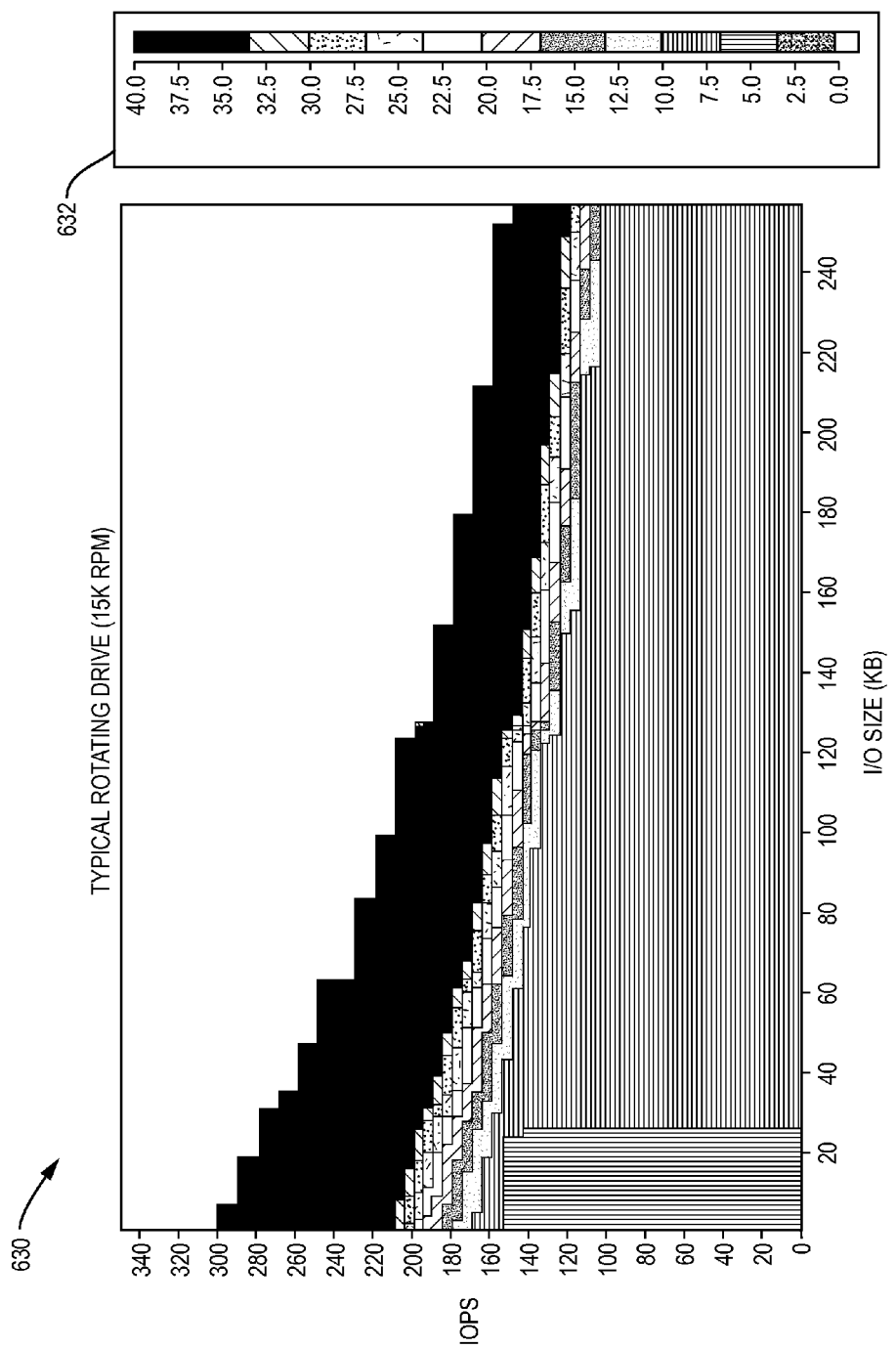

Referring to FIG. 13C, shown is an example 630 illustrating a performance curve for modeled response time as a function of TOPS (Y-axis) and I/O size (average for physical drive in kilobytes (KBs)) for a 15K RPM rotating drive. Element 632 illustrates a scale of response times similar to 602 where the particular pattern indicated on the scale for a response time is denoted on the X-Y graph of 630 for various combinations of IOPs and I/O sizes. Based on the example 630, it may be generally observed that I/O size for the 15K RPM rotating disk drive has a slightly greater dependency than that of the 10K RPM drive of FIG. 13B but that the I/O size for the 15K RPM does not have a significant or substantial impact on response time (e.g., response time is not highly dependent on, or sensitive to changes in, I/O size) for the particular physical drive.

Figure 13D:
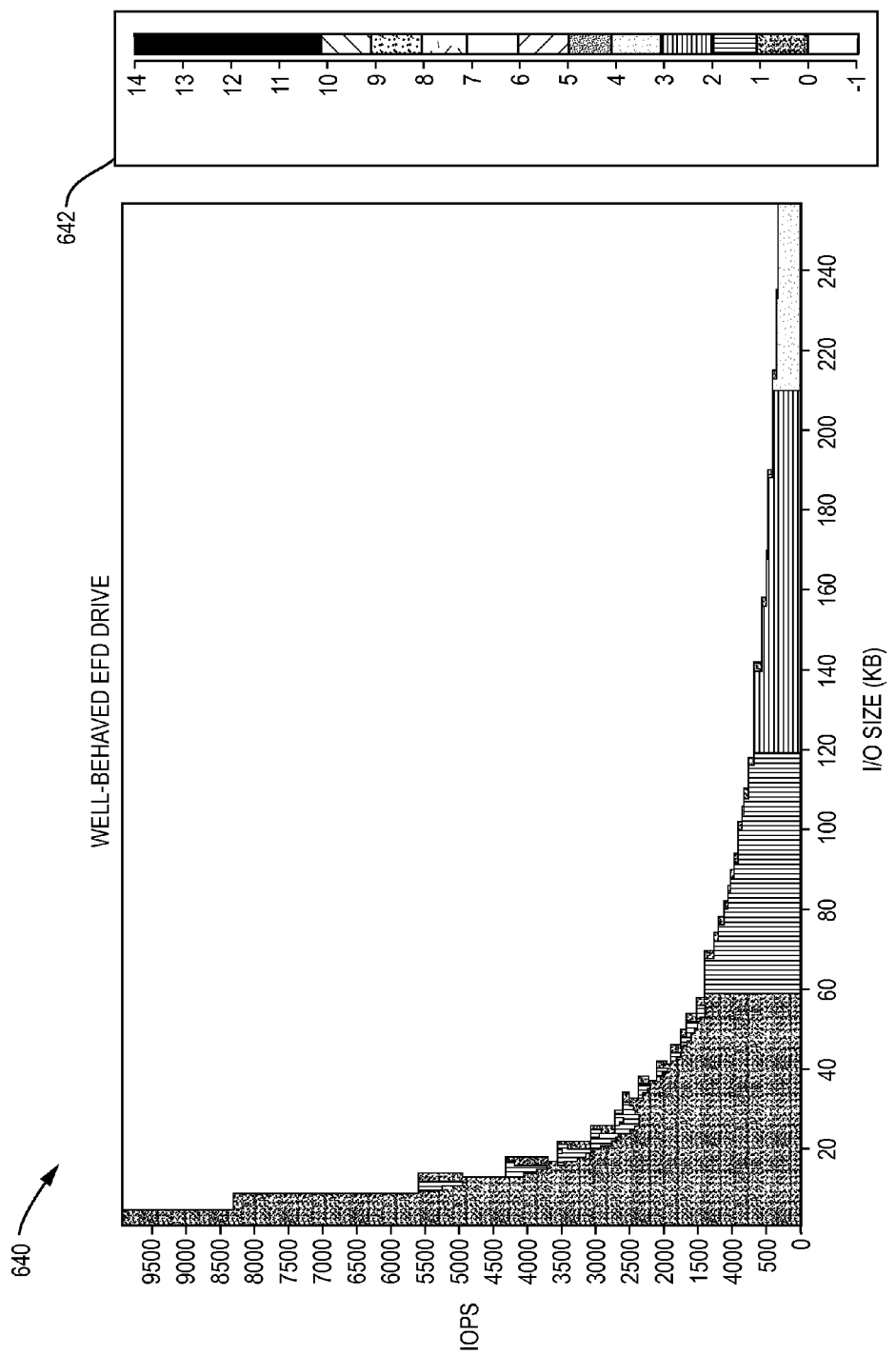

Referring to FIG. 13D, shown is an example 640 illustrating a performance curve for modeled response time as a function of IOPS (Y-axis) and I/O size (average for physical drive in kilobytes (KBs)) for an exemplary SSD drive such as an EFD. Element 642 illustrates a scale of response times similar to 602 where the particular pattern indicated on the scale for a response time is denoted on the X-Y graph of 640 for various combinations of IOPs and I/O sizes. Based on the example 640, it may be generally observed that I/O size for the EFD has a significant or substantial impact on response time (e.g., response time is highly dependent on, or sensitive to changes in, I/O size) for the particular physical drive.

Figure 13E:
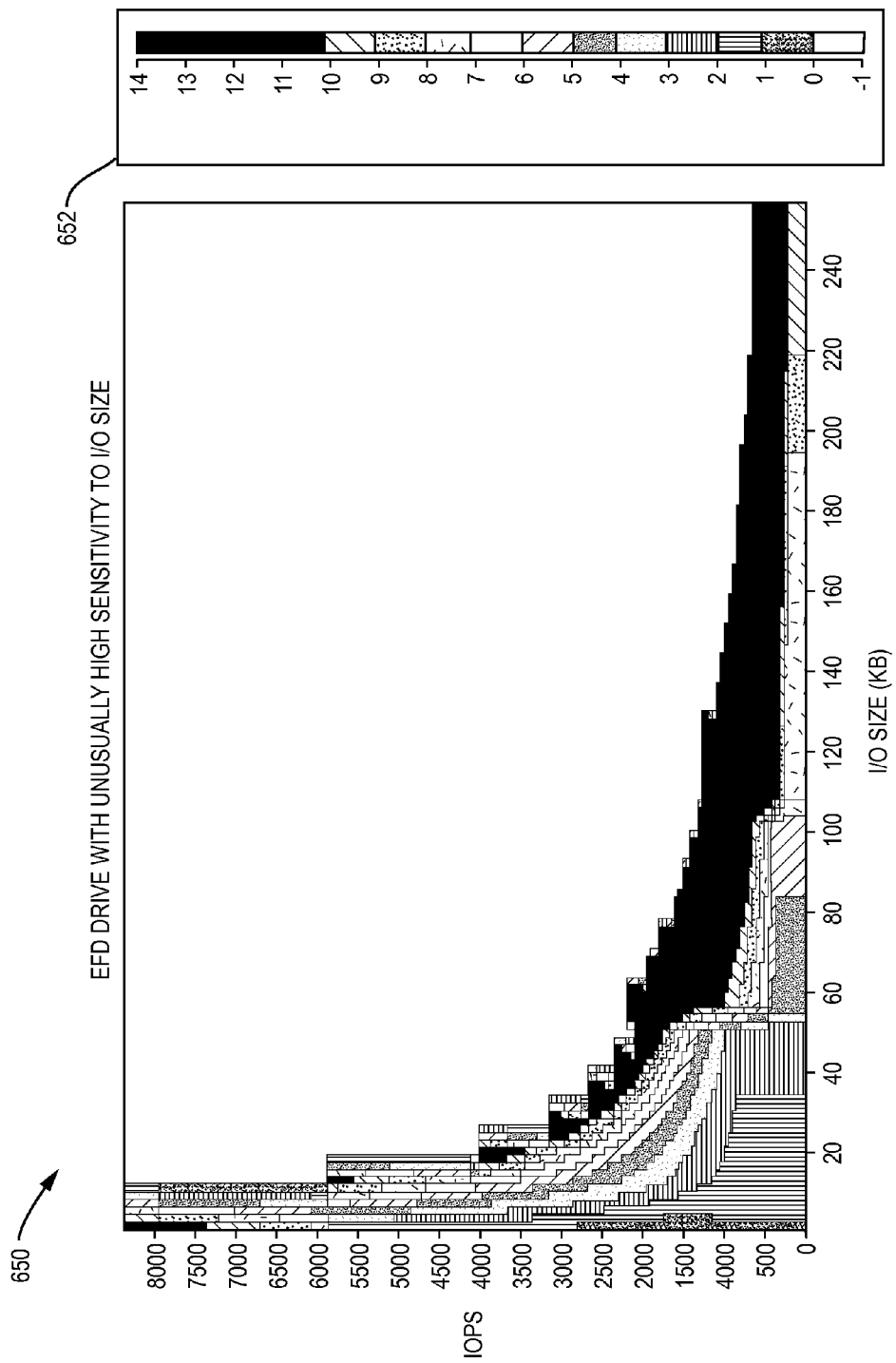

Referring to FIG. 13E, shown is an example 650 illustrating a performance curve for modeled response time as a function of IOPS (Y-axis) and I/O size (average for physical drive in kilobytes (KBs)) for another exemplary SSD drive such as an EFD. The example 640 of FIG. 13D may represent the modeled performance curve for one type of EFD such as by one vendor based on one vendor's technology and implementation and the example 650 of FIG. 13E may represent modeled performance curve for another type of EFD such as by a different vendor or EFD drive with different performance characteristics than that modeled in FIG. 13D. Element 652 illustrates a scale of response times similar to 602 where the particular pattern indicated on the scale for a response time is denoted on the X-Y graph of 650 for various combinations of IOPs and I/O sizes. Based on the example 650, it may be generally observed that I/O size for the EFD has a significant or substantial impact on response time (e.g., response time is highly dependent on, or sensitive to changes in, I/O size) for the particular physical drive.

As such, based on the performance curves of FIGS. 13A-13E, an embodiment may select values for coefficients or weights P7-P12 when determining various promotion and demotion scores in connection with following techniques based on the target storage tier. The target storage tier may be the tier for which processing is performed to select data portions for movement to the target tier. In other words, if processing is determining which data portions may be moved to, or stored on, the flash or SSD tier, values for P7-P12 may be selected in accordance with the expected I/O sizes for each of the I/O operation types as described above. If processing is determining which data portions may be moved to, or stored on, rotating disk drives or, more generally, on a tier including non-flash drives or non-SSD drives, values for P7-P12 may be selected as 1 to reflect the fact that there is not a substantial dependency of I/O size for the particular drive on response time.

In connection with estimating modeled response times, performance curves such as that of FIGS. 13, and 13A-13E may be used based on the particular parameters considered when modeling the response times. For example, an embodiment may use FIGS. 13 and 13A-13C when modeling response times for promotion and demotion scores used with P7-P12 having values of 1 for different types of rotating disk drives. An embodiment may use FIGS. 13D-13E when modeling response times for promotion and demotion scores used with P7-P12 having values of determined as a function of I/O sizes.

The determination of the optimal tier for each extent of storage is driven by the goal of maximizing the chances of achieving storage performance objectives. This goal will tend to be achieved if the storage system can arrange for the largest share possible of the storage request workload to be serviced by the highest performing storage tiers. In connection with techniques herein, scores, such as the promotion and demotion scores, may be metrics or measurements used to drive this determination process where such scores may be calculated for each storage extent. The input to the calculation is information about the expected storage request workload that the storage extent will receive. The promotion and demotion scores as described herein provide a measure of how 'well suited' a storage extent is for placement on a first higher performing storage tier as opposed to a second lower performing storage tier. If the promotion and demotion scores used for the storage tiers are defined properly, then for a first promotion score used when determining what extents to store in an EFD storage tier, if storage extent or portion A has a higher promotion score than storage extent B, then storage extent A is better suited for placement on the EFD tier than storage extent B. Of key importance here is how an embodiment quantifies 'well suited'. Informally, a storage extent should be considered more 'well-suited' for a high tier, such as an EFD tier, if placing the storage extent on the high tier tends to allow a greater number of storage requests (especially RRM requests) to be packed into the high tier. The foregoing provides for use of scores or metrics which guide the selection of the best extents to place on the different tiers.

The use of promotion and demotion scores with properly selected weights or coefficients P1-12 allows the storage system to identify the best extents to place in the different storage tiers in a computationally efficient manner. As described herein, for example, processing may be performed to sort the storage extents according to their promotion scores as may be used when determining which extents are best suited for the EFD storage tier. A sufficient number of the extents with the highest promotion scores may be selected to fill the EFD tier based on any one or more of storage capacity limits and/or performance limits for the EFD tier, Similarly, other tiers may be filled with selected extents using scores determined using other values for weights P1-P12 selected for non-EFD tiers. This approach has the important property that it scales well to configurations involving very large numbers of storage extents.

As described above, the promotion and demotion scores may have values selected for P7-P12 (e.g., for the size or data transfer weights) to express any existing dependency of the score on I/O size. Weights P7-P12 may have values selected which are always 1 for non-EFD tiers or, more generally, for those storage tiers having drives which do not have a substantial affect on response time or other performance metric used to measure system performance.

To illustrate how values for P7-P12 may be selected for an EFD tier where such values for the EFD tier may not always be 1 and may depend on the expected storage tier workload characteristics and the particular performance characteristics of the drives in the high tier, consider the case of a multi-tier storage configuration that includes a storage tier comprised of Enterprise Flash Drives (EFDs). Generally speaking, EFD drives are considered high performing because they are particularly efficient at I/O operation processing (much more so than rotating drives are). However, the data transfer rates supported on EFD drives are not correspondingly large in comparison to data transfer rates for rotating disk drives. As known in the art, data transfer rate or throughput may be characterized as the speed at which data can be transferred between devices. For example, data transfer rates may be expressed in terms of Mbps (amount of data transferred for given unit of time). As such, an embodiment may perform processing to select values for P7-P12 dynamically for the EFD tier by considering the expected workload on the EFD storage tier and the specific performance characteristics of the EFD drives underlying the EFD storage tier. For example, if the expected workload on the EFD storage tier is light enough that the data transfer limits of the EFD drives will not be approached, then an embodiment select size weights (e.g., values of P7-P12) for use with EQUATION 4 that are one to thereby allow the greatest number of storage requests to be packed into the available storage capacity in the EFD storage tier (e.g., an embodiment may use a function for EQUATION 4 that assigns a value of 1 to parameters P7-P12). If the expected workload on the EFD storage tier is heavy enough to approach the data transfer limits of the EFD drives, then an embodiment may select size weights (e.g., values of P7-P12) for use with EQUATION 4 that place greater weight on storage requests with small I/O sizes will allow the greatest number of storage requests to be packed into the available data transfer capacity of the EFD storage tier (e.g., an embodiment may use a function for EQUATION 4 that assigns larger values to parameters P7-P12 for data portions with smaller I/O size).

An embodiment in accordance with techniques herein may use models of drive performance to determine whether the performance of the drives in a storage tier is data transfer limited, and the values for P7-P12 may be assigned accordingly as a function of varying I/O size for the different operation types as described elsewhere herein. With scores for the EFD storage tier, there is a preference to have extents in this EFD tier which have higher IOPS of smaller sizes. Therefore, an embodiment may select values for P7-P12 providing a bias or greater weight to a short term or long term metric when the operation type (e.g., RRM, SRM, or W) has smaller expected I/O sizes.

To illustrate how an embodiment may select values for P1-P6 (e.g., operation type weights) for use in the scores for a tier where such values for P1-P6 may depend on the expected storage tier workload characteristics and the particular performance characteristics of the high tier drives, let us again consider the case of a multi-tier storage configuration that includes a storage tier comprised of EFDs. Suppose performance of a particular type of EFD drive is particularly sensitive to the amount of write activity on the drive, with performance degrading for larger amounts of write activity. An embodiment in accordance with techniques herein may take this into account when selecting values for P1-P6. For example, consider a first case where, if the total amount of write workload that may be delivered to the EFD storage tier is light enough to not degrade the performance of the EFD drives, then the scores calculated for the EFD tier may use a small positive (or zero) values for P2 and P5 associated, respectively, with the short term and long term W statistics (e.g., s_w and l_w from EQUATIONS 4 and 5), and relatively large values for P1 and P4 associated, respectively, with the short term and long term RRM statistics (e.g., s_rrm and l_rrm from EQUATIONS 4 and 5), since this allows the greatest number of RRM requests to be packed into available EFD storage. However, consider a second alternative case wherein, if the total amount of write workload that may be delivered to the EFD storage tier is heavy enough to degrade the performance of the EFD drives, then the scores may select lower (e.g., in comparison to those for the first case) or negative values for P2 and P5 associated with the short term and long term W statistics, and yet larger values for P1 and P4 (e.g., larger than in the first case) associated, respectively, with the short and long term RRM statistics. This selection in the second case allows the greatest number of RRM requests to be packed into available EFD storage. An embodiment in accordance with techniques herein may use models of drive performance to determine whether the performance of the drives in a storage tier is write performance limited, and values for P1-P6 may be assigned accordingly.

More generally in connection with selecting values for P1-P6 of the scores, values may be selected depending on how much preference is given to provide better performance (such as better response time) for a particular operation type (e.g., R vs. W, or preference ordering of multiple types RRM, SR, and W). For example, an embodiment may give higher weight to RRM over W since it is more likely that there is an application waiting for the data of the RRM operation to complete before the application can further proceed with processing. An embodiment may give less weight to sequential read (SR) operations than RRM operations. Write operations and associated statistics in the scores may be given the least relative weight because a waiting host or application performing the write may receive an acknowledge that the operation is complete once the write data is written to cache rather than having to wait for data to be read from a physical drive as with any type of read miss operation (e.g., RRM and SR collectively).

As discussed elsewhere herein, policies may be used to determine when to promote data (map the data to a relatively faster tier) and when to demote data (map the data to a relatively slower tier). In particular, one such policy is a data movement policy based on promotion and demotion thresholds that may be determined using promotion and demotion scores for data portions. In an embodiment herein, this may be performed by first determining a score for different portions of a storage space based on relative activity level and then constructing promotion and demotion histograms based on the different scores and the frequency of each. In connection with thin devices, each of the data portions may correspond to a logical extent for which such scores are determined. Exemplary ways in which the promotion and demotion scores may be calculated are described above. The promotion and demotion scores may be used, respectively, in connection with the promotion and demotion histograms described below in more detail. Generally, the scores may be characterized as reflecting the I/O benefit to the host application and cost (e.g., in terms of performance bandwidth) to the targeted storage device tier. In connection with constructing the histogram, all extents are ordered or sorted according to their scores, from highest to lowest. Those extents having the highest scores are generally those preferred to be selected for having storage allocated from the highest performing tier. The histogram is one way in which such scores may be sorted and utilized in connection with techniques herein. It will be appreciated by those of ordinary skill in the art that there are alternative ways to define and compute the scores than as described herein. In one embodiment described herein, the scores may be computed differently for promotion and demotion to reflect the difference in criteria related to data movement into and out of storage tiers.

For purposes of illustration, consider an example of a single SG which may use a group of data devices, and thus physical devices, in three thin device pools—one for each of three storage tiers such as illustrated in FIG. 8A. Workload statistics such as described in connection with FIG. 10 may be computed for each extent and a promotion score may be calculated for each extent in the SG. Also, assume that only thin devices managed in accordance with techniques herein for which data movement may be performed are located in the SG and use the foregoing thin device pools. In this example, the three storage tiers may include a first storage tier of EFDs, a second storage tier of FC rotating disk drives and a third storage tier of rotating SATA disk drives where storage tiers 1-3 are correspondingly ranked highest to lowest as performance tiers.

In connection with techniques herein, assume a first set of promotion scores are determined using a first promotion score having weights or coefficients selected for the first or highest storage tier to be filled, the EFD storage tier. A first promotion histogram described below in connection with FIG. 14 may be produced using the first set of promotion scores for filling the EFD storage tier.

Figure 14:
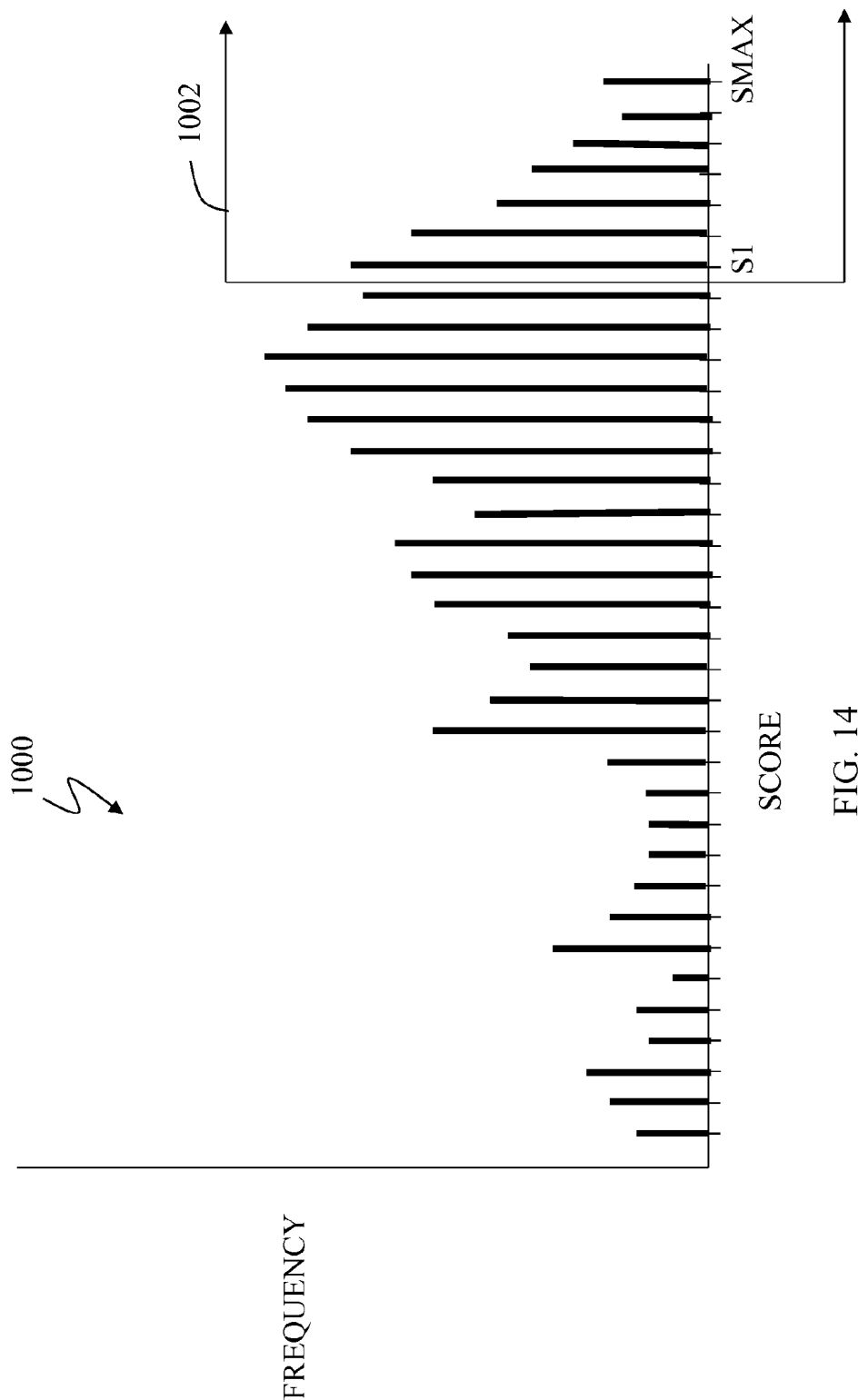

Referring to FIG. 14, a histogram 1000 illustrates a plurality of activity bins (buckets) and the frequency thereof. Each vertical line of the histogram 1000 represents a bin corresponding to a number of data portions (e.g., extents) having the corresponding score. Determination of a score for a data portion is discussed in more detail elsewhere herein. In an embodiment herein, there are five thousand bins. Of course, a different number of bins may be used instead. The height of each bin represents a number (frequency) of data portions having a particular score. Thus, the longer a particular vertical line, the more data portions there are having the corresponding score. Note that the sum of all of the frequencies of the histogram equals the total number of data portions of the system. Note also that the sum of frequencies of a portion between a first score and a second score equals the total number of data portions having a score between the first and second scores. As such, the total capacity allocated for a particular bin assuming a fixed size data portion may be determined as the mathematical product of the frequency of data portions in the bin (of those data portions having allocated storage) and the size of a data portion. If the data portions in a bin may have varying size, then such sizes corresponding to the allocated storage amounts for the data portions may be summed to determine the total capacity of storage allocated for the bin. In a similar manner, the modeled response time (e.g., average) for the total cumulative workload (e.g., total I/Os/second) and optionally also based on I/O size of those data portions may be determined. The histogram 1000 also shows a first range indicator 1002 that corresponds to bins having a score from S1 to SMAX (the maximum score). In the embodiment herein, there are three levels or tiers of physical storage and data portions of the thin device having a score corresponding to the first range indicator 1002 are promoted (mapped) to a highest (fastest) level of storage and data portions having a score corresponding below S1 are mapped to other storage tiers described below. Thus, S1 may represent the promotion score corresponding to the promotion threshold for the first or highest storage tier so that all data portions having a score at or above S1 are promoted to the highest storage tier, or otherwise considered a candidate for such promotion if not already located in the highest storage tier.

In a similar manner, for those extents or data portions which do not have first promotion scores at or above S1, a second set of new promotion scores may be determined whereby each promotion score of the second set is based on a second promotion score using values for P1-P12 selected for the next fastest or second storage tier to be filled (e.g., the FC rotating disk drive tier in this example). As described herein, values for P7-P12 may all be 1 with values for P1-P6 selected as may be determined dynamically or based on fixed values. Based on these new second promotion scores, a second promotion histogram is constructed as described in connection with FIG. 14 with the differences that 1) the scores are the second promotion scores for those data portions not previously mapped to the first storage tier using the first promotion histogram, and 2) the threshold S1 now denotes the promotion score corresponding to the promotion threshold for the second storage tier (next fastest) so that all data portions having a score at or above S1 are promoted to the second storage tier, or otherwise considered a candidate for such promotion if not already located in the second storage tier. Since this example only includes three storage tiers, those data portions having a second promotion score below the threshold are mapped to (stored in) the lowest or third storage tier of SATA drives.

It should be noted that above-noted two promotion histograms of FIG. 14 used in connection with promotion scores and also in connection with demotion histograms such as in FIG. 16 (described below) in connection with demotion scores may include scores for all data portions under consideration or analysis. For example, as described elsewhere herein in connection with other examples, the techniques herein may be performed with respect to a number of storage groups of thin devices having their storage allocated from one or more storage pools so that the thin devices have storage allocated from a set of physical drives. In this case, the histograms may include scores with respect to the foregoing data portions of the number of storage groups under consideration and evaluation with the techniques herein.

It should be noted that an embodiment using a histogram may select a suitable number of bins or buckets and an interval for each such bin. In one embodiment, the size of each bin may be driven by a selected number of bins with each bin having the same size. Additionally, an embodiment may use different techniques in connection with mapping or converting the promotion and demotion scores to indices associated with histogram bins. For example, an embodiment may use linear scaling to set a lower boundary for buckets having an associated index lower than a selected pivot value and may use logarithmic scaling to set a lower boundary for buckets above the pivot. Logarithmic scaling may be appropriate in embodiments having larger scores or a wide range of scores in order to scale the size of scores above the pivot. In such embodiments, the score range associated with a bucket interval above the pivot varies so that a reasonable number of data portions are mapped to the associated bucket. Whether a histogram or other suitable technique is used may vary with the number of buckets, the number of data portions, and the like.

Additionally, it should be noted that rather than have a histogram with frequency on the Y-axis as in FIG. 14, an embodiment may represent the total allocated capacity on the Y-axis of the number of data portions having scores within a particular bin. In other words, the height of the bucket or bin represents the total allocated capacity of the scores mapped to that bin. Other representations are possible besides histograms in connection with determining promotion thresholds and also demotion thresholds as described elsewhere herein in more detail.

In connection with determining the first tier promotion threshold S1 of FIG. 14, processing is performed to map a number of data portions to the highest performing tier in accordance with criteria including a combination of one or more capacity limits and one or more performance limits A capacity limit may be specified for each storage tier for the SG in an AP associated with the SG as described above. Additionally, a capacity limit indicating the physical maximum amount of storage capacity as a physical characteristic of the drives may also be considered since it may be possible in some embodiment to exceed the maximum capacity of the drives prior to exceeding the capacity limits in accordance with an AP. Additionally, one or more sets of performance limits may be specified for each storage tier. In one embodiment, performance limits may be specified in terms of response time for each tier. An embodiment may define one or more sets of predetermined response time performance limits for storage tiers where such sets of response time limits may also referred to as performance or comfort zones. Each set contains a response time limit for each storage tier that may be the target of promotion. In one embodiment, limits are not specified for the bottom tier. In one embodiment, seven comfort zones may be specified where each zone includes a response time limit for the first highest performing storage tier, such as flash-based tier, and the second highest performing tier, such as FC disk drives. For example, the following response time performance limits may be specified for seven comfort zones in the embodiment having 3 storage tiers:

| Comfort Zone | EFD/flash Response Time (ms) | FC disk Response Time (ms) |
| --- | --- | --- |
| 1 | 1 | 6 |
| 2 | 2 | 10 |
| 3 | 3 | 14 |
| 4 | 4 | 18 |
| 5 | 6 | 25 |
| 6 | 8 | 40 |
| 7 | 10 | 50 |

Of course, an embodiment may provide any number of comfort zones more or less than seven and for a different number of storage tiers. Additionally, the foregoing values are exemplary and may vary with technology, drive vendor, and the like. Generally, values specified as the performance limit metrics, such as response times, may vary with the workload and/or other workload characteristics (such as I/O size) of a particular system and may be determined in any suitable manner. For example, values for the foregoing metrics may be made based on knowledge regarding particular workload of a system and typical performance of drives of different storage tiers in a system. In this manner, limits specified may be realistic and in accordance with typical workload performance within a system. It should be noted that the foregoing limits may also be selected based on end user performance requirements. Additionally, as noted elsewhere herein, although response time is used as the workload or performance metric in connection with the foregoing comfort zones, other performance criteria metrics may be used in combination with, or as an alternative to, response time. For example, an embodiment may use utilization as a metric in a manner similar to response time in connection with techniques herein. That is, just as comfort zones include response time limits for storage tiers, comfort zones may include other criteria such as a utilization for each storage tier. As known in the art, utilization of a resource, such as a physical drive or with respect to physical drives of a storage tier, may be defined as a metric measuring an amount of time a device is utilized or in a non-idle state. For example, utilization for a storage tier may be represented as a percentage (e.g., based on a ratio of an amount of time the physical devices of the storage tier are in the non-idle state/total amount of time). The foregoing utilization metric may represent the average utilization for a storage tier determined over a period of time.

Generally, processing may be performed to determine a set of promotion thresholds for the different storage tiers (e.g., S1 of FIG. 14) in accordance with criteria including capacity limits and a set of performance limits for a single comfort zone. In connection with the above-mentioned first promotion histogram used when mapping data portions to the first or EFD storage tier, processing traverses the first promotion histogram, from highest score to lowest score, mapping data portions to the first storage tier until either the capacity limit for the first storage tier is reached or until the response time performance limit for the first storage tier is reached. Similarly, in connection with the above-mentioned second promotion histogram used when mapping data portions to the second of FC storage tier, processing traverses the second promotion histogram, from highest score to lowest score, mapping data portions to the second storage tier until either the capacity limit for the second storage tier is reached or until the response time performance limit for the second storage tier is reached.

For each storage tier, a performance counter is maintained indicating a modeled current I/O processing rate (e.g., total TOPS) and associated modeled response time based on those data portions currently mapped to the storage tier. As described elsewhere herein, performance curves such as illustrated in FIGS. 13 and 13A-13E may be used in modeling current performance for each storage tier based on data portions currently mapped to the storage tier when traversing the histogram scores. As each bucket or bin of the histogram has its data portions mapped to the first storage tier, the performance counter (indicating an updated modeled tier RT) is updated to reflect the modeled performance for the first storage tier as also including the additional data portions of the bucket now newly mapped to the first storage tier. For example, as a bucket of data portions is mapped to the first storage tier, the performance or workload information attributed to the newly added data portions in combination with those data portions already mapped to the first storage tier may be input to the appropriate storage tier performance model to determine a modeled aggregate response time. For example, as described above, one disk performance model for SATA and FC disk drives may use as the following as modeling inputs—total number of I/Os (e.g., used to determine the number of I/Os per second or other unit of time) and I/O size (or average I/O size of the total number of I/Os considered)—as collected or observed for the data portions. With these modeling inputs for the aggregated data portions mapped to the first storage tier, the modeling technique may use performance curves to determine an estimated or modeled response time for the physical storage devices in the storage tier based on the aggregate workload of the existing data portions currently mapped to the first storage tier and the additional data portions now also mapped to the first storage tier. In a similar manner, processing may track the current amount of storage of the first tier consumed via the mapping so far. After each bucket of data portions is additionally mapped to the first storage tier to hypothetically represent or model movement of such data portions to the first storage tier, a determination may be made as to whether any of the capacity limits or the response time performance limit for the first tier has been reached or exceeded. If so, the score associated with the current bucket is the promotion threshold. Thus, all data portions in buckets higher than the current bucket (e.g., scores exceeding that of the current bucket) are candidates for promotion to the first storage tier. It should be noted that in connection with the foregoing promotion threshold, the score used as the promotion threshold may be the upper limit of the bucket interval (e.g., score range) for the current bucket at which at least one of the capacity limits or response time performance limits was exceeded during histogram traversal.

In connection with response time performance modeling for a storage tier, as described elsewhere herein with thin devices, the additional I/Os associated with the data portions being added (via mapping) to a storage pool of a particular storage tier may be modeled as being evenly distributed across drives of the storage pool. In the simplified example described herein with only a single storage pool, the modeled storage pool response time is also the modeled storage tier response time. In the event of multiple storage pools in a single tier where all such pools are used by the SG, an embodiment may choose to evenly distribute the added I/O operations across all drives of the storage pool. As described elsewhere herein, a simplifying assumption is that there are no other consumers of the storage tier capacities than those thin devices under device management using the techniques herein. In the event that there are other types of devices having associated data stored on the storage tiers, the amount of storage consumed and the workload of such device may be considered when determining whether capacity and performance limits have been reached. It should be noted that the even distribution modeling as described above may reflect that which is actually performed by the storage tiers and devices therein being evaluated in connection with thin device storage allocation. If an embodiment allocates thin device storage in a different manner, then such modeling should reflect that which is performed in the embodiment.

In a similar manner, a promotion threshold for the second storage tier is determined by performing processing as described above for the first tier with the difference that the processing is performed for the second storage tier until either the capacity limits or response time performance limit of the first zone are reached for the second storage tier. The foregoing capacity limits and response time performance limits vary with each storage tier. Processing that maps data portions to the second storage tier resumes with the second promotion histogram including new second promotion scores for those unmapped data portions from the previous storage tier processing (e.g., those data portions of the first promotion histogram having first promotion scores below the first storage tier promotion threshold). In this manner, data portions which were not mapped to first tier storage are automatically considered for mapping to storage in the next highest tier. At the end of the second storage tier processing for the current zone, the second storage tier promotion threshold is determined.

Figure 15:
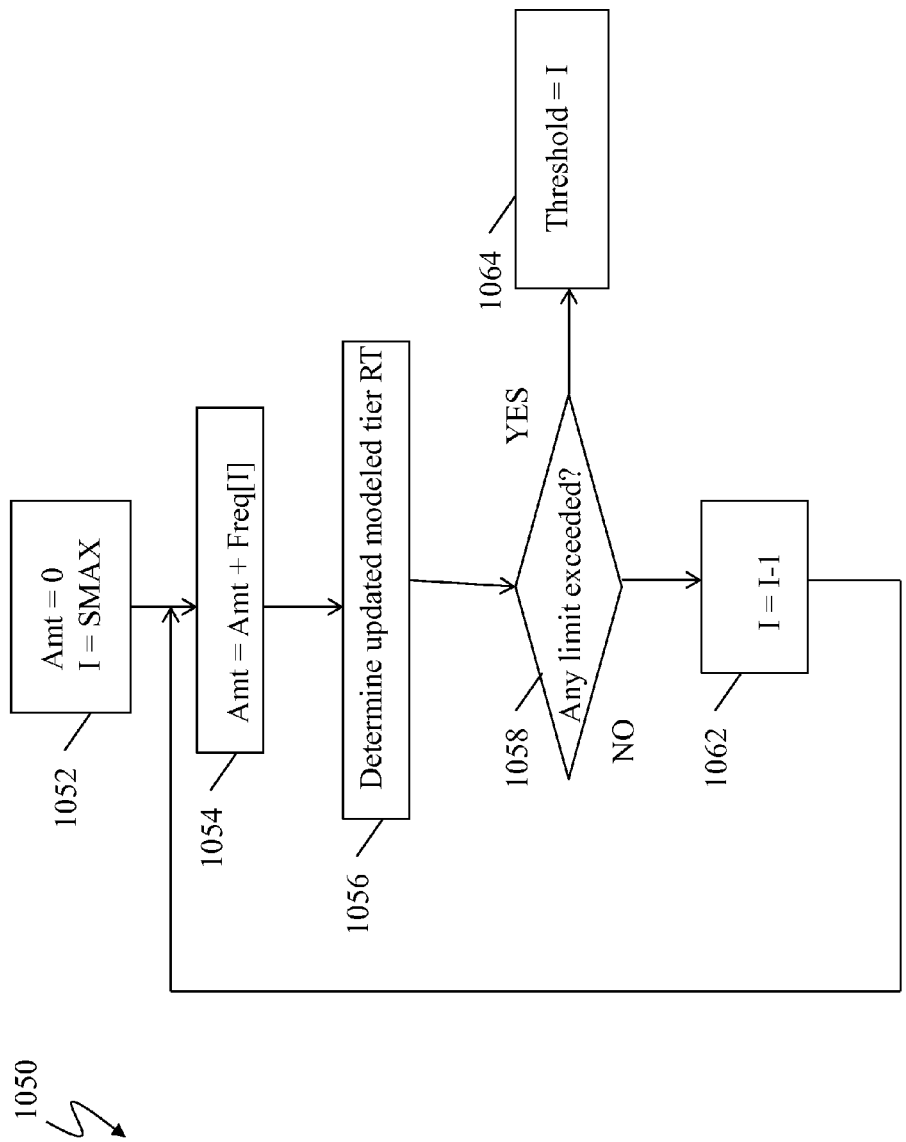

Referring to FIG. 15, shown is a flowchart of steps summarizing processing as described above in connection with determining a single promotion threshold for a single target tier using criteria including capacity limits and comfort zone response time limits for the target tier as specified in a single zone of performance limits. Thus, flowchart 1050 may be executed twice to determine, for the first zone, the two promotion thresholds described above respectively for the first and second storage tiers using the first and second promotion histograms.

At step 1052, initialization processing is performed. Step 1052 includes initializing a variable, AMT, that keeps track of the amount of storage portions to zero. Step 1052 also includes initializing an index variable, I, to the maximum score (highest bin). In an embodiment herein, there are five thousand bins, so I would be set to five thousand at the step 1054. Of course, other numbers of bins are also possible. Following step 1052 is step 1054 where AMT is incremented by FREQ[I], the amount of data mapped to bin I. Following the step 1054 is step 1056 where an updated modeled tier RT (response time) is determined. At step 1058, a determination is made as to whether any of the capacity limits and/or response time performance limit for the current tier have been exceeded. Step 1058 may include comparing the updated modeled tier RT to the response time performance limit for the current zone and current target promotion tier. Step 1058 may include comparing the current amount of capacity of the target tier consumed via the modeled mapping represented by AMT to the AP capacity limit. As described elsewhere herein, the total capacity consumed across one or more bins may be determined based on the cumulative frequencies of those bins and the amount of allocated storage of the data portions in the foregoing one or more bins. Step 1058 may include comparing the current amount of capacity of the target tier consumed via the modeled mapping represented by AMT to the SG capacity limit such as may be based on the physical drive capacity limits. If it is determined at the test step 1058 that none of the established limits have been exceeded, then control passes from the test step 1058 to a step 1062 where the index variable, I, is decremented. Following the step 1062, control passes back to the step 1054 for another iteration. If any one or more of the foregoing limits are exceeded, step 1058 evaluates to yes and control proceeds to step 1064 where a score threshold is assigned the value of I. Data portions having a score of I or higher are promoted to the highest level of storage. Following the step 1064, processing is complete.

The methodology for determining score values used to map data portions (indicating promotion candidates) to one or more intermediate storage levels may be similar to that described above in connection with the flow chart 1050. In the case of second and third intermediate storage levels in this current embodiment with 3 storage tiers though, processing may be performed with respect to the second promotion histogram. In an embodiment having more than three storage tiers, new promotion scores and an associated new promotion histogram may be computed for a next lower storage tier as may be needed depending on whether a new promotion score is used.

If a same set of promotion scores is used for determining promotion for two storage tiers, the same promotion histogram may be used. For example, consider a case where there are 4 storage tiers—EFD and three storage tiers of rotating disk drives. A first set of promotion scores and a first promotion histogram may be used as described above to determine which data portions are mapped to the EFD tier. The first histogram may be based on first promotion scores having values calculated with weights P1-P12 selected for the particular EFD tier. Next, a second set of promotion scores may be calculated using a second promotion score different from that used in determining the first histogram. The second histogram may be based on second promotion scores having values calculated with new weights P1-P12 selected whereby P7-P12 may be 1 and P1-P6 may be a suitably selected. With reference to FIG. 14A, shown is the second histogram whereby S2 denotes a promotion threshold score for the second tier and S3 denotes a promotion threshold score for the third storage tier. In this case, when determining data portions mapped to the third storage tier, the index variable I would be initialized to a score that is one less than the lowest score of the next highest storage level, the second storage tier. For example, if storage portions having a score of 4500 to 5000 are assigned to the second storage level, then the index variable, I, would be initialized to 4499 in connection with determining scores for the third storage level just below the second storage level.

Once promotion threshold processing has completed for the current zone, demotion threshold processing is performed as will now be described.

Figure 16:
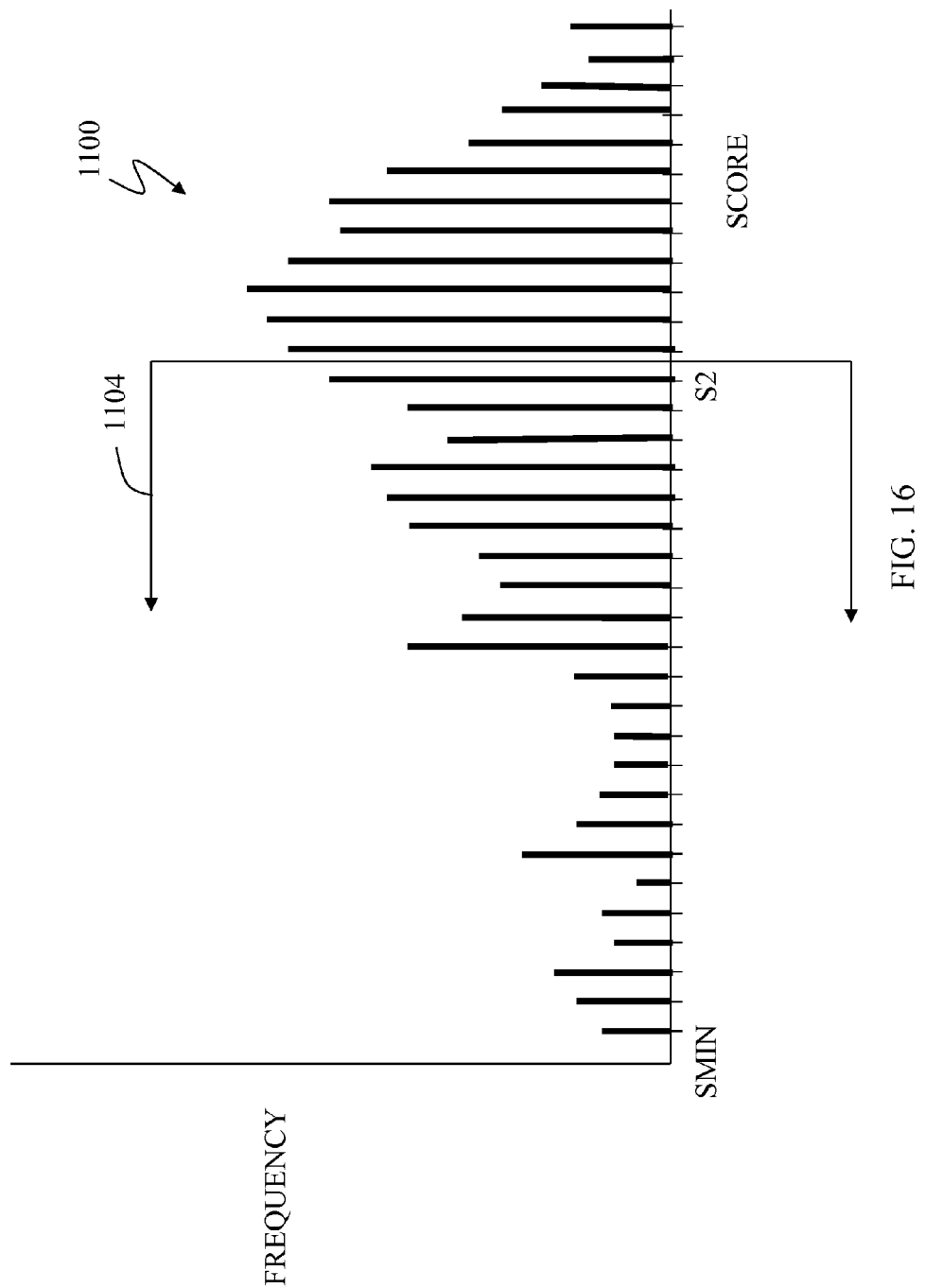

Referring to FIG. 16, shown is a demotion histogram 1100 similar to the histogram 1000, discussed above which illustrates a plurality of scores and the frequency thereof. The histogram 1100 may be used to determine which of the data portions (if any) may be demoted (e.g., mapped to relatively slower physical storage). In some embodiments, the histogram 1100 may be identical to the histogram 1000. In other embodiments, the histogram 1100 may be different than the histogram 1000 because the scores for the histogram 1000 used for promotion may be different than the scores for the histogram 1100 used for demotion. Determination of promotion and demotion scores is discussed in more detail elsewhere herein.

In one embodiment including three storage tiers—EFD, FC rotating disk drives and SATA disk drives—as described above, a first demotion histogram 1100 may be determined for the EFD storage tier. In a manner similar to that as described above for a first set of promotion scores for the EFD tier, a first set of demotion scores may be determined for the EFD storage tier using first demotion scores having weights P1-P12 selected for the particular EFD storage tier. In the example 1100 of FIG. 16, shown is a first range indicator 1104 denoting that data portions have demotion scores less than S1 may be demoted (mapped) from the EFD first storage tier to one of the remaining two lower or slower storage tiers of physical storage.

Subsequently a second demotion histogram may be determined using those data portions which have demotion scores from the first histogram less than S1. In other words, those data portions having demotion scores less than S1 are demoted from the EFD storage tier but now a determination may be made as to which storage tier such demoted data portions are located—the FC or the SATA storage tiers. For those data portions demoted from the EFD storage tier, second demotion scores may be determined for use with a second demotion histogram. The second demotion histogram may be based on second demotion scores having weights P1-P12 selected for the second storage tier of FC rotating disk drives in this example. Thus, the second histogram is similar to the first histogram with reference to FIG. 16 with the differences that 1) S1 represents a second demotion threshold whereby all data portions have a demotion score less than S1 are demoted to the third or lowest storage tier and those data portions having a demotion score more than S1 are mapped to the second storage tier and 2) S1 represents the demotion threshold for the second storage tier.

In an embodiment, the demotion threshold for a tier may be determined in any suitable manner. For example, on embodiment may select a demotion threshold with respect to demoting a data portion from a storage tier based on the threshold score determined as the promotion threshold for the storage tier. The demotion threshold may be selected as a score that is the same or lower than the promotion threshold. For example, the demotion threshold may be determined using a constant factor by which the promotion threshold for the same storage tier is multiplied. (e.g. promotion threshold for a tier=1.2*demotion threshold for a storage tier). The foregoing may introduce a stationary zone between the promotion and demotion thresholds for a tier where scores falling this stationary zone are neither promoted or demoted with respect to the storage tier. Introduction of the stationary zone may serve as one mechanism that may be included in an embodiment to limit thrashing with respect to repeatedly promoting and then demoting the same data portions having scores which border the promotion or demotion threshold for a storage tier. The demotion threshold may be selected so that it is always equal to or less than the storage capacity for the SG as may be specified in an associated AP.

In an embodiment herein, the processing performed for demoting data portions (extents) may be similar to processing described in connection with FIG. 15 with the difference that processing may be reversed so that, for example, the portions to be demoted to the lowest level of storage may be determined prior to higher storage tiers by initially beginning with setting I in step 1052 to SMIN and incremented in each iteration. In such an embodiment, storage capacity limits and/or performance limits may be utilized as may be provided in connection with an embodiment. For example, an embodiment may not provide performance limits for the lowest/slowest performing tier but may provide such limits for other tiers. In this case, an embodiment may determine demotion thresholds based on the criteria provided (e.g., if performance limits are not provided for the third storage tier (e.g., slowest) then only capacity limits may be used for the third storage tier.

In some embodiments, when a data or storage portion (e.g., an extent) is selected for promotion, only active subportions (e.g., subextents) are promoted while inactive subportions remain at their current storage level. In an embodiment herein, a subportion is considered active if it has been accessed in the previous 4½ days and is considered inactive otherwise. Of course, other appropriate criteria may be used to deem subportions either active or inactive. In some embodiments, when a data portion (e.g., an extent) is selected for demotion, the entire storage portion may be demoted, irrespective of activity level of subportions. In addition, in some embodiments, appropriate mechanism(s) may be provided to reduce the amount of data that is demoted so that more data is maintained on relative faster physical storage devices. Each extent may be evaluated for promotion first as described above and then for demotion if it has not otherwise qualified for promotion. If an extent does not qualify for promotion or demotion, then no data movement is modeled for the extent and subsequently the extent is also not a candidate for data movement with respect to a set of criteria (e.g., capacity limits and performance zone limits) currently being evaluating through modeling using techniques herein. It should be noted that an extent that qualifies for promotion may not then subsequently be a candidate for demotion. Thus, a candidate that qualifies first for promotion may then be removed as a possible demotion candidate.

After processing is performed for the first and second storage tiers to determine promotion and demotion thresholds using capacity limits and the first zone's performance limits, an overall performance metric for the SG using the physical drives of the storage tiers just processed is determined. In one embodiment, this performance metric may be the modeled average response time (RT) for the SG across all storage tiers just processed and may be represented in EQUATION 6 as:

$$\text{Average RT} = (1/\text{Total I/Os per second}) * \Sigma \text{ALL\_TIERS}$$
$$(\text{RT of tier} * \text{I/O operations per second for the tier})$$

In EQUATION 6, "Total I/Os per second" is the total number or aggregate of I/Os per second across all physical devices of the SG, "$\Sigma$ALL_TIERS" is the mathematical summation of the product represented by "(RT of tier*I/O operations per second for the tier)". It should be noted that the "RT of tier" may represent the average response time of physical devices in a particular tier. Additionally, EQUATION 6 may generally be determined with respect to all SGs and devices thereof currently being evaluated using the techniques herein. The foregoing Average RT may serve as an overall metric regarding performance of the entire SG across all storage tiers considered to determine whether the modeled performance using the response time limits for the first zone is preferable over other response time limits of another zone. The foregoing EQUATION 6 is a weighted average response time calculation that considers the number of I/Os with a given response time. Alternatively, an embodiment may compute an average RT including separate weightings related to technology type. It should be noted in connection with computing the average RT for the SG using EQUATION 6, the RT for each storage tier of the SG is utilized. This RT for each storage tier may be the last modeled RT computed during the histogram traversal as a result of performing promotion and demotion threshold determination and modeling the performance of such proposed data movement candidate data portions. It should be noted that if other criteria, such as utilization, are used in addition to or as an alternative to RT, then an embodiment may compute an overall or average metric across all storage tiers similar to as described above with EQUATION 6. For example, if zones of performance limits are defined for utilization limits for the storage tiers, then a metric for computing average utilization across all storage tiers of devices being evaluated may be used to represent the overall performance criteria used in selecting a set of performance limits in combination with capacity limits, and also the associated promotion/demotion thresholds.

In a similar manner as just described for the first set of performance limits of the first zone, processing is also performed for the next zone 2 (e.g., using the second set of performance limits). Thus, promotion thresholds and an average RT using EQUATION 6 are produced as a result of processing in accordance with capacity limits in combination with performance limits of each zone. After each zone is processed for candidate promotion and demotion thresholds, a determination may be made as to whether to stop further evaluating remaining zones. Such a determination may be made by comparing a first value for the average RT determined using EQUATION 6 for a current zone with second value for the average RT determined using EQUATION 6 for the previously processed zone. For example, after determining promotion and demotion thresholds using zone 1 performance limits in combination with capacity limits (zone 1 scenario) and then zone 2 performance limits in combination with capacity limits (zone 2 scenario), the average RT associated with the zone 1 scenario may be compared to the average RT associated with the zone 2 scenario. If the average RT for zone 2 scenario does not indicate a sufficient or threshold level of improvement over the average RT for zone 1, then no further zones may be evaluated. An embodiment may define a threshold value that represents the minimum amount of improvement expected in order to continue evaluating further zone 1-5 scenarios (e.g., determining promotion and demotion thresholds using capacity limits and performance limits for subsequently defined zones). An embodiment may determine a difference in metric values obtained for the average RT for the two zone scenarios to be compared. An improvement between zone scenarios may be determined if there is decrease in the average RT (e.g., lower average RT means better overall performance). This decrease may be larger than the threshold in order for a sufficient level of improvement to be determined. Alternatively, an embodiment may set the threshold value to zero so that any decrease in average RT between scenarios is considered sufficient improvement to proceed with evaluating further zone performance limits in combination with capacity limits.

It should be noted that if one of the capacity limits has been exceeded on a preceding iteration of processing for the prior zone, processing using subsequent zones stops. The processing described herein assumes that the lowest storage tier has sufficient capacity to accommodate storage for any data portions not mapped to the other storage tiers.

Figure 17:
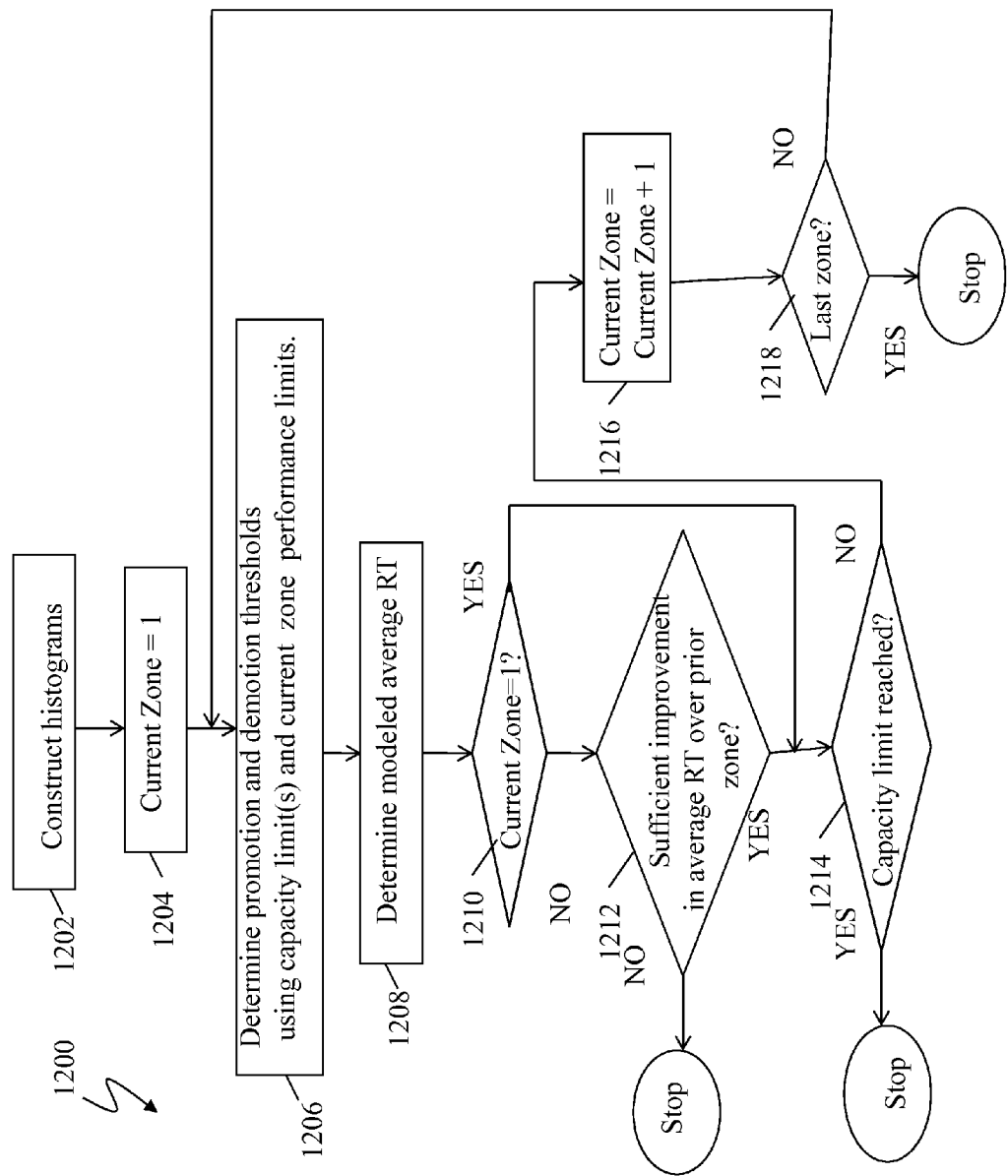

Referring to FIG. 17, shown is a flowchart 1200 of steps that may be performed in an embodiment in evaluating and modeling performance for different performance limits in combination with capacity limits in an embodiment in accordance with techniques herein. The steps of 1200 summarize processing described above. At step 1202, one or more histograms may be constructed. In step 1204, current zone is set to 1 in connection with commencing processing for the first zone's performance limits. At step 1206, promotion and demotion thresholds are determined in accordance with the capacity limits and performance limits of the current zone. Selection of such thresholds is followed by modeling proposed data movements and determining modeled RTs for all storage tiers for the one or more SGs. At step 1208, the modeled average RT is determined as an overall performance metric across all storage tiers for the one or more SGs. At step 1210, a determination is made as to whether the first zone is currently being processed. If so, control proceeds to step 1214. Otherwise, control proceeds to step 1211 where a determination is made as to whether there has been sufficient improvement with respect to the modeled average RT values for the current zone scenario and the previous zone scenario. If step 1212 evaluates to no, processing stops. If step 1212 evaluates to yes, control proceeds to step 1214 where a determination is made as to whether the capacity limit has been reached. Step 1214 may examine any one or more capacity limits defined such as, for example, capacity limits (e.g., per storage tier, overall SG capacity limits, and the like) as may be defined in an AP, physical limits of drive capacities, and the like. If any one of these capacity limits has been exceeded, step 1214 may evaluate to yes and processing may stop. If step 1214 evaluates to no, control proceeds to step 1216 to increment current zone to the next zone. At step 1218, a determination is made as to whether this is the last zone. If so, processing stops. Otherwise, control proceeds to step 1206.

It should be noted that FIG. 17 illustrates only one particular way in which the performance limit criteria and capacity limit criteria may be used in connection with selecting promotion and/or demotion thresholds based on stopping criteria. An embodiment may vary the stopping criteria. For example, an embodiment may perform the foregoing evaluation of all zones of performance limits and capacity limit(s) and determine an average RT value across all storage tier using EQUATION 6, for each such zone, without consideration of the stopping criteria at steps 1212 and/or 1214 and then select the performance zone limits resulting in the best relative average RT across all storage tiers. As another variation, an embodiment may terminate processing and evaluation of subsequent performance zone limits upon finding a first such zone having performance limits that results in a modeled average RT that is above a defined threshold. Thus, an embodiment in accordance with techniques herein may vary the stopping criteria specified in connection with FIG. 17.

Once processing as described in FIG. 17 is completed, the promotion and demotion thresholds associated with the zone having performance limits resulting in the minimum average RT may be selected for implementation in connection with actually performing the previously modeled data movements. This is described and summarized now with reference to FIG. 18.

Figure 18:
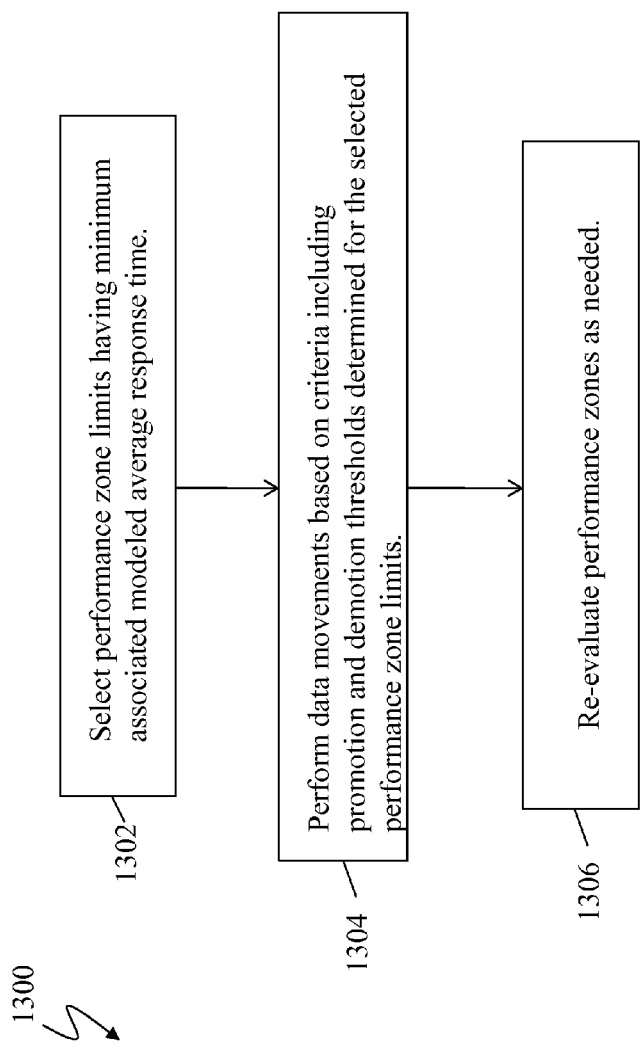

With reference to FIG. 18, at step 1302, performance zone limits are selected having the minimum associated average response time as modeled. It should be noted that if other performance criteria and associated limits, such as in connection with utilization limits described elsewhere herein, is utilized, step 1302 may include considering other overall performance metrics besides the average response time across all storage tiers. For example, an embodiment may also consider the overall average utilization across all storage tiers. If the embodiment utilizes more than one overall performance metric, then step 1302 may include evaluating the combination of the overall performance metrics. For example, an embodiment may weight each overall performance metric in connection with step 1302 to select a particular performance zone and associated limit criteria. At step 1304, data movements (e.g., promotion and demotions for the multiple storage tiers) may be performed based on criteria including the promotion and demotion thresholds determined for the selected performance zone limits of step 1302. In step 1306, performance zones may be re-evaluated as needed using techniques described herein. Additionally, the response time limits of the performance zones may also be modified as needed to adjust for any workload changes in the system. In other words, as described elsewhere herein, the performance zones defined should set forth reasonable response time limits based on workload of the system being evaluated. The performance zones may set forth response time criteria that varies as the system workload may vary in order to appropriately and automatically adjust response time limits to accommodate for such variations in workload dynamically. It should be noted that the re-evaluation at step 1306 may be performed in response to an occurrence of any suitable event. For example, such re-evaluation may be performed periodically (e.g., upon the occurrence of a predefined time interval), in response to measured or observed system performance reaching a threshold level (e.g., when the measured or monitored response time of the data storage system reaches a defined threshold level), in response to a user's manual selection, and the like.

For purposes of simplification, examples above considered a single SG. An embodiment may evaluate multiple SGs in combination if they share physical devices or defined pools of devices so that there is a dependency in that they utilize the same data storage resources. Additionally, there may be other consumers of the physical devices beside those under management of an optimizer or other component using the techniques herein for data movement. For example, there may be devices which not under management of such a component performing data movement using techniques herein for any one or more reasons. When considering the performance limits of storage tiers, an embodiment may determine a performance baseline associated with such devices representing the workload of such devices in the system since such devices may be viewed as having consumed or utilized a portion of the allowable performance limits. The performance baseline may be defined as disk utilization or a response time value that a physical storage device or drive would have if the drive only hosted data storage for devices that are not under management by a component using the techniques herein. In one embodiment this may include those portions of thin devices which may not be moved between physical devices such as between storage tiers. An embodiment may determine the baseline performance in any suitable manner for unmovable thin devices. For example, an embodiment may determine the data or thick devices included in a thin device pool servicing the thin device and obtain performance data for each such data device in the thin pool. There is an assumption that the embodiment provides for an distribution of workload within pool data devices. Performance data may be obtained for each moveable thin device using the thin device pool where such performance data indicates the thin device workload as distributed over data devices of the thin pool. For each such data device, the workload associated with unmovable thin devices may be determined by subtracting the distributed movable thin device workload associated with the data device from the observed workload of the data device. In other words, for a data device, the workload of the data device attributable to the moveable thin device is subtracted from the total workload of the data device. The result of the foregoing is an estimate of the data device workload attributable to non-moveable thin device portions.

In connection with the defined performance or comfort zones described herein, it should be noted that such zones are determined for the particular resource or service that may be consumed or utilized. In a similar manner, zones may be defined and evaluated in connection with other resources or services which are consumed or utilized in the data storage system. For example, zones and performance modeling variations may be modeled in connection with varying the amount of cache where cache limits may be placed on data cached for particular thick or data devices, thin devices, and other entities which consume cache. As another example, zones of performance limits may be specified for varying performance limits related to one or more DAs that service physical data storage devices. In a similar manner as described herein for storage tiers of physical devices, different performance criteria may be specified in terms of performance zones of limits. For example, with respect to DAs, utilization may be used as a performance metric for which comfort zones are defined.

In connection with avoiding thrashing, described herein are several techniques that may be utilized such as related to using weighting of long term and short term metrics (e.g., FIG. 10) and using a stationary zone between demotion and promotion thresholds for a storage tier. An embodiment may use different techniques to avoid large changes in promotion and demotion thresholds selected and utilized in successive time periods. An embodiment may determine a running average with respect to promotion and/or demotion thresholds determined using the techniques herein and use the running average as the actual threshold when implementing data movements. The running average of promotion and/or demotion thresholds may be determined, for example, over a period of time, or using N previous threshold values. An embodiment may also increase the number of performance zones evaluated.

It should be noted that the criteria which is evaluated using techniques herein may include capacity limits and performance limits. The processing performed herein provides for adaptive tier overloading protection by allowing the system to automatically select from different sets or zones of performance limits as system workload changes. The particular performance limit criteria of response time specified for each tier in each zone is only an example of a performance limit criteria that may be used in an embodiment. For example, performance limit criteria may use one or more other metrics other than response time, such as I/O processing rate (e.g., number of I/Os/second), #reads/second, #writes/second, service time, queue waiting time or wait time, length and/or number of wait queues, and the like. These one or more other metrics may be used alone or in combination with response time limits. Furthermore an embodiment may associate a different weighting factor with each of the different metrics included in performance limits specified for a zone. The weights used for each of the different metric may vary with performance zone. Furthermore, the actual metrics may also vary with performance zone. For example, it may be that for a first zone, a particular response time limit is being evaluated and other performance limit criteria is also included for evaluation. This additional performance limit criteria (e.g., an additional metric) may not considered in evaluation with other response time limits of other zones.

Furthermore, the particular overall metric of average response time used to select between evaluated performance zones may vary in an embodiment from what is described herein. For example, an embodiment may use a different metric other than average response time, or may use the average response time metric, alone or in combination with, other overall performance criteria to evaluate and select between performance zone limits. For example, as described elsewhere herein, an embodiment may also use utilization as the performance metric, alone or in combination with, response time. In such an embodiment, comfort zones of utilization values may be specified and an average utilization may be determined across all storage tiers in a manner similar to calculating and using average response time in EQUATION 6. Utilization may also be modeled in a manner similar to response time as described, for example, in connection with FIGS. 13 and 13A-13E (e.g, use modeled utilization curves with I/Os per second on the X-axis and utilization on the Y-axis as may be determined through observed and collected data).

Described above are techniques where performance limits and capacity limits are included in the criteria used to determine when limits of a storage tier have been reached. The above-mentioned criteria may include performance limits alone, or performance limits in combination with capacity limits. Furthermore, the above-mentioned criteria used in connection with comfort zones may include capacity limits alone without performance limits.

As another simpler variation of the techniques herein with the promotion and demotion scores, an embodiment may rather not evaluate multiple alternatives or comfort zones and may rather consider a single set of limits or criteria including limits that may be based on performance limits as described above (e.g., response time) in combination with capacity limits, performance limits alone, or capacity limits of the different storage tiers alone without performance limits in connection with determining data portions such as extents stored in the various storage tiers. Described below is processing for an embodiment using capacity limits alone. However, other above-noted criteria (e.g., performance limits alone or in combination with capacity limits) may be used in connection with such processing. For example, consider an embodiment including three storage tiers—a first tier of SSD or EFD devices and second and third tiers of rotating disk drives. The second tier may be, for example, FC 15K RPM drives and the third tier may be, for example, SATA drives. The three storage tiers may be ranked from first to third, in terms of performance, from highest to lowest accordingly. When evaluating which data portions may be stored on, or moved to, the first highest performing tier of EFD drives, promotion scores for extents as described above may be determined. Values for P1-P12 may be selected based on the expected storage tier workload characteristics and performance characteristics of the EFD drives as described elsewhere herein. For determining which extents may be mapped to the EFD storage tier, values of P7-P12 may be selected, for example, based on the expected I/O sizes for the particular EFD drives. Values for P1-P6 may also be selected, for example, based on the expected amount of write activity to account for the fact that performance of the EFD devices degrades with larger amounts of write activity. In a similar manner, demotion scores may be determined for the extents as described above. A first promotion histogram may be formed as described above in connection with FIG. 14 for evaluating which extents may be stored in the EFD storage tier as the target tier. Processing as described in FIG. 19 may be performed to determine which extents may be stored in the first EFD storage tier based on the scores and capacity limit of the EFD tier.

Figure 19:
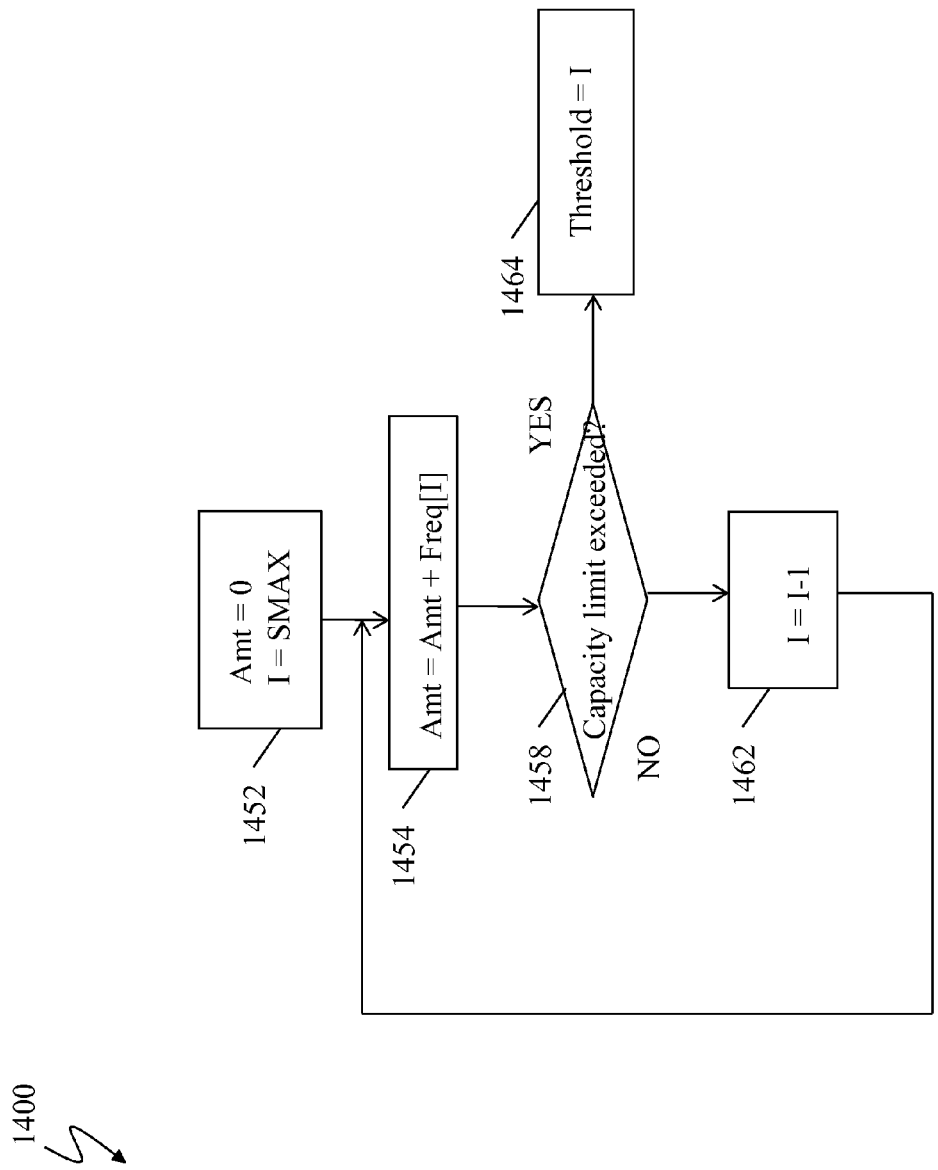

Referring to FIG. 19, shown is a flowchart of steps summarizing processing as described above in connection with determining a single promotion threshold for a single target tier using criteria including capacity limits for the target tier. At step 1452, initialization processing is performed. Step 1452 includes initializing a variable, AMT, that keeps track of the amount of storage portions to zero. Step 1452 also includes initializing an index variable, I, to the maximum score (highest bin). In an embodiment herein, there are five thousand bins, so I would be set to five thousand at the step 1452. Of course, other numbers of bins are also possible. Following step 1452 is step 1254 where AMT is incremented by FREQ[I], the amount of data mapped to bin I. Following the step 1454 is step 1458 where a determination is made as to whether the capacity limit for the current EFD tier have been exceeded. Step 1458 may include comparing the current amount of capacity of the target tier consumed via the modeled mapping represented by AMT to the AP capacity limit. As described elsewhere herein, the total capacity consumed across one or more bins may be determined based on the cumulative frequencies of those bins and the amount of allocated storage of the data portions in the foregoing one or more bins. Step 1458 may include comparing the current amount of capacity of the target tier consumed via the modeled mapping represented by AMT to the SG capacity limit such as may be based on the physical drive capacity limits. If it is determined at the test step 1458 that the established capacity limit has been exceeded, then control passes from the test step 1458 to a step 1462 where the index variable, I, is decremented. Following the step 1462, control passes back to the step 1454 for another iteration. If the capacity limit is exceeded, step 1458 evaluates to yes and control proceeds to step 1464 where a score threshold is assigned the value of I. Data portions having a score of I or higher are promoted to the highest level of storage. Following the step 1464, processing is complete for the first storage tier, the EFD storage tier.

Once the foregoing of FIG. 19 is performed for the EFD or first storage tier using the first promotion histogram whereby a first EFD promotion threshold is determined, new promotion scores may be determined for the remaining extents not placed in the first EFD storage tier in connection with FIG. 19 processing. In other words, FIG. 19 processing determines which extents include the highest ranked promotion scores of the first promotion histogram where such promotion scores may have coefficients selected for the particular EFD storage tier. Such highest ranked extents may be included in the EFD storage tier up to the capacity limit of the EFD storage tier such as may be specified for the SG. Subsequently, new second promotion scores are determined for the remaining extents where the new promotion scores may have different values selected for the coefficients P1-P12 for the second storage tier. The second promotion scores may use values of 1 for coefficients P7-P12 and may select other suitable values for P1-P6 as described elsewhere herein for the second storage tier.

Based on these second promotion scores, a new second promotion histogram as described in FIG. 14 may be formed and used in connection with determining which extents may be promoted or mapped to second storage tier. To determine which extents may be stored in the second storage tier based on the capacity limits of the second storage tier, processing steps of FIG. 19 may be again performed using the second promotion histogram. In this manner, those extents of the second histogram having the highest promotion scores may be stored in the second storage tier up to the capacity limit of the second storage tier. The remaining extents may be placed in the third storage tier.

Once promotion processing has completed, demotion threshold processing may be performed in a manner similar to that as described elsewhere herein with the difference that only capacity limits are utilized where applicable.

In a manner similar to that as described for criteria including only capacity limits to determine a mapping between data portions and physical storage locations on different storage tiers, such criteria may alternatively include, for example, performance limits in combination with capacity limits, or performance limits alone.

It should be noted that although the techniques described herein are used with thin devices providing virtual storage provisioning, the techniques herein may also be used in connection with other types of devices such as those not providing virtual provisioning.

Described above are different techniques that may be performed by an optimizer, for example, such as the optimizer 138 with reference back to FIG. 3. As described herein the optimizer may perform processing of the techniques herein to determine how to allocate or partition physical storage in a multi-tiered environment for use by multiple applications. The optimizer may perform processing such as, for example, to determine what particular portions of thin devices to store on physical devices of a particular tier, evaluate when to migrate or move data between physical drives of different tiers, and the like. In connection with above-mentioned descriptions, embodiments are described whereby the optimizer may be included as a component of the data storage system, such as a data storage array. In such embodiments, the optimizer may perform optimizations, such as the data movement optimization, with respect to physical devices of a single data storage system such as a single data storage array.

What will now be described are embodiments for performing optimizations as described herein such as the data movement optimization but with the variation that the optimizer, or more generally, the one or more components performing the optimization processing, are physically located in another component other than the data storage system. In other words, the techniques herein for performing data movement evaluation, performing the actual movement of data such as between physical devices of different storage tiers, and the like, may be performed by code executing on a component that is external with respect to the data storage system including the physical devices for which such data movement optimization is performed.

Figure 20:
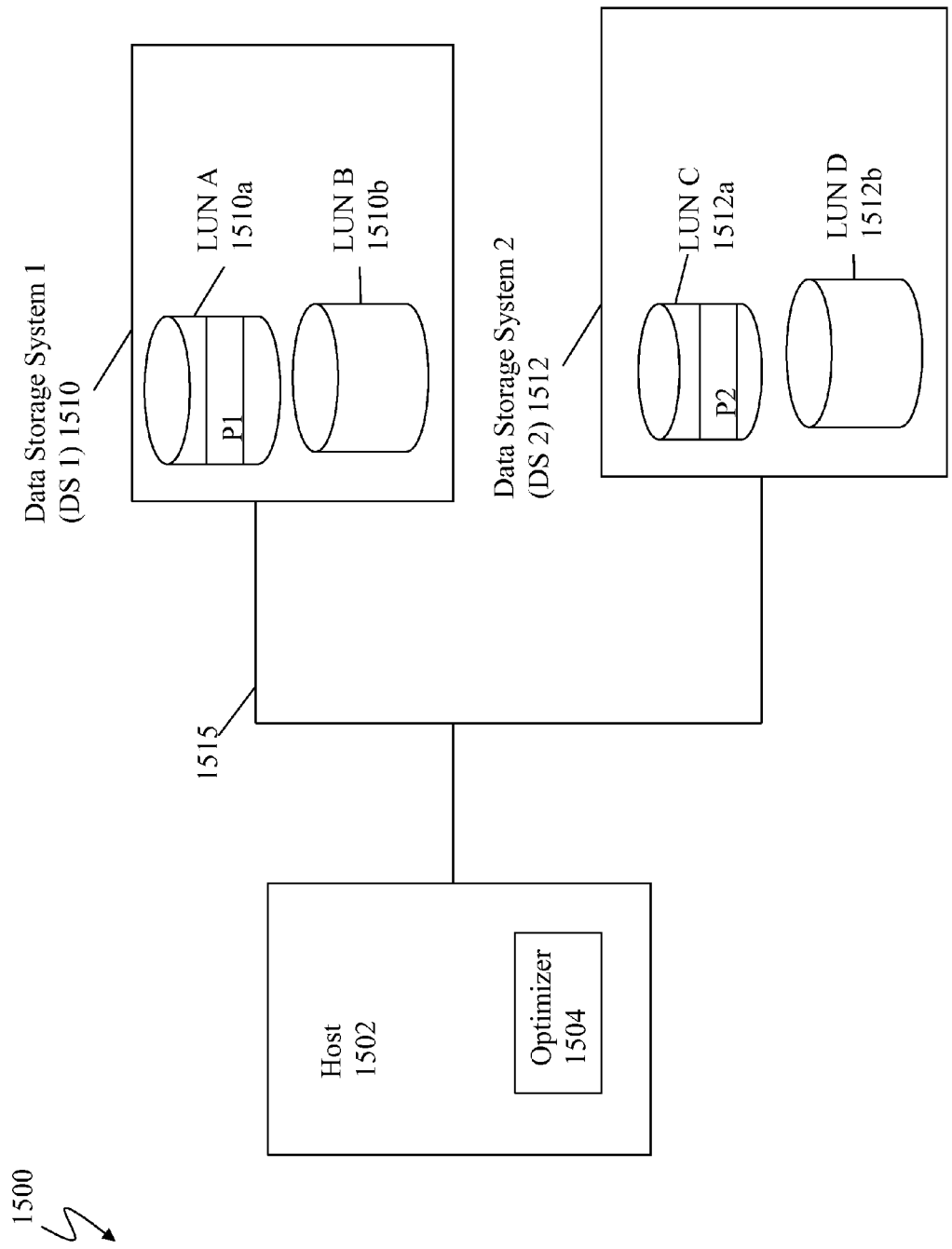

As an example, reference is made to FIG. 20 which illustrates an exemplary embodiment of a system including a host and data storage systems where the optimizer performing techniques herein may be located on the host. In the exemplary system 1500, included is a host 1502, data storage system 1 (DS1) 1510 and data storage system (DS2) 1512. Each of the components 1502, 1510 and 1512 may be as described elsewhere herein with the difference that the host 1502 includes the optimizer 1504 as opposed to each of the data storage systems 1510 and 1512 including an instance of an optimizer (e.g., similar to the optimizer 138 of FIG. 3). DS1 1510 may include LUN (logical unit number) A and LUN B and DS2 1512 may include LUNs C and D. It should be noted that a LUN refers to a logical device on the data storage system side which, as described elsewhere herein, is configured to map to one or more physical devices (PDs) of the data storage system. LUN A 1510*a* and LUN B 1510*b* may be visible to or exposed to the host 1502 whereby the host 1502 may access LUNs A and B such as by issuing I/O operations over network 1515. DS2 1512 may include LUN C 1512*a* and LUN D 1512*b*. LUN C 1512*a* and LUN D 1512*b* may be visible to or exposed to the host 1502 whereby the host 1502 may access LUNs C and D such as by issuing I/O operations over network 1515.

The host 1502 may include optimizer 1504 which executes code performing techniques such as described above in connection with performing processing for data movement evaluation, actual movement or relocating data from a source to a target location, and the like. As described in more detail in following paragraphs, the optimizer 1504 may also perform additional processing for automated discovery of various information regarding the LUNs A-D of the two data storage systems DS1 1510 and DS2 1512. The optimizer 1504 may use such discovered information to perform optimization processing such as in connection with data movement evaluation for moving data portions between LUNs, and therefore underlying PDs, of the same data storage system (e.g., such as for data movement between LUNs A and B) as well as for moving data portions between LUNs, and therefore underlying PDS, of different data storage systems (e.g., such as for data movement between LUN A of DS1 and LUN C of DS2).

The discovered information regarding LUNs A-D may be characterized as including configuration information related to aspects of LUN to PD mapping and as also including performance characteristics such as performance classifications for the LUNs, or more specifically the PDs configured to provide provisioned physical storage for the LUNs. The information included in the foregoing discovered information may be otherwise directly available to the optimizer if, for example, the optimizer executed on a data storage system. However, in accordance with this embodiment where the optimizer 1504 is located externally with respect to the data storage systems 1510, 1512 including the PDs and configured LUNs for which data movement and optimizations are performed (e.g., optimizer 1504 does not execute on the data storage system 1510, 1512 including the PDs and configured LUNs A-D), such information may be indirectly obtained in an automated manner using techniques herein for discovery processing.

To further illustrate, the discovered information obtained through such automated discovery processing may include, for example, determining a performance classification (e.g. such as a storage tier) for each of the LUNs A-D whereby such performance classification identifies performance characteristics of one or more corresponding PDs from which storage for the LUN is provisioned. For example, suppose DS1 1510 includes three storage tiers as described elsewhere herein where the first or highest performance tier is a storage tier including EFD drives, the second or mid-range performance tier is a storage tier including FC rotating disk drives, and the third or lowest performance tier is a storage tier including SATA rotating disk drives. The automated discovery processing herein may determine a storage tier as the performance classification for each of LUNs A-D. For example, LUN A may be classified as the EFD storage tier, LUN B may be classified as the FC storage tier, and LUNs C and D may both be classified as the SATA tier. Since each such LUN is mapped, configured, or has storage provisioned from one or more PDs, such performance classification per LUN classifies or categorizes the underlying PDs to which each such LUN is mapped. As will be described in more detail in following paragraphs, such information regarding per-LUN performance classification may be discovered by observing response times obtained in response to issuing I/Os to the LUNs. The observed response times may be used as an input to further analysis to provide insights regarding performance capabilities of the underlying PDs from which LUN storage is provisioned.

As mentioned above, the discovered information regarding LUNs A-D may be characterized as including configuration information related to aspects of LUN to PD mapping. As an example, the discovered information may include identifying which LUNs reside or share one or more PDs. Thus, the discovered information may include also identifying which LUNs are PD independent of other LUNs (e.g., which LUN or LUNs do not share common PDs with other LUNs). Such information regarding which LUNs do or do not share underlying PDs may be important in connection with selecting which LUNs form a storage pool as may be used in connection with data movement techniques herein. As described elsewhere herein, a storage pool may be configured of physical storage of the same performance classification (such as of the same storage tier). Additionally, another consideration of what LUNs to include in a pool may relate to whether the LUNs are configured to share any PDs. It may be desirable to have all LUNs configured to be in the same pool to be of the same performance classification and also for all LUNs in the pool to be PD independent with respect to every other LUN in the pool (e.g., no two LUNs in the same pool should be configured to share a PD, or rather, no two LUNs should be configured to have physical storage provisioned from a same PD).

The data storage systems, such as DS1 1510 and DS2 1512 may be characterized as a heterogeneous storage environment due to many possible factors or differences between the data storage systems. For example, DS1 and DS2 may be from different data storage system vendors, may each include different PDs (e.g., DS1 may include both EFD and FC drives and DS2 may include only SATA drives), and the like. The techniques herein may be used in such an environment to perform storage optimizations in a multi-tiered environment across multiple data storage systems. Such techniques may be used to identify the most active or "hot" data portions for movement to those LUNs having the highest performance classification, and to identify the least active or "cold" data portions for movement to those LUNs having the lowest performance classification where such data movement may be between or across data storage systems. For example, P1 may be a data portion stored on LUN A at a first point in time whereby LUN A is classified as the EFD storage tier. As noted above and for this example, LUN B may be classified as the FC storage tier, and LUNs C and D may both be classified as the SATA tier. At the first point in time, P1 may be very active with the highest workload of all data portions in the systems DS1 and DS2. At this first point in time, P2 (which is located on LUN C classified as the SATA or lowest performance tier classification) may be the least active data portion with the lowest workload of all data portions in DS1 and DS2. At a second point in time, P1 may be the least active with the lowest workload of all data portions in DS1 and DS2. At this second point in time, it may be determined using techniques herein to move or relocate data portion P1 to either LUN C or LUN D due to the fact that these are LUNs of the lowest performing tier. At this second point in time, data portion P1 may be a candidate for demotion and may be demoted through movement from LUN A to either LUN C or LUN D. Also at this second point in time, P2 may now be the most active data portion with the highest workload of all data portions in DS1 and DS2. At this second point in time, it may be determined using techniques herein to move or relocate data portion P2 to LUN A due to the fact that LUN A is the highest performing tier. At this second point in time, data portion P2 may be a candidate for promotion and may be promoted through movement from LUN C to LUN A. Thus, the foregoing techniques in connection with data movement may be applied with respect to storage devices in multiple data storage systems. Additionally, such techniques for data movement may be performed with varying desired levels of storage granularity. For example, as described herein, such data movement may be performed for very fine granularity or small data portions such as at the extent and subextent level. An embodiment may also desire a much larger level of storage granularity. For example, an embodiment may use techniques herein on data portions corresponding to an entire LUN.

Additionally, it should be noted that the discovery information obtained and described in connection with examples herein may be on a per LUN basis but may also be applied to varying levels of storage granularity such as a group of LUNs or even an entire data storage system.

Thus, the techniques herein may be used in an embodiment having a heterogeneous storage environment in which the discovery processing provides for automatically discovering and obtaining information about the LUNs and also for dynamically adapting to any changes that may occur, for example, due to ongoing modifications in the underlying PDs used to provision storage for the LUNs (e.g., addition of new PDs, removal of PDs, replacement of PDs), creation and/or removal of LUNs, addition and/or removal of entire data storage systems, and the like. The techniques herein may be performed in an ongoing manner in an embodiment to monitor and detect any such changes over time and accordingly obtain current updated discovery information based on any changes.

In this embodiment in which the optimizer 1504 is located on the host 1502 for performing data movement storage optimization processing with respect to DS1 1510 and DS2 1512, processing may be performed on the host to discover information about the LUNs (e.g., obtain discovery information) through issuing I/Os to DS1 and DS2. Using this discovery information, the optimizer on the host may have knowledge similar to when the optimizer is executing locally on the data storage system. In this manner, the host-side optimizer 1504 may utilize techniques as described above to collect LUN-level statistics and sub-LUN statistics on the LUNs across DS1 and DS2. Based on the collected statistics, the host may classify the different data storage systems, LUNs, and the like, in accordance with a defined performance classification (e.g., such as different stored tiers or levels) and obtain a performance model of the different data storage systems DS1 and DS2. The storage tier or performance classification of the LUNs, and thus underlying PDs mapped to such LUNs, is necessary in order to decide the source and target locations of data movement processing. Subsequently, based on this model and the sub-LUN statistics collected as described above, the optimizer 1504 on the host may relocate "hot" data portions of first LUN having a low performance classification to another LUN having a relatively higher performance classification than the first LUN. In a similar manner, "cold" data portions of a LUN may be relocated from a first LUN to a second LUN having a lower performance classification than the first LUN. As will also be described in more detail below, host-side mapping may be performed so that such data movement and relocation across LUNs may be transparent to applications executing on the host.

What will now be described is how the host may perform automated discovery to obtain discovery information as described above. The discovery information may be described generally as obtained using techniques which issue I/Os from the host to the data storage systems and measuring the resulting RTs observed for the changing workloads over time. Using techniques herein, such I/Os may be read operations. In following paragraphs, I/Os issued and RTs observed may be with respect to each LUN. It should be noted that the host may perform such discovery process initially, for example, when the host comes online (e.g., when booted). The discovery processing described herein to obtain information regarding LUN to PD mapping and/or determine LUN performance classification may be proactively performed at subsequent various points in time, for example, to check and ensure that current LUN to PD mapping and/or LUN performance classifications are accurate at later points in time and also in response to the host otherwise detecting or being notified of a configuration change (e.g., adding a new LUN, data storage system, etc.) in order to obtain updated discovery information regarding such changes or additions.

As noted above, the host issues I/Os to the data storage systems in discovery processing to obtain the discovery information as described herein. For example, the host may issue varying patterns of read operations of different sizes and intensities in parallel to all the LUNs under consideration (e.g., varying I/O rate or number of reads/second directed to individual LUNs, groups or pools of LUNs, etc. at the same time).

What will now be described is one way in which the host may perform processing for automated assignment of a performance classification to each LUN.

As a first step, a set of baseline RTs are obtained for the LUNs by the host issuing I/Os to all the LUNs of the data storage systems in parallel as noted above. In obtaining the baseline RTs, the goal is to have such baseline RTs approximate the amount of RT due to overhead in processing I/Os on the path to the LUNs independent of the type of performance classification of the LUNs (e.g., overhead may include, for example, time incurred due to connection between host and data storage systems). In connection with obtaining the baseline RTs, the host may issue read I/Os in an accordance with a pattern expected to maximize the number of cache hits on the data storage system (e.g. servicing the read I/Os using cached data rather than require retrieval from a PD). For obtaining the baseline RTs, the read I/Os may be based on a predetermined pattern such as proximity in logical addresses between consecutive I/Os which causes cache hits on the data storage systems. Issuing consecutive I/Os to read data from the same logical address on the LUN may result, for example, in an initial cache miss on the data storage system for the first read thereby causing the read data to be brought into cache from physical storage. The second and subsequent reads to the same logical address are expected to be cache hits whereby the read is serviced using the cached copy of the data. Thus, in such a manner, the read operations issued in connection with obtaining baseline RTs may be based on I/Os having a predetermined pattern which are expected to result in cache hits after the first read request in such an embodiment of the data storage system that performs data caching. The RTs associated with the expected cache hits (e.g., second and subsequent reads of the above-mentioned I/O sequence) may be recorded and used in connection with obtaining a RT for the LUN for the time period during which the I/Os were issued.

It should be noted that in connection with an RT resulting from a cache miss as may be used during other steps of discovery processing described herein, any additional RT incurred above the baseline RT for a LUN may be attributed to the characteristics of the underlying PDs storing the read data. In other words, the additional RT amount or difference above the RT baseline may be presumed due to the different media, technology, and other performance characteristics of the particular underlying PDs from which the data is read.

An embodiment may process the RTs observed during the time period in any suitable manner to obtain an aggregate RT for each LUN used as the LUN's baseline RT. For example, an embodiment may average of such RTs recorded in response to the above-mentioned read operations issued during the time period to a LUN to determine the baseline RT for the LUN.

Once a baseline RT has been determined for each LUN, I/Os may then again be issued to each LUN for a second time period where the I/Os may be based on a pattern expected to result in cache misses. For such I/Os issued during the second time period, RTs may be recorded and further analyzed to determine a second set of RTs for the LUNs. It is this second set of RTs that are used in connection with determining a performance classification for each LUN. For each LUN, its corresponding RT from the second set may be adjusted in accordance with the LUN's corresponding baseline RT thereby producing an adjusted RT (e.g., the LUN's corresponding baseline RT from the first set may be subtracted from the LUN's corresponding RT from the second set). Thus, with respect to a LUN, such a difference in the LUN's RTs (e.g., between the baseline RT for cache misses and the RT of the second set) may represent the RT portion attributable to performance characteristics of the PDs configured to store the LUN's data. The above-mentioned adjusted RT for a LUN representing the difference in RT values (e.g., between the baseline RT and RT in the second set) may then be used to assign a performance classification to the LUN thereby representing the performance classification of the underlying PDs configured to stored the LUN's data. For example, consider an embodiment having three storage tiers as the performance classifications as described above in connection with FIG. 20. An embodiment may have a set of expected RT ranges where an expected RT range is associated with each storage tier. In this manner, the LUN may be assigned one of the three storage tiers as its performance classification if its adjusted RT approximates the RT expected for the assigned storage tier. For example, for a LUN to be classified as the EFD storage tier, the LUN may be expected to have an adjusted RT approximately in the range of 0.5 millisecond (ms) to about 2.0 ms. In a similar manner, expected RT ranges may be associated with the second tier of FC drives and the third tier of SATA drives and used in classifying a LUN based on the LUN's above-mentioned adjusted RT value.

As will be appreciated by those skilled in the art and as described elsewhere herein, performance characteristic curves may be obtained for particular PD technologies at varying I/Os/second (IOPS) as well as varying I/O sizes (e.g., See, for example, FIGS. 13 and 13A-E). Such information may be used in connection with selecting an expected RT range used for LUN performance classification. For example, an embodiment may issue read I/Os at one or more rates and at one or more sizes where the I/Os are expected to cause cache misses. A histogram of the observed RTs may indicate the quantity or amount of each observed RT. A storage tier classification may be assigned to the LUN based on whether a majority of the observed RTs are within the expected range for a particular storage tier (e.g., assign the FC storage tier classification to the LUN if some threshold percentage of the RTs are within the expected range defined for the FC tier where the range is defined using previously obtained performance characteristic curves for FC drives). As another option, an embodiment may actually produce one or more performance curves for a LUN (e.g., for one or more I/O sizes at various TOPS) based on observed RTs and compare the LUN's performance curve(s) to those expected for the different storage tiers. One of the storage tiers may be assigned as a performance classification for the LUN based on which tier's expected performance curve(s) is/are most similar to the LUN's performance curve(s).

As noted above, the recorded RTs for the second time period (as used in determining the adjusted RT for LUN performance classification) may be processed in any suitable manner to obtain an aggregated RT for the LUX For example, with respect to a LUN, the LUN's RT in the second set may be determined as follows. Read I/Os expected to cause cache misses may be issued to the LUN for the second time period. The host may perform filtering or classification of the RT values observed over the second time period in order to selectively include and/or ignore certain RTs in calculating an overall or collective RT for the time period. For example, the LUN's baseline RT may be used a threshold for determining an RT due to a cache miss or cache hit. Recorded (unadjusted) RTs which are not greater than the baseline RT may be considered due to cache hits and RTs above the baseline RT may be considered due to cache misses. Therefore, when determining an RT where it is desired that the observed RTs for the second time period be those regarding a cache miss, certain RTs classified as RTs related to a cache hit may be filtered out or omitted from those used in determining the RT in the second set for the LUN.

Additionally, when considering RTs as collected during the above-mentioned second time period, the host may also filter out/or ignore other RTs such as those that may be indicative of performing a read to a thin or virtually provisioned device where the read location/source is an unallocated location (e.g., no storage has been allocated or is associated with the read address). In this case, the data storage system may be expected to return a zero data value and the adjusted RT (e.g., after subtracting the baseline RT for the LUN) may be very quick (e.g., low value such as less than 2 ms). Such RTs may be ignored if associated with a zero data return value so as not to be confused with, or mischaracterized as, a cache hit RT for an EFD (which should more typically return a non-zero data value of the current contents of the read location). An embodiment may also perform other filtering in connection with low adjusted RTs obtained during the second time period, such as those less than 2.0 ms, to allow for properly distinguishing between those cases where the RT should be ignored and those where the RT should be considered when determining the LUN's performance classification. For example, the RT associated with a cache hit may be a low RT that is not considered for LUN performance classification. This filtering is noted above as may be determined by using the baseline RT for the LUN as a threshold for the observed RT (prior to adjustment or prior to subtracting out the baseline RT) or when the adjusted RT of the second time period (after subtracting out the baseline RT) is less than a threshold (such as less than 0.5 ms). Thus, such cases may be evaluated to properly exclude RTs from consideration when determining the LUN's performance classification. Additionally, processing may be performed to validate a low adjusted RT (e.g., an adjusted RT less than 2.0 ms and greater than 0.5 ms) as being due to a read miss for an EFD drive. For example, an adjusted RT which is less than 2.0 ms and greater than 0.5 ms, where the read data returned is non-zero, may be considered criteria for validating an RT used in determining the LUN's performance classification.

Figure 21:
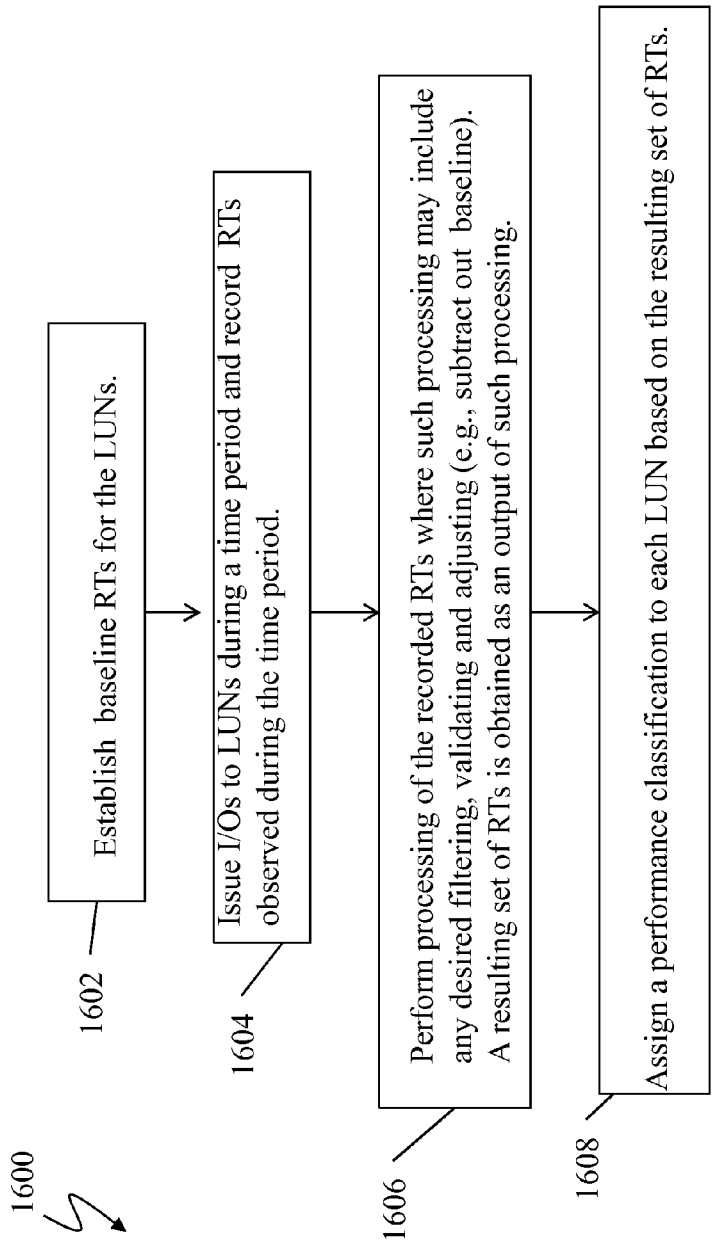

Referring to FIG. 21, shown is a flowchart of processing steps as may be performed for determining a performance classification of a LUN as part of discovery processing in an embodiment in accordance with techniques herein. The flowchart 1600 summarizes processing described above. At step 1602, baseline RTs are established for the LUNs. At step 1604, I/Os (e.g., read I/Os expected to cause cache misses) are issued to the LUNs for a time period. During this time period, RTs observed are recorded. At step 1606, any desired processing of the recorded RTs of step 1604 may be performed. In one embodiment as described herein, such desired processing may include filtering and validating RTs and also adjusting an observed RT. For an observed RT recorded when issuing an I/O to a LUN, the observed RT may be adjusted by subtracting the baseline RT for the LUN as established in step 1602. A resulting set of RTs may be obtained as an output of step 1606 processing. In step 1608, a performance classification may be assigned to each LUN based on the resulting set of LUNs.

Thus, the output of FIG. 21 processing is a first portion of the desired discovery information for the LUNs including a performance classification for each LUN.

What will now be described are ways in which an embodiment may also determine information regarding LUN to PD mapping. In particular, the host may want to define or configure pools of LUNs as described elsewhere herein. As described elsewhere herein, it may be desirable to configure a LUN pool where each LUN in the pool is characterized as PD independent with respect to other LUNs in the same pool so that no two LUNs in the pool share a same PD. Consistent with description elsewhere herein, a first LUN may be characterized as a PD independent LUN with respect to a pool of LUNs if the first LUN does not share a PD with any other LUN in the pool. These configured pools may serve as storage pools of a particular storage tier for use with the techniques described elsewhere herein (e.g., as a thin/virtually provisioned device pool, thick device pool).

Described below are techniques that may be used to automatically discover PD dependencies among LUNs of a data storage system to generally determine which LUNs share PDs (where each LUN sharing a PD with another LUN means that each such LUN has at least some data stored on the shared or common PD). However, prior to discussing such exemplary techniques, some examples of possible PD dependencies among LUNs are first illustrated.

Figure 22:
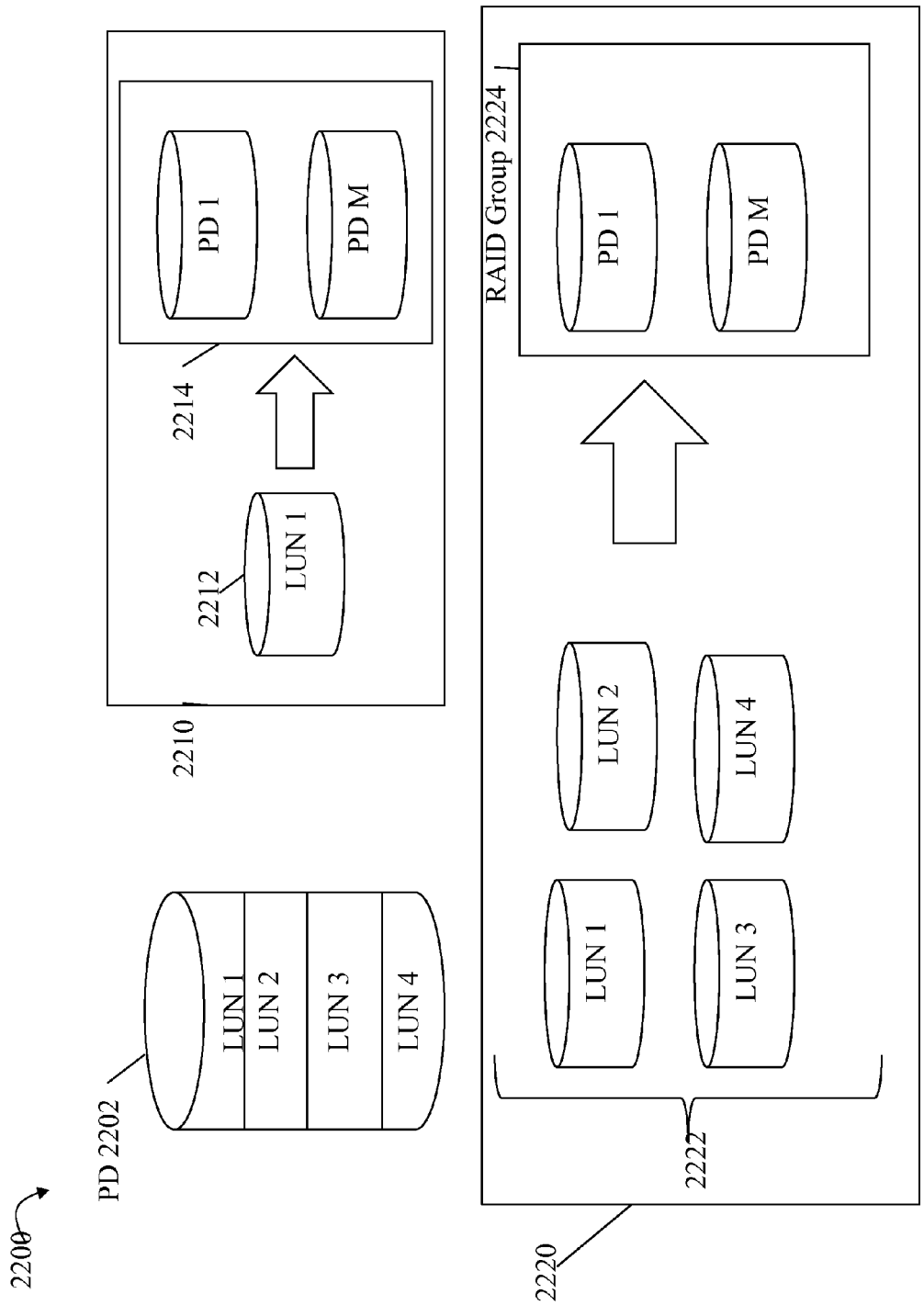
FIGS. 22, 23, 23A, and 24 are examples of LUN to PD mappings as may be used in an embodiment in accordance with techniques herein.

Referring to FIG. 22, shown are some examples illustrating various ways in which LUNs may be mapped to physical devices in an embodiment in accordance with techniques herein. In the example 2200, shown are three examples. Element 2202 may correspond to a single physical device or drive (PD) having all the data of 4 LUNs stored thereon. Element 2210 represents another example where a single LUN 2212 may be configured to have its data on a defined group of multiple PDs 2214. The group of PDs 2214 may contain only the data of LUN 2212 and for no other LUNs. Element 2214 may be, for example, a configured RAID group having M physical drive members where the RAID group is only configured to provision storage for LUN1. Element 2220 represents a third illustrative example whereby a group of LUNs 2222 may have all their corresponding data stored on a group of M PDs 2224 (M>2). Element 2224 may be, for example, a configured RAID group having M physical drive members.

Figure 23:
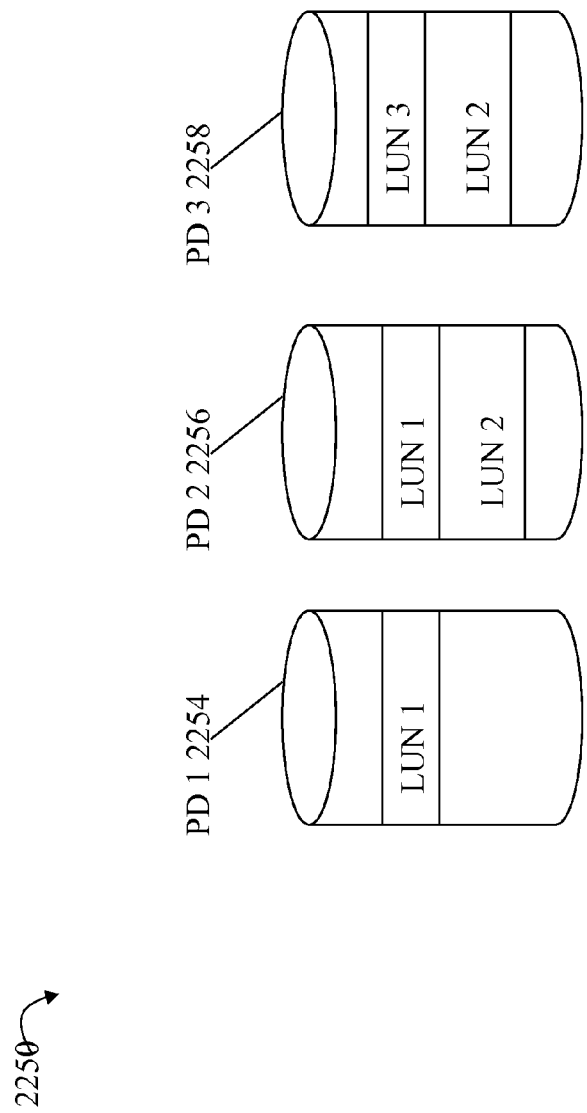

Referring to FIG. 23, shown is another example illustrating in which LUNs may be mapped to multiple PDs. In the example 2250, shown are 3 LUNs 1-3 configured to have their data stored on 3 PDs 2254, 2256 and 2258. In the example 2250, LUN1's data is stored on PDs 2254 and 2256, LUN2's data is stored on PDs 2256 and 2258, and LUN3's data is stored on PD 2258. Thus, LUN1 shares PD2 2256 with LUN2, LUN2 shares PD3 2258 with LUN3 and LUN1 does not share PD1 2254 with any other LUN.

It will be appreciated by those skilled in the art the examples of FIGS. 22 and 23 are merely illustrative and other mappings or correspondences are possible on the data storage system.

What will now be described is a first technique that may be used in an embodiment to determine physical dependencies between the LUNs such as which LUNs share a PD (e.g., which one or more LUNs have any portion of their data stored on the same PD or set of physical PDs). This first technique may be performed after assigning a performance classification to each LUN as described elsewhere herein. This first technique, as well the second technique described below, may be performed during a time period when there is no additional workload on the physical storage devices or other components which may cause a variation in results obtained. In connection with this first technique, a first step may be performed to select a set of LUNs having the same performance classification such as, for example, a set of LUNs assigned the same storage tier. As a second step, a similar workload (e.g. I/Os issued at about the same rate) may be run in parallel on all LUNs of the set. The I/Os issued in this second step may be read operations in accordance with patterns expected to result in cache hits. As a third step, the RTs may be recorded for the time period during which the I/Os are issued. The recorded RTs may be processed to determine an aggregated RT value for each LUN. As described herein, the third step may include performing processing such as the RT filtering and validating as described herein prior to determining the aggregated RT. The third step may determine the aggregated RT for a LUN, for example, as an average or mean of the RTs collected for the time period (where such RTs used may be those remaining after any RT filtering or validation processing). As a fourth step, the RTs for the LUNs may be examined to determine which LUNs do or do not share PDs with other LUNs.

As a first case in connection with the fourth step of examining aggregated RTs for the LUNs, all LUNs may have about the same RT (e.g., within some expected amount or suitable threshold). If all LUNs in the selected set each have their data stored on different PDs (each LUN has own set of one or more PDs where none of these PDs are shared with any other LUN to which I/Os are issued), then all LUNs are expected to have about the same RT (e.g., if the workload is about the same on all LUNs, then we would expect a resulting aggregated RT for each LUN to be about the same).

As a second case in connection with the fourth step, all LUNs may not have about the same RT (e.g. there is a difference among RTs for two or more LUNs). If there are some LUNs having RTs which are better than (e.g., lower than) other LUNs, this means that some LUNs share PDs and other LUNs have their own set of one or more PDs (e.g., do not share a PD with another LUN). The one or more LUNs having about the same best RTs (e.g. those LUNs having about the same lowest RT) each have their data provisioned on a set of PDs where no PD of the set is configured for storing data of another LUN in the set).

Figure 23A:
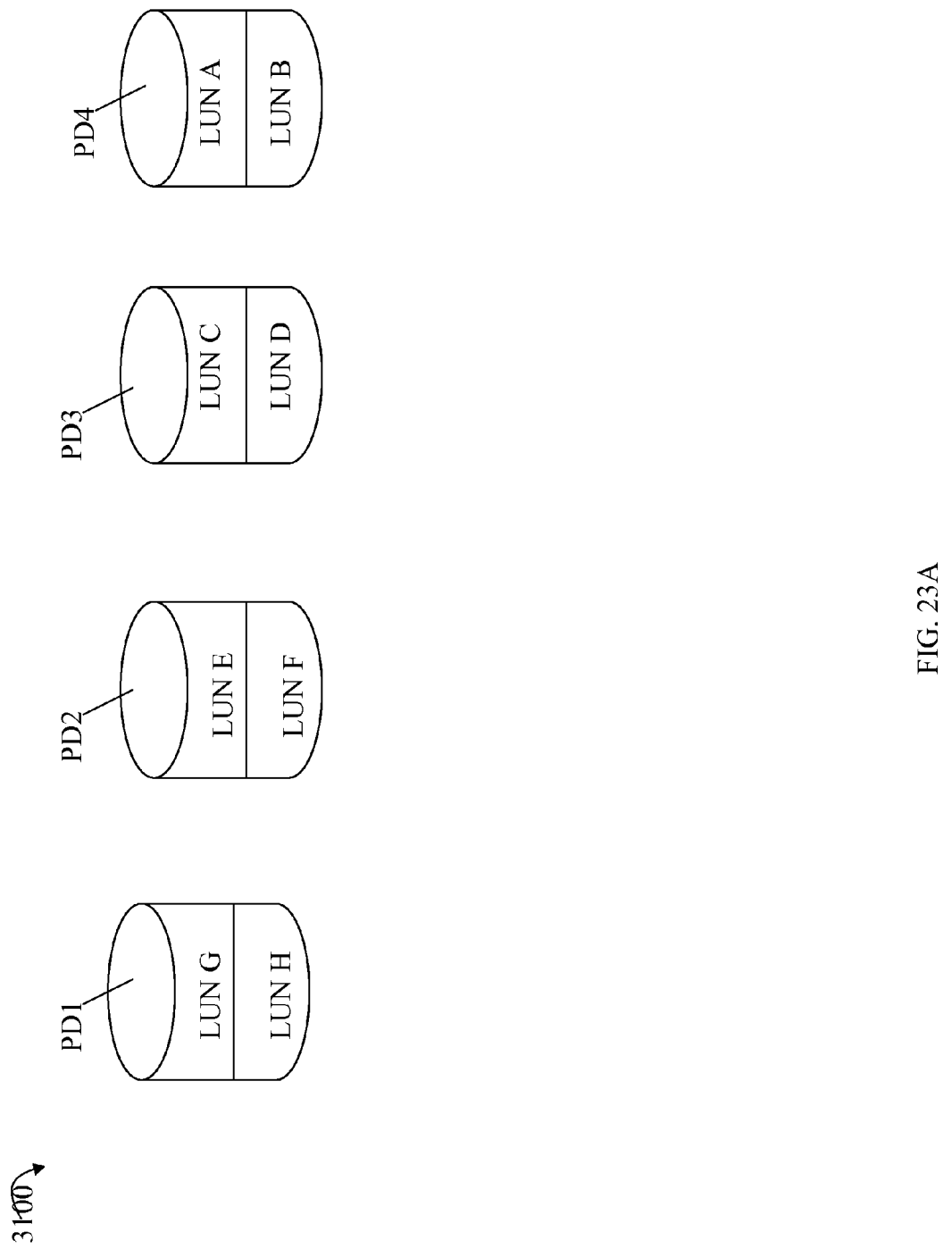

To further illustrate, reference is made to FIG. 23A. Referring to FIG. 23A, shown is an example of 8 LUNs (e.g., LUNs A-H) as may have their storage provisioned on 4 different PDs (e.g. PD1-PD4). LUNs C, D and E may be selected as LUNs in the set to be considered in connection with METHOD 2 for determining information on the LUN to PD mapping to identify PD dependencies between LUNs under consideration. The particular LUN-PD mapping or configuration is currently not known to the host. However, the host may perform processing using the techniques described herein based on observed RTs of the selected LUNs in order to determine aspects regarding the LUN-PD mapping that may be useful by the host. To this end, a same workload is run on LUNs C, D and E and the observed RT for each LUN for the given workload is determined. LUN E has a lower RT (better RT) than LUNs C and D (which may have about a same observed RT). For example, if 50 I/Os are issued to each of LUNs C, D and E in a defined time period, there will be 50 I/Os issued to PD2 (e.g., for LUN E) and 100 I/Os to PD3 (e.g., for the aggregate of LUNs C and D). Thus, it may be determined that LUN E has its data stored on different PDs than LUN C and D.

More generally, for any set of LUNs selected, the set of LUNs may be divided into two partitions—a first partition of one or more LUNs that are "alone" or PD-independent and do not share PDs with any other LUN in the set, and a second partition of one or more LUNs that "share" one or more PDs with at least one other LUN in the set (e.g., are not PD-independent or are PD dependent with respect to other LUNs in the set). Such grouping is based on, with respect to, or relative to the LUNs in the set. With reference to the foregoing example, LUN E has the best or highest RT and may be determined as not sharing PDs with LUN C or LUN D (e.g., PDs on which LUN E has its storage provisioned do not also include any storage provisioned for LUN C or LUN D). More generally, for all LUNs in the selected set, a top or best RT (e.g., lowest RT) is determined among all the LUNs and those one or more LUNs that have approximately this same best RT may be determined as those LUNs which do not share any PD with any other LUN in the set.

The rationale to have each LUN in a pool not share any PDs with any other LUN in the same pool may be characterized in one aspect as consistent with a general goal of a configured pool to spread the workload of LUNs of the pool as evenly as possible across the underlying PDs in the pool. Thus, one possible option is for an embodiment to configure the pool by selecting those LUNs for the pool which are PD independent, as just mentioned. This first option may be used, for example, if an embodiment is able to fulfill pool storage capacity requirements using such LUNs which are PD independent. However, it may be the case that there are not a sufficient number of PD independent LUNs to meet a required single pool capacity. As another possible option, an embodiment may also configure the pool by selecting those LUNs within the same PD-dependent group, if this results in fulfilling the pool storage capacity requirements. However, it may also be that the LUNs in the above-mentioned two options for configuring a pool do not provide sufficient capacity needed for the pool being configured. In this case, one performing the configuring may use the knowledge gained from the techniques performed herein to perform other processing to compensate for pool management or may form separate smaller pools of PDs and spread workload across such smaller separate pools of PDs.

As a further example, suppose a set of 100 LUNs is selected and the same workload of I/Os is issued to each of the 100 LUNs in the set. It may be that about 40% or 40 of the 100 LUNs are determined as a first resulting set of LUNs that are "alone" or each having their respective storage provisioned on different PDs than other LUNs of the 100 in the set. If it is desired to form a pool of more than the foregoing 40 LUNs, the above-mentioned processing may be performed again with respect to a different second set of 100 LUNs from which second resulting set of 40 LUNs may be determined as being "alone" or PD independent or each having their respective storage provisioned on different PDs than other LUNs of the 100 in the second set. Now, we have a total of 80 LUNs for the pool. However, the possibility exists that there may be some PD overlap or dependency between the first resulting set of 40 LUNs and the second resulting set of 40 LUNs. In other words, it may be the case that a LUN from the first resulting set shares a PD with another LUN in the second resulting set as there has not been a determination of "alone/no PD sharing" or "PD sharing" with respect to the union or aggregate of the first and second resulting sets of LUNs. At this point, the above-mentioned processing may be performed with respect to the union or aggregated 80 LUN set formed as the union of the first and second resulting sets of LUNs to determine whether there are any PD dependencies or overlap between these 80 LUNs.

As will be appreciated by those of ordinary skill in the art, the foregoing may be repeated any number of times as needed to determine a desired number of PD independent or "alone" LUNs. It should be noted that although the number of LUNs in the set of LUNs can be any number, it may be preferred to select a number of LUNs in the set equal to the number of PDs in the system. It should also be noted that the inventors have mathematically determined that about 40% of the LUNs of the set will be determined as PD-independent or "alone". Thus, when a larger number of PD-independent LUNs is desired for forming a pool, the above-mentioned processing may be repeated as described above.

It should be noted that the above-mentioned expected amount of about 40% of the LUNs being determined as PD independent applies in the case where the number of candidate LUNs subject to processing is approximately equal to the number of independent underlying PDs in the data storage system. In the case where the actual number of PDs in the data storage system is not know, the mathematical insight of achieving a result of about 40% of the N candidate LUNs being PD independent, such an insight may be used to adjust the number of LUNs, N. For example, assume that the number of PDs in the data storage system is unknown. In this case, the techniques herein may be used to determine the number of LUNs which approximates the number of PDs by repetitively performing the processing described herein using various numbers of LUNs and adjusting the number of LUNs selected (e.g., adjusting N LUNs) until the above-mentioned goal of approximately 40% is met. Thus, using a feedback technique, for example, a first iteration of the techniques may be performed for a number of N LUNs. If the end result does not indicate that about 40% of the LUNs are PD independent, then the techniques may be performed a second time for a different number of LUNs, M, where M is selected based on the approximate percentage of LUNs found to be PD independent (e.g., M may be selected in the second iteration to be greater than N if the end result of the first iteration is less than 40% and otherwise M may be selected in the second iteration to be less than N). Thus, such a feedback technique may be used to "tune" the selection of the number of LUNs selected for use (e.g., the number of LUNs selected as described elsewhere herein such as in connection with step 3204 of FIG. 23B below).

Figure 23B:
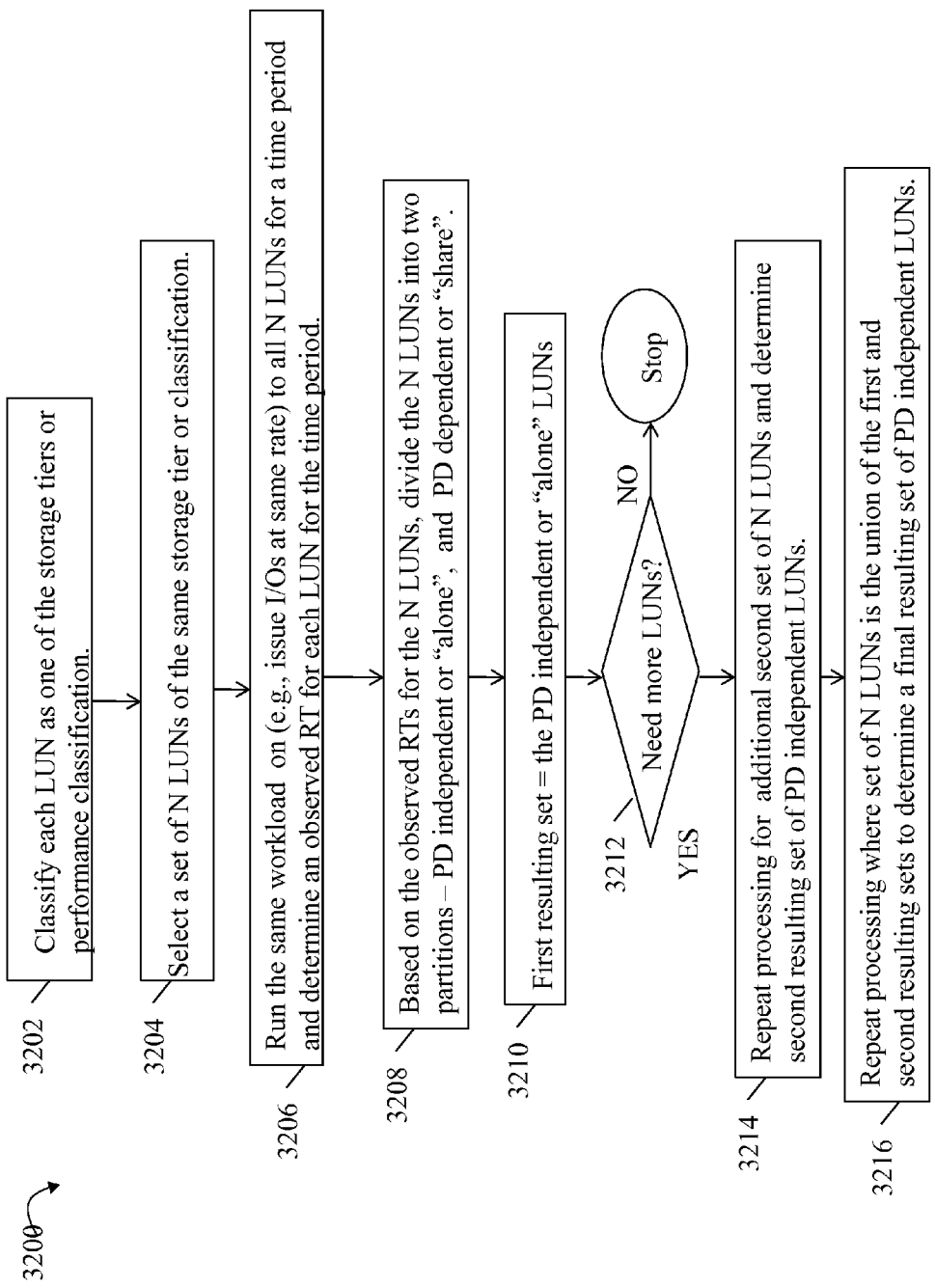

Referring to FIG. 23B, shown is a flowchart of processing steps as may be performed in an embodiment in accordance with techniques herein to determine PD dependency or PD independency with respect to a set of selected LUNs. The flowchart 3200 summarizes processing just described for the method above for determining those LUNs that are PD independent or PD dependent (e.g., shared) with respect to a set of selected LUNs. At step 3202, each LUN in the system may be classified as one of the storage tiers or performance classifications. At step 3204, a set of LUNs may be selected of the same storage tier or classification (e.g. where all LUNs are FC drives or of the FC storage tier). At step 3206, a workload is nm on all N LUNs of the set for a time period and an observed RT (e.g., aggregated RT) is determined for each LUN for the time period. At step 3208, based on the observed RTs for the N LUNs, the N LUNs are divided into two partitions—LUNs which are PD independent or "alone" (e.g., LUN in this partition does not share a PD with any other one of the N LUNs), and LUNs which are PD dependent or "share" (e.g., LUN in this partition shares a PD with at least one other one of the N LUNs in this partition). At step 3210, a first resulting set of LUNs may be determined as the PD independent or alone LUNs of step 3208. The resulting set of LUNs from step 3210 may be used to configure LUNs of a pool. At step 3212, a determination is made as to whether additional LUNs are needed, such as for the pool. Additional LUNs may be needed, for example, if additional storage capacity is needed for the pool. If step 3212 evaluates to no, processing stops. If step 3212 evaluates to yes, control proceeds to step 3214 where steps 3204, 3206, 3208, and 3210 are repeated with respect to another additional second set of N LUNs having the same storage tier or classification as those selected in step 3204. The output of step 3214 for this second iteration of processing may be a second resulting set of PD independent LUNs. At step 3216, steps 3204, 3206, 3208, and 3210 are again repeated with where the set of N LUNs in this third iteration is now the union of the first and second resulting sets (as each determined in step 3210 of a previous iteration). The output of step 3216 for third iteration of processing may be a final resulting set of PD independent LUNs. In this example, it is presumed that the final resulting set of PD independent LUNs of step 3216 contains a sufficient number of LUNs desired for configuration in the same pool. If not, those skilled in the art will appreciate that the steps of FIG. 23B may be further modified or extended in a manner similar to that as illustrated in steps 3214 and 3216 to determine additional PD independent LUNs with a suitable number of additional iterations of steps 3204, 3206, 3208, and 3210 (e.g. to determine any additional resulting sets of PD independent LUNs and then perform steps 3204, 3206, 3208, and 3210 with respect to the union of any/all resulting sets determined in step 3210 for each iteration to determine the final resulting set of PD independent LUNs).

After performing the processing summarized in FIG. 23B, the host may configure one or more pools of LUNs of the same performance classification using a desired number of PD independent LUNs. The pools are PDs of the same performance classification and the host may then use such pools in connection with other processing as described herein to perform processing to evaluate and perform data movement between the different storage pools of different performance classifications, to maintain statistics for each LUN, portions of LUNs, and the like, as described herein.

What will now be described is a second technique that may be used in an embodiment to determine physical dependencies between the LUNs such as which LUNs share a PD (e.g., which one or more LUNs have any portion of their data stored on the same PD or set of physical PDs). As will be described in more detail below, the second technique herein may include running a heavy workload on a selected one LUN and then observing how the response times (RTs) of other LUNs are affected. As mentioned above, an embodiment may perform this technique at a time when there is no additional workload on the physical devices and other components that would affect the results obtained. The technique is based on a premise that if the selected LUN's heavy workload results in a significant increase in RT for another second LUN whose workload has not increased, then the other second LUN shares resources in common with the selected LUN. In particular, if the increase in RT for the other second LUN is large enough or increases by a threshold amount, then the second LUN and the selected LUN may share a same set of one or more physical devices (PDs) where a data portion of the second LUN and a data portion of the selected LUN are stored on at least one same PD. This and other aspects of such techniques that may be used for efficient discovery of physical device dependencies between LUNs are described in more detail below.

Figure 24:
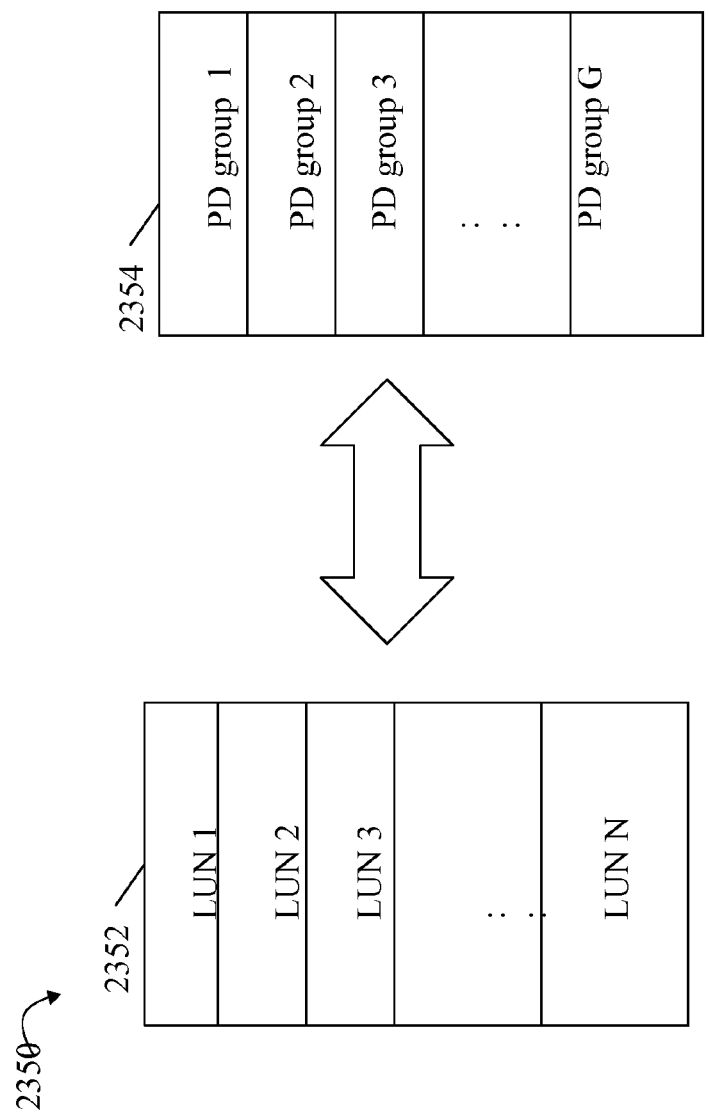

Referring to FIG. 24, shown is an example more generally illustrating the mapping between PDs and LUNs. Generally, there may be N LUNs (N being equal to greater than 1) mapped to G groups of PDs (G equal to or greater than 1), where each of the G PD groups may include 1 or more PDs. Element 2352 denotes the N LUNs and element 2354 denotes the G PD groups Using techniques herein to discover PD dependencies between LUNs, information regarding the mapping between LUNs and PDs may be determined. For example, the techniques herein may be used to determine for a selected LUN1, how many other LUNs share any PD with LUN1 (what other LUNs have at least a portion of their data stored on a same PD as at least a portion of the data for LUN1). Posed a different way, techniques herein may be used to determine what one or more LUNs share (e.g., have their data stored on) the same single PD or the same group of one or more PDs. More generally, the techniques herein may be used to determine the dependency of LUNs in terms of their usage of overlapping or shared PDs.

For example assume the LUN to PD configuration as in FIG. 23. Based on this configuration, assume a low baseline workload on all LUNs 1-3 at a first point in time. A first set of baseline RTs may be obtained at the first point in time for the low baseline workloads on the LUNs. At a second point in time, LUN2's workload is greatly increased (e.g. randomly or uniformly across all portions of LUN2) while maintaining the low baseline workload on LUNs 1 and 3. The increased heavy workload to LUN2 will result in a significant increase in RT for LUN2. Additionally, the increased workload on LUN2 (while maintaining the low baseline workload on LUNs 1 and 3) is also expected to adversely impact or increase the RTs observed for LUNs 1 and 3 due to the fact that LUN1 and LUN2 share PD 256 and that LUNs 2 and 3 share PD 258. Thus, by examining the observed RTs for LUNs 1 and 3 in comparison to those corresponding baseline RTs for LUNs 1 and 3, it may be determined whether LUNs 1 and 3 show a significant increase in RT due to the increased workload to LUN2. If so, it may be determined that LUNs 1 and 3 each share one or more PDs with LUN2 thereby indicating that LUNs 1-3 have a physical device dependency (e.g., LUNs 1 and 3 having at least a portion of their data stored on a same physical device as LUN2 should show an increase in RT due to increased workload of LUN2 while maintaining baseline workloads on the remaining LUNs 1 and 3). It should be noted that the techniques herein may not determine all aspects of PD dependency. For example, it may not determine whether the affected LUNs 1 and 3 and LUN2 share a single PD or multiple PDs. However, techniques herein may be used to generally determine that at least some portion of the data from each of the affected LUNs (e.g., LUNs 1 and 3) and at least a portion of the data from the selected LUN (e.g. LUN2) having the increased heavy workload are stored on at least one same PD.

Thus, a data storage system may be configured to have one or more PD groups each including one or more PDs. A PD group may be a simple PD dependency case (rather a LUN which is PD independent with respect to other LUNs under consideration) whereby any PDs of the group are only used to provision storage for a single LUN. A PD group may also include one or more PDs each of which is shared among one or more LUNs (e.g., at least two LUNs share a PD of the group so that each of the at least two LUNs have a data portion on a same PD of the PD group). The PD group may be RAID group or other defined grouping of PDs.

As described in more detail below, a single iteration of the techniques herein may include selecting one of the LUNs and issuing a high rate of I/Os to the selected LUN while maintaining the low baseline rate of I/Os to the remaining LUNs. A set of RTs may be obtained for the LUNs to determine which LUNs, if any, besides the selected LUN have a significant increase in RT as compared to previously obtained baseline RTs for the LUNs. As a result, a first set of LUNs may be determined for the first iteration whereby the first set includes the selected LUN and also any additional LUNs determined to have a significantly increased RT due to the increase workload on the selected LUN.

With reference back to FIG. 24, the first set of LUNs from all possible LUNs 2352 may be determined as sharing one or more PDs of a first PD group, such as PD group 1 of 2354. The LUNs included in the first set may be removed from the set of all possible LUNs 2352 thereby forming a set of remaining LUNs to be processed in subsequent iterations. The set of remaining LUNs may be further analyzed in a second processing iteration in a manner similar to that as just described for the first iteration. Additional subsequent processing iterations may be performed as needed in a manner similar to that as just generally described until the set of remaining LUNs is empty. Thus, with reference to notation in connection with FIG. 24, the techniques herein may be used to perform PD dependency discovery between LUNs (e.g., which LUNs share PDs by each having storage provisioned on the shared PDs) in G iterations where each iteration, i, determines a set of one or more LUNs sharing one or more PDs of a PD group "i", (i being an integer that is less than or equal to G), and where G is also equal to or less than the number of PDs.

A first iteration of this second technique for determining PD dependencies among LUNs may include a first step of obtaining a baseline by pushing LOW I/O rate in parallel to all LUNs and obtaining an average RT for each LUN. These RTs may form the RT baseline. An I/O rate for a LUN may be determined with respect to an average queue depth for the LUN whereby the average queue depth for the LUN represents, on average, how many outstanding I/Os are allowed at any point in time for the particular LUN waiting to be serviced. The LOW I/O rate for each LUN of the data storage system may be determined based on monitoring and maintaining an average queue depth as may be determined by performing such monitoring on the data storage system. The LOW I/O rate for a LUN may be the rate of I/Os needed to maintain an average low queue depth such as less than an average queue depth of 1. In obtaining the baseline RTs for the LUNs, an embodiment may issue I/Os, for example, by waiting T seconds between consecutively issued I/Os to each LUN. The parameter T is chosen so that the minimum possible response times from devices can be obtained on the one hand, and there are enough number of IOs issued to all devices on the other. Example values for T are 25 milliseconds and 100 milliseconds.

It should be noted that the RTs as used in connection with observed RTs for the baseline in the first step of an iteration and in observed RTs as obtained in connection with other steps (e.g., the second step of an iteration as described elsewhere herein) may be average RTs obtained using collected data for a defined time period. Alternatively, such RTs used may be determined using any suitable technique.

In a second step of an iteration, one LUN is selected and a HIGH rate of I/Os are directed to the selected LUN while pushing a LOW rate of I/Os to the remaining LUNs. While the foregoing high and low rates of I/Os are directed, respectively, to the selected LUN and the remaining LUNs, a set of observed RTs for all LUNs may be recorded. In connection with the second step when issuing a HIGH rate of I/Os to the selected LUN, I/Os may be issued to the selected LUN at a rate sufficient to maintain a high average queue depth for the selected LUN, such as an average queue depth of 32. When issuing a LOW rate of I/Os to the remaining LUNs in the second step, I/Os may be issued to the remaining LUNs (other than the selected LUN) at a rate about the same as that of the baseline in the first step such as, for example, sufficient to maintain an average queue depth of less than 1. Thus, in one embodiment, the average queue depth with respect to each LUN may be monitored as the means used to regulate the I/O rate for the various LUNs in order to maintain a desired average queue depth of less than 1 for those LUNs having a LOW I/O rate and an average queue depth of 32 for the selected LUN having a HIGH I/O rate. It should be noted that an embodiment may use other techniques to control or regulate the I/O rates for the LUNs.

As a third step, processing may be performed to adjust the observed RTs recorded in the second step. Such adjusting may include subtracting out or removing the baseline RT values from the recorded RTs obtained in the second set thereby forming a set of resulting adjusted RTs.

In a fourth step, the resulting adjusted observed RTs from the third step may be analyzed or examined to determine which LUNs, if any, experienced a significant spike or increase in RT in response to pushing the HIGH I/O rate to the selected LUN. An embodiment may determine a spike as a significant increase (e.g., over a particular threshold) for a particular LUN with respect to the previously obtained baseline RT for that LUN (e.g., baseline RT for LUN obtained in the first step). The amount of how much the RT of the LUN needs to increase with respect to the LUN's corresponding baseline RT (obtained when issuing the LOW rate of I/Os) in order to determine quantitatively whether the LUNs RT has increased significantly may vary with embodiment. For example, "significant" may be defined as approximately twice the RT as defined in terms of the baseline RT for a LUN. In other words, for a selected LUN A having a HIGH I/O rate (as in the second step) and a second LUN B having a LOW I/O rate (as in the second step), if the adjusted RT observed for the second LUN B increases to at least twice the second LUN B's baseline RT, then it may be determined that LUN A and LUN B share at least one PD (e.g. at least one PD has a portion of LUN A's data stored thereon and at least a portion of LUN B's data stored thereon). The threshold for determining significance may be tunable or a configurable parameter in an embodiment.

It should be noted that the threshold of significance selected for observed adjusted LUN RT may account for slight or other RT increases which are not deemed significant such as due to other resources (e.g., of the data storage system, network, and the like) that may possibly be impacted due to the increased load but not related to any PD dependency or sharing of PDs between LUNs.

It should be noted that the increased observed RT for an affected second LUN due to increasing I/Os to a first selected LUN may be due to a general sharing of resources between the LUNs in connection with processing I/Os to each of the LUNs (e.g., both LUNs share some set of one or more resources common to the I/O paths for each LUN). One such resource that may be shared or common to both such LUNs may be the same PD. However, it should be noted that more generally, the increased RT may be due to sharing of resources such as a same CPU, same DA or disk controller servicing I/Os, same PD, and the like. Additionally, depending on the particular amount or factor by which the RT increases of the second affected LUN, different levels of increasing RT may correspond to, and vary with, the particular resources(s) shared by the LUNs. For example, consider a data storage system configured with multiple DAs, multiple PDs and multiple general CPUs. If a first LUN A is selected and has a high rate of I/Os directed thereto and a second LUN B having a low rate of I/Os experiences an increase in adjusted observed RT of a first threshold, it may be that LUN A and LUN B each have at least a portion of their data on at least one PD. If the increase in RT of LUN B in comparison to the baseline RT of LUN B is a second threshold higher than the first threshold, it may indicate that LUN A and LUN B are characterized as sharing at least one PD as with the first threshold and additionally another resource, such as the same CPU, receive I/Os on the same target port on the data storage system, and the like. Thus, a significant increase in RT in comparison to the baseline for LUN B may mean a general sharing of resources with LUN A and LUN B (with respect to resources utilized in connection with the I/O paths of LUNs A and B) and furthermore, depending on the rate or significance of the increase in observed RT for LUN B, may indicate a sharing of one or more particular physical resources of the data storage system, more than a single resource of the data storage system, and the like. To further illustrate, if LUN B's adjusted observed RT increases by about twice its baseline RT (e.g., of LUN B's baseline RT) when issuing the high I/O rate to LUN A, it may be that LUN B and LUN A share one or more PDs as noted above. If LUN B's RT increases about 3.5 times (in comparison to LUN B's baseline RT), it may be concluded that LUN A and LUN B share one or more PDs and also a CPU. If LUN B's RT increases only about 1.5 times (in comparison to LUN B's baseline RT), it may be concluded that LUN A and LUN B share the same CPU or may share a disk controller or DA but not share a same PD.

An embodiment may select the particular RT thresholds for different PD classes, PD technologies, types of PD characteristics, defined storage tiers, and the like, as may be used in an embodiment. For example, an SSD drive may have a first average RT when issuing a low rate of I/Os and an FC drive may have a second average RT less than the first RT when issuing the same low rate of I/Os. Thus, when selecting an RT threshold or multiplication factor (e.g., which is multiplied by the baseline RT for a LUN to determine that LUN's particular RT threshold amount), it may be that PDs which are SSDs and shared between LUN A and LUN B will result in LUN B experiencing a smaller increase in RT (with respect to LUN B's baseline RT) than if the shared PDs are FC or other rotating disk drives. However, in either case, an increased RT over a threshold (e.g., such as twice the baseline RT for LUN B) may be observed due to issuing the high rate of I/Os to LUN A when both LUN A and LUN B share one or more PDs. Thus, an embodiment may use a same multiplication factor in determining LUN RT thresholds across different storage device technologies, storage tiers, and the like, whereby the multiplication factor is multiplied by the LUN's baseline RT to determine a threshold indicating a significant RT increase for the LUN. The foregoing threshold indicating significance may be used in the above-mentioned fourth step. The fourth step may include comparing an adjusted observed RT for a LUN with its corresponding baseline RT for the LUN. If the difference between the foregoing two values is equal to or greater than the threshold indicating a significant increase in RT for the LUN, then the LUN may be determined to have a significant increase in RT due to the increased workload on the selected LUN. It should be noted that an embodiment may specify the RT threshold(s) in any suitable manner where the above-mentioned application of the same multiplication factor to a baseline RT for all LUNs is one such technique.

As a fifth step, a resulting first set of LUNs may be formed including the selected LUN to which a high rate of I/Os are directed and any other LUNs determined in the fourth step to have a significant increase in RT as a side effect of, or due to, the increased workload on the selected LUN. The LUNs in the first set may be characterized as some number of one or more LUNs having a PD dependency whereby each of the LUNs stores at least a portion of their data on the same PD (or the same one or more PDs).

As a sixth step, a remaining set of LUNs may be determined by removing the LUNs in the first set from the set of all LUNs of the data storage system (or more generally thus under consideration for processing using the techniques herein).

The above-mentioned steps may be included in a first iteration in an embodiment in accordance with techniques herein. The first iteration may determine some number of one or more LUNs having a PD dependency whereby each of the LUNs stores at least a portion of their data on the same PD (or the same one or more PDs). At the end of the first iteration, a remaining set of LUNs may be determined by removing the first set of LUNs (determined as having PD dependencies in the first iteration) from the set of all LUNs of the data storage system (or more generally thus under consideration for processing using the techniques herein).

A second iteration may be performed in a manner similar to that as described for the first iteration but beginning with the second step as there may be no need to re-establish the baseline RTs. In the second iteration, processing continues using the remaining set of LUNs (as determined at the end of the first iteration) and the remaining set of LUNs is then updated at the end of the second iteration. In a manner similar to the second iteration, subsequent iterations may be performed as needed until the set of remaining LUNs is empty thereby indicating that all LUNs under consideration have been processing. At the end of each iteration "i, the remaining set of LUNs processed in the next iteration "i+1" is reduced by the one or more LUNs of iteration "i" determined as having a PD dependency. Thus processing may perform G iterations where a set of one or more of the N LUNs are removed with each iteration "i" in that "ith" iteration's sixth step where G represents the number of PD groups.

More generally, the techniques herein may determine how the total number of N LUNs are distributed across the G groups of PDs. Let Qi represent the quantity of the N LUNs determined in the ith iteration to have a PD dependency. In connection with techniques herein with respect to processing performed for a total of N LUNs, each iteration "i" of processing determines a quantity "Qi" of the N LUNs having PD dependencies whereby such one or more LUNs determined as having PD dependencies may form a set of LUNs determined as having PD dependencies for one PD group and the set of LUNs has Qi members (Qi having an integer value of 1 or more). The set of Qi LUNs includes the selected LUN to which a high rate of I/Os are directed in iteration "i" and any additional LUNs having a significant increase in observed RT (e.g., more than a threshold amount increase in RT with respect to the baseline RT for the particular LUN as determined in the first step noted above. The distribution of LUNs across the G iterations may be generally represented as:

$$Q1+Q2+\ldots+Qg=N$$

wherein each iteration "i" determines that Qi LUNs have their data stored in the same PD group of one or more PDs.

One embodiment of the techniques herein may output sets of one or more LUNs determined for in each iteration as having a PD dependency. Thus, the techniques herein may be characterized as having a low computational complexity which is of the order of the number of PD groups (e.g., O (number of PD groups), where the number of PD groups is equal to or less than the number of PDs given that each PD group may include one or more PDs).

Figure 25:
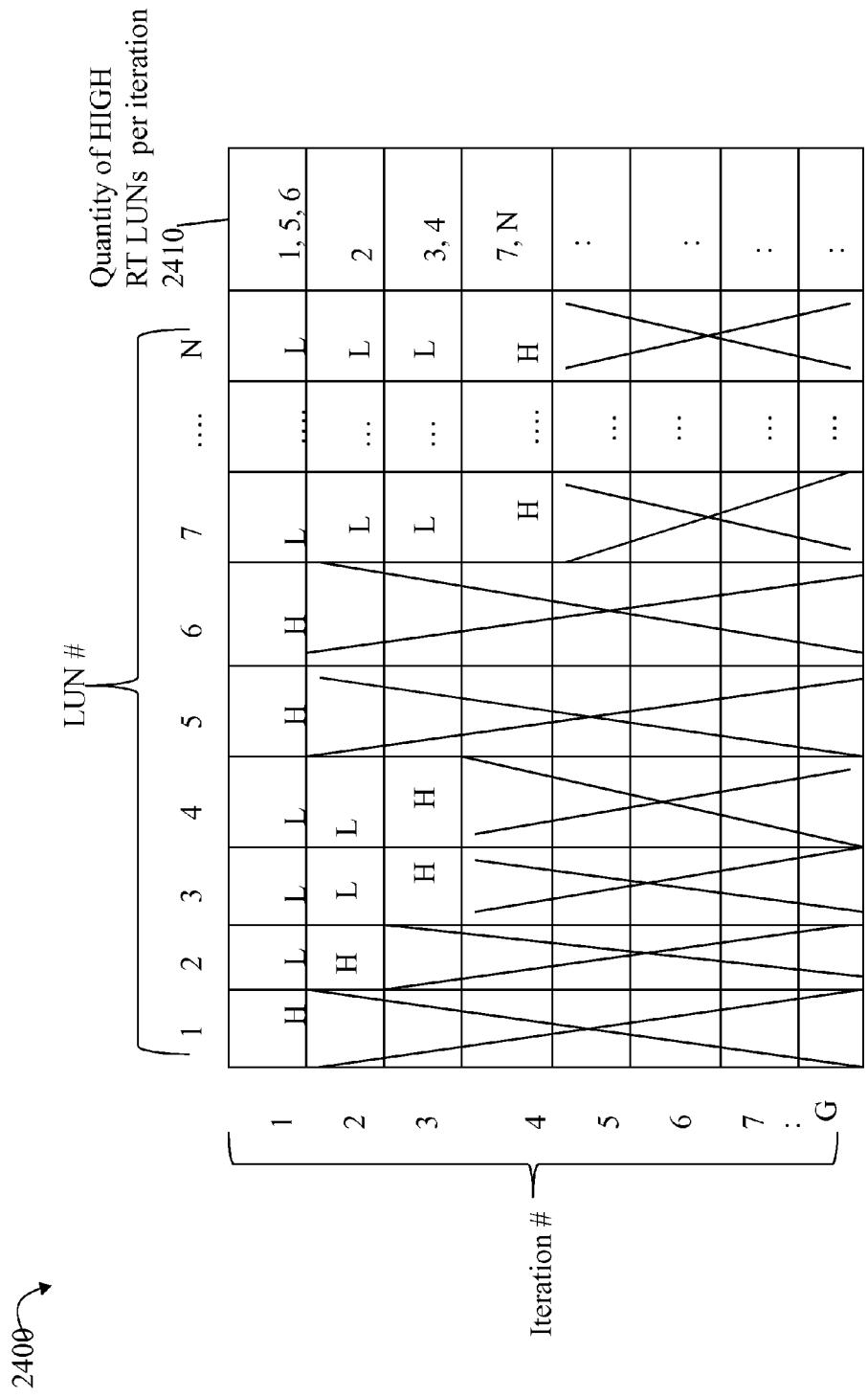
FIG. 25 is an example of a table or matrix illustrating one way in which data may be organized for use in connection with a technique for determining PD dependencies among LUNs.

Referring to FIG. 25, shown is an example illustrating one way in which data may be represented for use in accordance with techniques herein. The example 2400 illustrates a matrix M or table of values having a row for each iteration of processing of techniques herein and a column for each LUN (note there is an additional rightmost column 2410 in the table discussed below). For a given row corresponding to an iteration i, an indicator of H in column j (e.g., entry M[i,j]=H) may indicate that the LUN j is determined to have a HIGH or significant adjusted observed RT over a threshold. It should be noted that the H in this example is used to denote the LUN which is selected in the second step of an iteration having a HIGH rate of I/Os send thereto, and also to indicate any additional LUNs having a HIGH or significant adjusted observed RT (e.g. as determined as a result of the fourth and fifth steps described above). Similarly, for a given row corresponding to an iteration i, an indicator of L in column j (e.g., entry M[i,j]=L) may indicate that the LUN j is determined to have a LOW observed RT (e.g., not HIGH above an RT threshold indicating a significant spike or increase in RT as described elsewhere herein). A column j of the matrix M having an X drawn through one or more entries in the column j following an occurrence of an H in iteration "f" (e.g., H is in entry M[f, j]) represents the removal or subtraction of that LUN j from the set of LUNs considered in iterations subsequent to iteration "f". For example with reference to column 1 for LUN1 which is the selected LUN in iteration 1 (e.g., to which a high rate of I/Os is sent), the foregoing removal of LUN1 from further evaluation or processing of a subsequent iteration 2 or more is illustrated by the X extending through entries M[1,2] through M[1,G], inclusively.

Element 2410 is illustrated as the last column of the table having an entry for each row or iteration and may identify a resulting set of one or more LUNs determined in that row or iteration as either being the selected LUN to which the high rate of I/Os are directed in the second step of this iteration, or otherwise being a LUN having a significant increase in adjusted observed RT for that iteration due to the high rate of I/Os directed to another selected LUN.

For example with reference to row 1 of the table in 2400 for the first iteration, LUN1 may be selected as the LUN to which the high rate of I/Os are directed in the second step. LUNs 5 and 6 may be the LUNs additionally adversely impacted by the increased workload to LUN 1 as indicated by a significant increase in adjusted observed RTs for LUNs 5 and 6 (e.g., such as determined in connection with the fourth and fifth steps described above).

Figure 26:
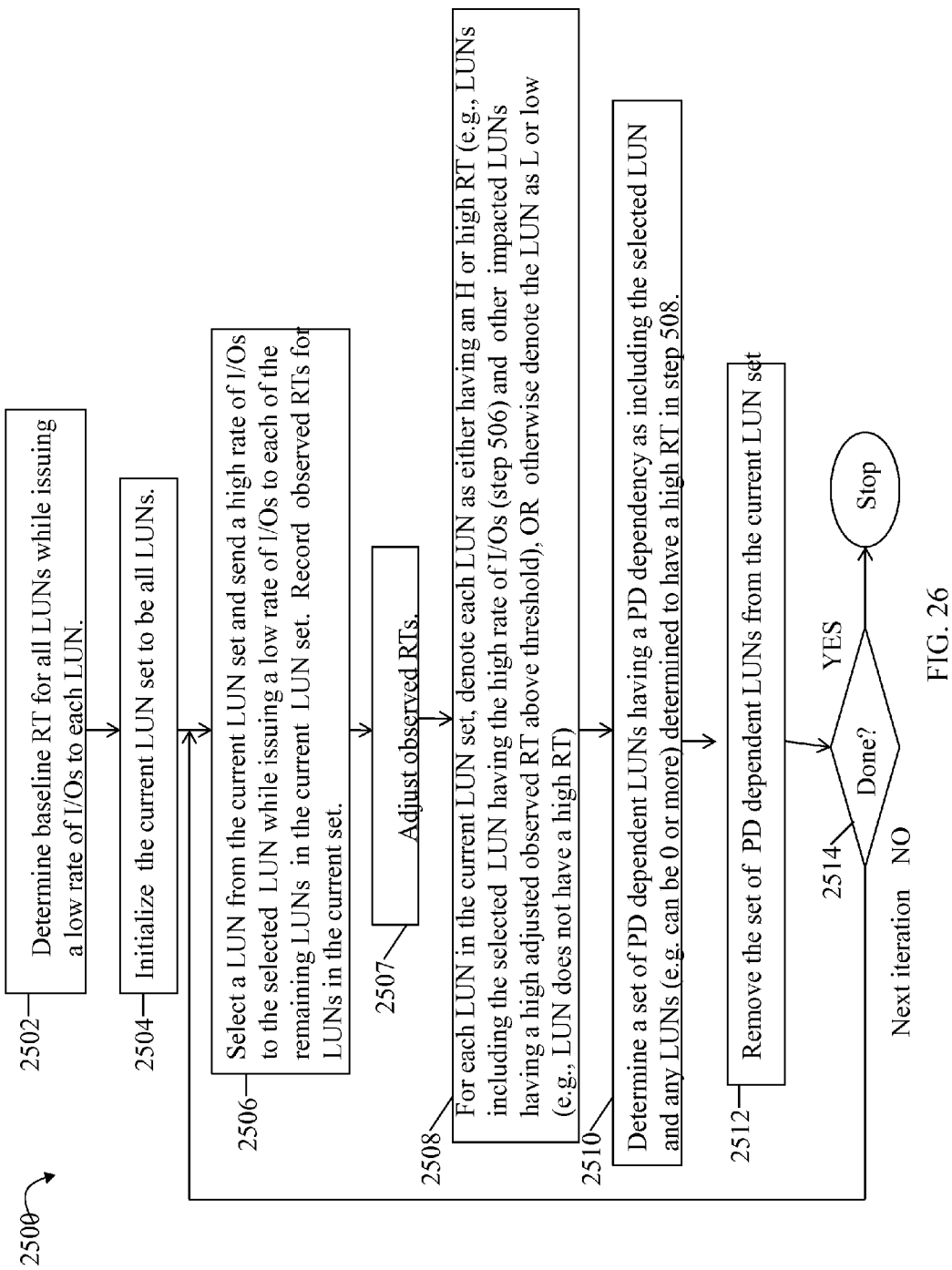

Referring to FIG. 26, shown is a flowchart of processing steps that may be performed in an embodiment herein to identifying PD dependencies between sets of LUNs. The flowchart 2500 summarizes processing as described above. In step 2502, a baseline RT is determined for all RTs such as by issuing a low rate of I/Os to each LUN in parallel. Step 2502 includes processing as described above with respect to the first step. At step 2504, a set denoted as the current set of all LUNs to be processed is initialized. As will be apparent in connection with further description, the current set of LUNs may correspond to the remaining set of LUNs which is updated in accordance with each iteration. In step 2506, a LUN is selected from the current LUN set and a high rate of I/Os are sent to the selected LUN while also issuing in parallel a low rate of I/Os to each of the remaining LUNs in the current set. Step 2506 may also include recording observed RTs for each of the LUNs in the current set while issuing I/Os at the foregoing rates to the selected LUN and the remaining LUNs. Step 2506 includes processing as described above in connection with the second step of an iteration. At step 5207, the observed RTs may be adjusted by subtracting out or removing the baseline RT values from the recorded observed RTs obtained thereby forming a set of resulting adjusted observed RTs. Step 2507 includes processing as described above in connection with the third step of an iteration. At step 2508, processing is performed to identify each LUN in the current LUN set as having a high significant increase in adjusted observed RT or not (thereby having a low or insignificant increase in RT). It should be noted that each LUN denoted as having a high or significant increase in adjusted observed RT may include the selected LUN of step 2506 and may also include other LUNs, if any, experiencing a significant spike or increase in RT due to pushing the high I/O rate to the selected LUN. For each LUN in the current LUN set, denote each LUN as either having an H or high adjusted observed RT, OR as having an L or low such RT. Those LUNs denoted as having a high adjusted observed RT may include the selected LUN having the high rate of I/Os directed thereto in step 2506 and those LUNs, if any determined to have a significant increase in observed RT due to the increased I/O rate to the selected LUN. Any other LUN in the current set may be determined as having a low or L RT. It should be noted that by increasing the rate of I/Os to the selected LUN in step 2506 to the high rate, it may be expected that the selected LUN's observed RT will increase a significant amount in comparison to the selected LUN's baseline RT (e.g., the selected LUN's RT will increase by more than a threshold amount, such as by more than twice the selected LUN's baseline RT as described elsewhere herein). Step 2508 may include processing of the fourth step described elsewhere herein. At step 2510, a set of dependent LUNs having a PD dependency may be determined as including those one or more LUNs from step 2508 having the H or high RT notation (e.g., the selected LUN and any other LUNs having a significant increase in RT due to the increased workload on the selected LUN in step 2506). Step 2510 may include processing of the fifth step as described elsewhere herein. At step 2512, processing may be performed to remove the set of PD dependent LUNs from the current LUN set. Step 2512 may include processing of the sixth step as described elsewhere herein. A determination is made at step 2514 as to whether processing is completed such as by determining whether the current LUN set is empty. If step 2514 evaluates to yes, processing stops. Otherwise, control proceeds to step 506 for the next iteration of processing on the remaining LUNs in the current LUN set.

In connection with the second technique for determining PD groups of PD dependent LUN set, an embodiment may issue read I/Os in accordance with an I/O pattern. When determining the baseline (e.g., step 2502 of FIG. 26) and when issuing I/Os at the high rate to the selected LUN (e.g., step 2506 of FIG. 26), an embodiment may issue, for example, I/Os directed to locations across the entire LUN's address range for each of the LUNs under test where such I/Os may be random read I/Os to all LUNs in parallel. Such I/Os may have a fixed such, such as 8 KB. When determining the baseline (e.g., step 2502 of FIG. 26), an embodiment may, for example, issue random read I/Os at a rate of about one every T seconds where T=100 milliseconds. Additionally, it should be noted that an embodiment may use varying thresholds. An example threshold such as used in connection with step 2508 may be about twice the baseline RT of a LUN whereby for the LUN to be deemed impacted as having a "high" RT. As another example, an embodiment may use a threshold of about 1.5 or 150% more than the LUN's baseline RT. Thus the adjusted RT for a LUN observed in step 2508 would be at or above a threshold amount of about 1.5 times the LUN's baseline RT as determined in step 2502. The foregoing are some examples of an I/O rate, size, thresholds, and the like, that may be used in an embodiment in accordance with techniques herein. However, as will be appreciated by those skilled in the art, such particular examples are merely illustrative and more generally, an embodiment may use any suitable I/O rate, type(s) of I/Os, I/O size(s), and the like, for the particular embodiment.

In order to avoid a case where issues related to cache size may cause a decreased observed RT thereby possibly obscuring actual disk performance, an embodiment may use a configuration whereby the total collective capacity of all LUNs under test using techniques herein as about two orders of magnitude larger than the total cache size of the data storage system including such LUNs. If the cache size is not available, or if the total LUN size is not sufficiently higher than the cache size, then an embodiment may measure not only the average response times, but also histograms of the response times as described elsewhere herein. The cache effects causing decreased RTs may then be isolated by excluding or filtering the bins in the histogram corresponding to those RTs which may be deemed decreased due to cache and recalculating the average RT by excluding any RTs in the filtered out RT bins.

The processing just described may be used in generally discovering and identifying those LUNs that have PD dependencies. Although this second technique for determining LUNs having PD dependencies may be used in combination with the processing of FIG. 21 where each LUN is assigned a performance classification, this second technique may also be used in an embodiment in combination with a different way of assigning performance classifications for LUNs. In this case, an embodiment may first determine the LUN-PD dependencies as above and may now want to further utilize the above-mentioned PD dependent LUN sets determined for each iteration whereby each set LUN set represents a set of physically device dependent LUNs. For example, it may be desirable to further now determine a type of drive, technology, storage tier, performance classification, and the like, for each PD group associated with each LUN set determined by one iteration of the above-mentioned algorithm. For example, with reference back to FIG. 25, one grouping of LUNs determined in iteration 1 which are physically device dependent upon one another includes LUNs 1, 5, and 6. Thus, LUNS 1, 5 and 6 have at least a portion of their data stored upon a same set of one or more PDs denoted as PD group 1. Now, we may want to further characterize those one or more PDs of PD group 1 as being PDs of a particular performance classification, storage tier (where PDs in the storage tier have the same set of one or more properties in common to all PDs of the storage tier/used to define the basis for the storage tier definition), drive technology, type, and the like. For example, in an embodiment having three defined storage tiers, it may be desirable to determine which LUN groups are stored on PDs that are EFD (enterprise flash drives) or flash drives (e.g., first highest performing storage tier), FC rotating disk drives (e.g., second highest performing storage tier) or SATA rotating disk drives (e.g., third or lowest performing storage tier). As described elsewhere herein, LUNs which are determined as PD independent with respect to other LUNs considered for processing and which are of the same storage tier, same performance classification, same drive type or technology, etc., may be those preferably included into the same LUN pool configured by the host. As also described elsewhere herein, such a pool may be used as a pool of LUNs from which storage may be allocated in connection with data movement optimization techniques described herein. It should be noted that a PD independent LUN may be characterized as a LUN set determined in an iteration of processing of FIG. 26 that includes a single LUN. Such further characterizations of LUNs as being PD independent (e.g., no sharing of PDs with other LUNs evaluated), PD dependent (e.g., sharing of one or more PDs among multiple LUNs evaluated), and the like, are described elsewhere herein.

To this end, what will now be described are further techniques as may be performed in an embodiment to further classify or characterize one or more PDs of the PD group upon which data for a set of one or more LUNs is provisioned (e.g., the set of LUNs being determined by an iteration using the techniques just described and as summarized in FIG. 26) by assigning such LUNs and underlying PDs in the PD group a performance classification. It should be noted that classification of a PD group associated with a LUN set including only a single LUN is straightforward such as by comparing the single curve for the LUN to known or expected characteristic curves for an EFD drive, FC drive, and the like. The techniques described below in connection with combining or aggregating are relevant for LUN sets including two or more LUNs which are thereby determined as being a PD dependent set of LUNs.

In connection with performing processing to classify the PD group for a LUN set, a curve may be obtained for each LUN under consideration by issuing I/Os to each LUN in parallel for varying queue depths. For example, an embodiment may set the same average queue depth for all LUNs to a first value and issue I/Os to all LUNs in parallel at a rate suitable or sufficient to maintain such an average queue depth. During this time, an average RT for each LUN may be recorded. The foregoing may now be repeated one or more additional times for varying queue depths=1, 2, 4, 8, 16, 32, and the like. To further illustrate, the queue depth value may be set to 1 for all LUNs and then in parallel, I/Os are issued to all the LUNs to obtain this average queue depth over a time period for which an average RT is determined for each LUN. The queue depth is then set to 2, and for all LUNs in parallel, I/Os are issued to obtain this average queue depth over a time period for which an average RT is determined for each LUN. The foregoing is then repeated for any desired remaining average queue depth values.

An embodiment may also perform the foregoing processing by issuing I/Os to a PD of each of the different storage tiers or other classification to obtain a benchmark curve for such PDs. For example, the foregoing as performed for each LUN may also be performed for a first PD that is an EFD to obtain various RTs for corresponding queue depth values expected for a PD of the EFD storage tier or classification. The foregoing as performed for each LUN may also be performed for a second PD that is an FC rotating disk drive of a particular RPM to obtain various RTs for corresponding queue depth values expected for a PD of the FC storage tier or classification. The foregoing as performed for each LUN may also be performed for a third PD that is a SATA rotating disk drive to obtain various RTs for corresponding queue depth values expected for a PD of the SATA storage tier or classification. As such an embodiment may obtain various characteristic curves of RTs vs. queue depth values for the LUNs and also for different storage tiers of PDs as may be included in an embodiment.

Figure 27:
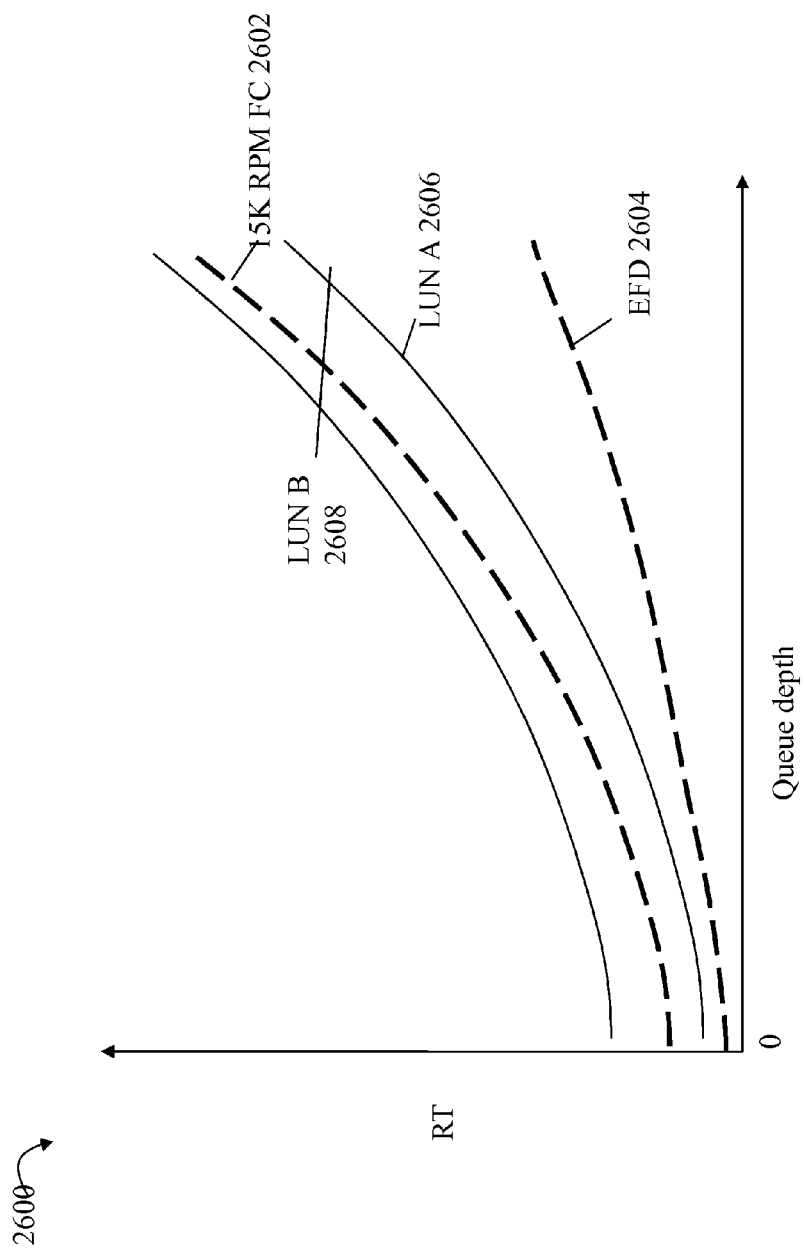
FIGS. 27 and 28 are examples of performance curves that may be used in an embodiment in accordance with techniques herein.

With reference to FIG. 27, shown is an example representation of the general shape of curves as may be obtained in connection with two LUNs and for two of the different storage tiers of PDs in one embodiment in accordance with techniques herein. The example 2600 includes a graphical representation of curves for LUN A and LUN B which may be included in a LUN set of PD dependent LUNs as determined by an iteration of FIG. 26 processing. Also included in the example 2600 are curves for an EFD drive and a 15K RPM FC rotating disk drive. For each of the foregoing curves, illustrated are various RTs obtained for corresponding queue depth values. Based on the comparison of curves in the example 2600, curves 2606 and 2608, respectively, for LUN A and LUN B individually appear to be more similar to the FC curve 2602 than the EFD curve 2604. However, as will be described in more detail below, if information as denoted regarding the queue depths and RTs of the curves for the LUNs of the same PD group and same LUN set (as determined by an iteration of the FIG. 26 processing), the LUNs may collectively have the characteristic performance curve for a different storage tier or PD classification (e.g., EFD) rather than a first storage tier or classification (e.g., FC drives) as may be determined based on an initial comparison using individual LUN curves. Thus, an embodiment may perform processing to combine or aggregate LUN curves based on PD groupings determined using FIG. 26 processing to further obtain an aggregate resulting curve for the PD group or set of LUNs having their storage provisioned on PDs of the same PD group. Aggregated results of multiple LUN curves may have different characteristics than individual LUNs. As described in following paragraphs, processing may be performed to aggregate results for different points on the LUN curves by combining (e.g. adding or summing) queue depth values for a single queue depth and then averaging the associated RTs.

Figure 28:
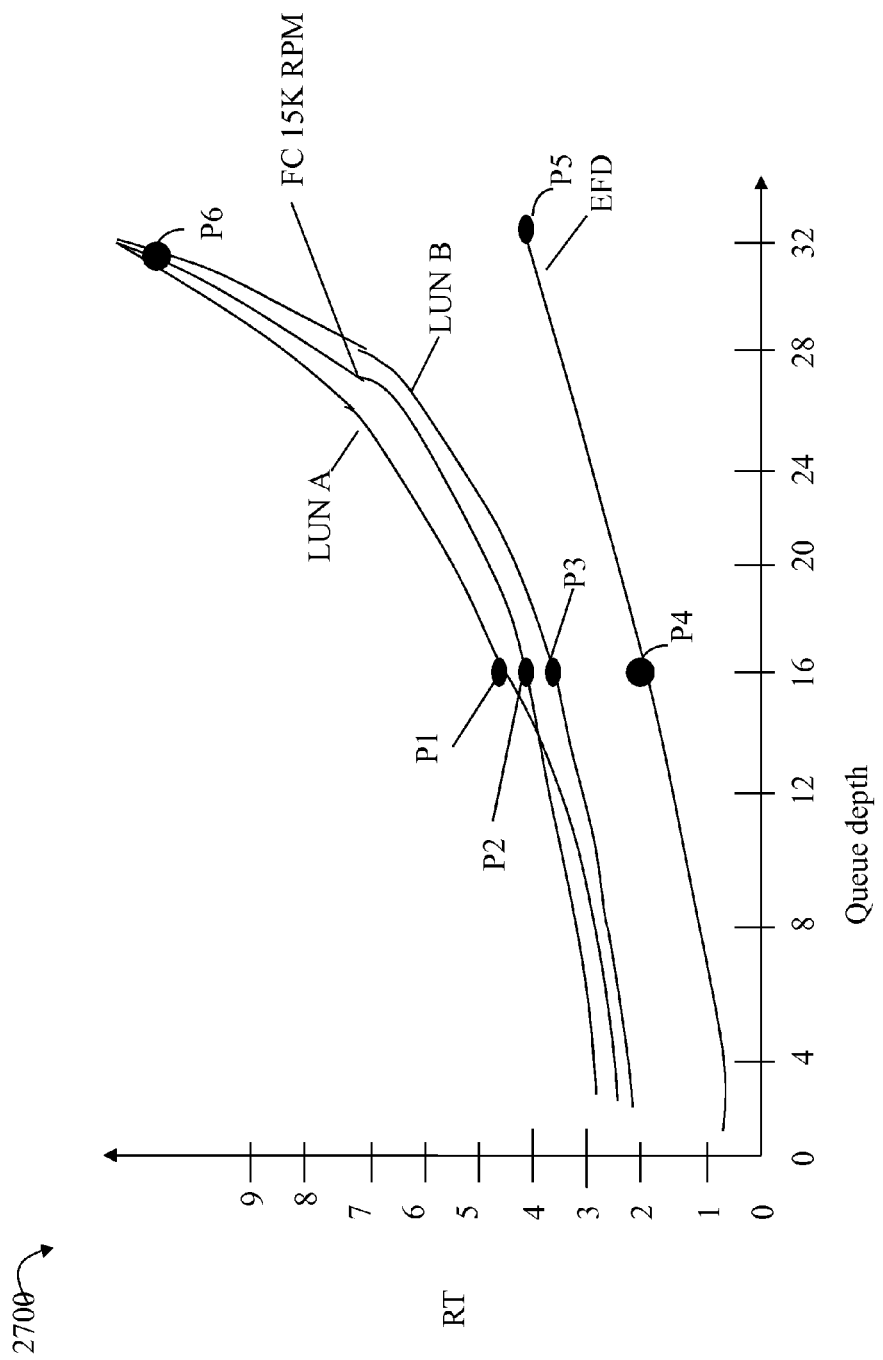

For example, reference is now made to FIG. 28. In the example 2700 of FIG. 28, shown are curves of varying queue depths and associated RTs for an EFD drive, an FC 15 RPM drive and two LUNs, A and B. Using techniques described elsewhere herein, LUNs A and B have been determined to be included in the same PD group having physical device dependencies so that data for LUN A and LUN B is stored on the same one or more PDs of the same PD group Examining curves for LUN A and LUN B in comparison to the FC 15K RPM curve, each of the curves for LUN A and LUN B individually appears similar to the FC 15K RPM drive curve. For example, consider points P1, P2, and P3 illustrating RTs for different curves at Qdepth (queue depth) of 16. P1 indicates that LUN A has a RT of 4.4 ms for queue depth=16. P3 indicates that LUN B has a RT of 3.6 ms for queue depth=16. P2 indicates that a FC 15 RPM drive may have a RT of 4.0 ms for queue depth=16. Thus, individually such as when considering the RT of LUNs A and B for queue depth=16, the RTs for LUNs A and B are similar to that as expected for a FC 15 RPM drive rather than the RT of about 2 ms as represented by point P4 for the EFD drive.

However, now consider data from the two curves for LUN A and LUN B in the aggregate in comparison to the curve for the EFD drive. For example, consider the aggregate of data represented in the curves for LUN A and LUN B for a queue depth of 16. In this case, processing may be performed to add or sum the queue depth of 16 for each of the points P1 and P3 and average the RTs of points P1 (e.g., RT=3.6) and P3 (e.g., RT=4.4) to generate an aggregate data point having a queue depth of 32 and an average RT of 4.0 (e.g., (3.6+4.4) divided by 2). Thus a first aggregated data point for the two curves for LUNs A and B may have an X coordinate denoting a queue depth value of 32 and a Y coordinate denoting a corresponding RT of 4.0. Referring to the EFD curve, point P5 denotes the average RT expected for an EFD drive at a queue depth of 32 is also 4.0 ms. Thus, when viewed in the aggregate, the aggregate of points P1 and P3 for, respectively, LUNs A and B is similar to the RT of point P5 on the EFD characteristic curve rather than the RT of point P6 on the FC 15K RPM curve for the aggregate queue depth of 32.

In a similar manner, an aggregate of the queue depths and RT values for other points on the curves for LUNs A and B may be determined to generate a combined or aggregated curve for LUNs A and B. This aggregated curve may then be compared to characteristic curves for the FC 15K RPM drive and the EFD drive. In this particular example, it may be that the aggregated curve is determined to have greater similarity to the EFD curve rather than the FC 15 K RPM curve thereby resulting in the one or more PDs storing data for LUN A and B to be determined as EFD drives rather than FC drives.

As will be appreciated by those skilled in the art, the foregoing description presumes some simplifying assumptions such as the I/Os are of the same and type, the LUNs are the same size, and the like. As will also be appreciated by those skilled in the art, an embodiment may perform refinements to the foregoing to account for any variations such as, for example, such as LUNs of different sizes, I/Os of varying sizes, and the like.

It should be noted that the foregoing is merely one use of the resulting PD groups and associated LUNs determined as mapped or having their data stored in the same PD group. Furthermore, the classification or storage tier of the PDs in a particular PD group as determined based on the aggregated information for LUNs determined as being mapped to a same PD group may be used for a variety of different purposes. One such use is in connection with the formation of pools and data movement optimization processing as described herein.

The foregoing describes a second technique that may be used to discover PD groups (LUNs to PD mapping) for those LUNs which have storage provisioned on a common set of one or more PDs. With reference back to FIG. 26, such processing is generally described where each iteration may identify a set of one or more LUNs determined to have such a PD dependency (e.g. have storage provisioned from a PD group of one or more PDs). Subsequent to this, an embodiment may further perform additional processing to characterize or classify PDs of each PD group upon which a set of LUNs has its storage provisioned where such processing is based on aggregated information for the set of LUNs mapped to each PD group.

Generally, such processing may be performed in any application where determination of such information of LUN to PD group mapping and storage tier or other PD classification for the PD groups may be needed and not otherwise known other than through discovery using the techniques herein.

For example, as described elsewhere herein such techniques may be used as one way in which a host may discover information about LUNs of a data storage system accessible to the host. The host may want to discover and know such PD dependencies for a set of LUNs and may further want to know the storage tier classification for such PDs upon which the set of LUNs has its storage provisioned. For example, the host may perform processing using the techniques herein in connection with an optimizer executing on the host for data movement among pools of LUNs of the different storage tiers. As such, each pool may include provisioned physical storage (PDs) associated with those LUNs determined as having such PDs which are of the same storage tier, classification, and the like.

What will now be presented are exemplary results as obtained by the inventors using this second technique with a simple configuration. In this example, there are 3 PDs. Each of the 3 PDs may be configured to have 2 LUNs of the same capacity sharing the single PD. The following TABLE 1 includes response times obtained for each LUN (denoted 0-5) and for each queue depth (QD) of 1, 2, 4, 8, 16, and 32. In TABLE 1, each cell contains a pair of Response Time (in milliseconds) followed in the next line by IOSPS (IOs per second). The TABLE 1 results were obtained by issuing random read I/Os across the entire address space of each LUN.

TABLE 1

Response Times and IOSPS for each LUN and Queue Depth

| QD LUN | 1 | 2 | 4 | 8 | 16 | 32 |
|---|---|---|---|---|---|---|
| 0 | 27.103 | 22.218 | 32.048 | 50.169 | 96.722 | 239.189 |
|   | 36.902 | 90.383 | 123.407 | 154.513 | 170.118 | 132.894 |
| 1 | 28.112 | 24.349 | 33.002 | 53.081 | 89.015 | 232.891 |
|   | 35.506 | 82.053 | 121.209 | 150.776 | 177.502 | 138.433 |
| 2 | 2.219 | 3.187 | 6.063 | 12.649 | 24.947 | 53.565 |
|   | 449.611 | 627.047 | 659.435 | 632.251 | 641.262 | 597.699 |
| 3 | 2.220 | 3.190 | 6.058 | 12.633 | 24.909 | 53.353 |
|   | 449.461 | 626.399 | 660.034 | 633.247 | 642.359 | 599.645 |
| 4 | 2.276 | 3.352 | 6.371 | 12.734 | 24.862 | 52.190 |
|   | 438.291 | 596.221 | 627.672 | 628.115 | 643.656 | 612.820 |
| 5 | 2.276 | 3.477 | 6.513 | 12.915 | 24.923 | 52.387 |
|   | 438.391 | 574.822 | 613.938 | 619.346 | 641.910 | 611.672 |

In connection with processing to discover PD dependency groups using this second technique (e.g., as summarized in FIG. 26), the "non-busy" or LOW workload such as used in connection with obtaining the baseline RTs was obtained by issuing an I/O to each LUN in parallel every 25 milliseconds so as to maintain an average queue depth of 1 or less for each LUN. When obtaining observed RTs for the LUNs, the algorithm processing was run for 10 seconds first without recording RTs and then run for another 20 seconds during which observed RTs were recorded for use. Baseline response times obtained for the 6 LUNs (0 . . . 5 inclusively) were:

| LUN | Resp Time (msec) |
|---|---|
| 0 | 15.525 |
| 1 | 12.751 |
| 2 | 1.230 |
| 3 | 1.174 |
| 4 | 1.271 |
| 5 | 1.242 |

In following paragraphs describing various processing iterations of this second technique, a threshold of 150% (e.g., 1.5 times) of the base RT for each LUN is used. In a first iteration of processing, LUN0 is selected as the "busy LUN" to which a HIGH rate of I/Os are issued (e.g., maintain about a queue depth of 32 for LUN0 of 32 pending random read I/O requests). The remaining LUNs may be issued I/Os as in connection with obtaining the baseline RTs. The following are observed adjusted RTs obtained from the first iteration:

| BusyLUN = 0 | |
|---|---|
| LUN | Resp Time (msec) |
| 1 | 1540.644 |
| 2 | 1.118 |
| 3 | 1.097 |
| 4 | 1.217 |
| 5 | 1.171 |

From this first iteration, a first PD dependency group may be determined as including LUNs 0 and 1 and the second iteration continues with remaining LUNs 2-5. In this second iteration, LUN 2 may be selected as the "busy LUN" to which a HIGH rate of I/Os are issued (e.g., maintain about a queue depth of 32 for LUN0 of 32 pending random read I/O requests). The remaining LUNs may be issued I/Os as in connection with obtaining the baseline RTs. The following are observed adjusted RTs obtained for this second iteration:

| BusyLUN = 2 | |
|---|---|
| LUN | Resp Time (msec) |
| 3 | 32.986 |
| 4 | 1.142 |
| 5 | 1.117 |

From this second iteration, a second PD dependency group may be determined as including LUNs 2 and 3 and the third iteration may continue with remaining LUNs 4 and 5. In this third iteration, LUN4 may be selected as the "busy LUN" to which a HIGH rate of I/Os are issued (e.g., maintain about a queue depth of 32 for LUN0 of 32 pending random read I/O requests). The remaining LUN5 may be issued I/Os as in connection with obtaining the baseline RTs. The following are observed adjusted RTs obtained for this third iteration:

| Busy LUN = 4 | |
|---|---|
| LUN | Resp Time (msec) |
| 5 | 32.908 |

From this third iteration, a third PD dependency group may be determined as including LUNs 4 and 5.

Based on the above-mentioned three PD dependency groups, the RTs for those LUNs in the same group may be viewed in the aggregate for performance consideration and classification of the PD dependency groups as described above. TABLE 2 provides the different aggregate RTs for each PD dependency group at different queue depths applied to all LUNs. The effective queue depths for each dependent group are queue depths used for LUNs multiplied by the number of LUNs in the group.

TABLE 2

Response Times and IOSPS for each PD
Dependency Group (DG) and Queue Depth (QD)

| QD<br>DG | 1 | 2 | 4 | 8 | 16 | 32 |
|---|---|---|---|---|---|---|
| 0 | 27.608 | 23.284 | 32.525 | 51.625 | 92.869 | 236.040 |
|   | 72.4 | 172.4 | 244.6 | 305.3 | 347.6 | 271.3 |
| 1 | 2.220 | 3.189 | 6.061 | 12.641 | 24.928 | 53.459 |
|   | 899.1 | 1253.4 | 1319.5 | 1265.5 | 1283.6 | 1197.3 |
| 2 | 2.276 | 3.415 | 6.442 | 12.825 | 24.893 | 52.289 |
|   | 876.7 | 1171.0 | 1241.6 | 1247.5 | 1285.6 | 1224.5 |

Based on the above results of TABLE 2, it may be concluded that PD dependency groups 1 and 2 are of the same first performance classification or category and PD dependency group 0 is of a second different performance classification. The second performance classification includes PDs which have lower performance characteristics than PDs of the first performance classification. As described herein, an embodiment may further compare the above-referenced data for the two performance classifications to predetermined performance curves in order to determine whether the first performance classification matches characteristics typical of SSD drives and whether the second performance classification matches characteristics typical of a slower storage drive technology such as SATA.

The foregoing is an example of results obtained by the inventors in connection with a simple configuration using techniques herein. However, as will be appreciated by those skilled in the art, existing system utilizing such techniques may typically include many more PDs and LUNs that vary with the particular data storage system(s).

With reference back to FIG. 20 in connection with an embodiment in which the optimizer performing techniques herein executes on the host, the host may perform mapping, such as by a driver on the host in the I/O path, to facilitate mapping host-side logical devices and offsets therein to the appropriate data storage system and LUN. One point to note is that the host and/or data storage systems may optionally each provide one or more logical device mapping layers. A host may include one or more logical device mapping layers so that a host may access data on a host logical device or volume which is mapped to one or more logical data storage system entities such as one or more LUNs (logical unit numbers), or one or more portions of one or more LUNs, where each such LUN is exposed to the host by the data storage system. Each of the logical data storage system entities, such as LUNs or portions of LUNs, onto which the host logical device is mapped may correspond to a single physical device, multiple physical devices configured by the data storage system as the single exposed LUN, a portion of a single physical device or portions of multiple physical devices configured as a single exposed LUN, and the like, as may be configured on the data storage system. Thus, the data storage system may be an intelligent data storage system which provides its own internal logical device mapping layers whereby the data storage system logical device, such as a LUN, is what is exposed by the system for use by its clients, such as a host. For example, a LUN as exposed to the host by the data storage system may be logically mapped on the data storage system to a single physical device, multiple physical devices, a portion of a physical device, and the like, as just noted. The LUNs as exposed by the data storage system to the host may be further mapped to host-side logical devices or volumes through one or more additional mapping layers on the host.

To further illustrate, reference is made to FIG. 29A. The example 3300 includes a host 3302 with mapping information 3310 for host side logical device X, data storage system (DS) 1 3312 including LUN1, and DS 2 3314 including LUNs 2 and 3. At a first point in time, host logical device X may have a first portion (e.g., LBA 1-50) located on DS1, LUN1 and a second portion (LBA 51-100) located on DS2, LUN2 as illustrated in the mapping information 3310 on the host 3302. For purposes of illustration, assume that LUN1 and LUN2 are SATA drives of a third lowest performing storage tier in a system have three defined storage tiers of EFD drives (highest or first performing tier), FC drives (second or mid level performing tier) and SATA drives (third or lowest performing tier). At the first point in time, there is little or insignificant I/O activity with respect to the first and second portions of host logical device X. At a second point in time, techniques herein may be performed on the host to determine, based on activity levels of the foregoing first and second portions of host logical device X, should be relocated or moved. In particular, the activity levels of the first and second portions of host logical device X greatly increases and techniques herein may determine that the data of the first and second portions should be relocated or moved to LUN3 in DS2 where LUN3 is of the EFD storage tier. The host may initiate and control processing to perform such data movement or migration using any suitable technique. For example, the first portion currently on LUN1 in DS1 may be migrated to LUN3 in DS2 using any suitable technique for migrating data between data storage systems such as between data storage arrays if DS1 and DS2 are different storage arrays or appliances. To further illustrate, the host may issue a command to DS1 to utilize any suitable technique to move the first portion of data from LUN1 of DS1 to LUN3 in DS2. For example, an embodiment may use a product such as a Remote Data Facility (RDF) product provided by EMC Corporation of Hopkinton, Mass. (e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices. A different technique may be used to move the second portion from LUN2 of DS2 to LUN3 of DS2 since such LUNs are both within the same physical data storage system. To an application of the host accessing or issuing an I/O to host logical device X, the data movement may be transparent in several respects. First, the evaluation any actual data movement may be performed automatically without the application being aware of such movement. Additionally, the application may issue an I/O operation specifying the host logical device X and offset or logical address offset within logical device X. Software on the host handles the mapping of the logical device X, offset to a particular DS and LUN. As portions of data of logical device X are physically relocated or moved to different LUNs in the same or different DSs, the mapping information on the host for logical device X may be accordingly updated.

Figure 29B:
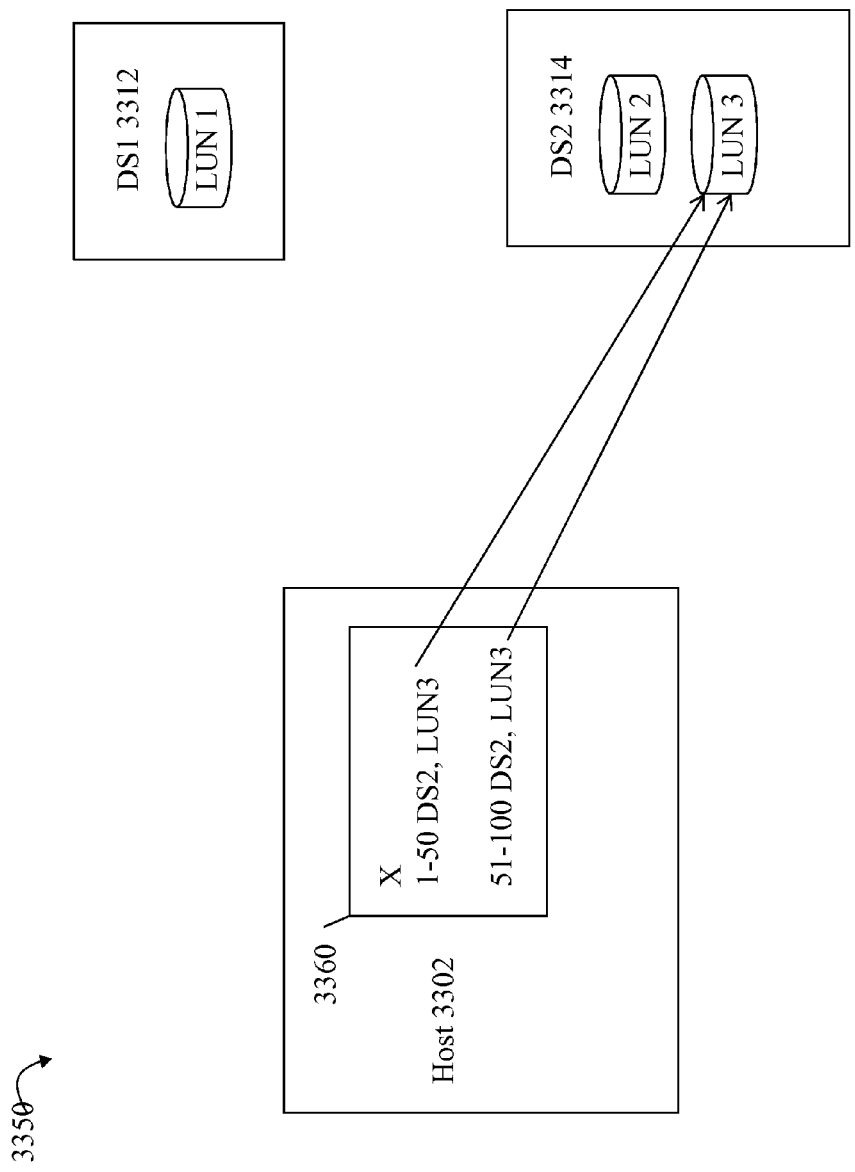

For example, now with reference to FIG. 29B, shown are the components of the example 3300 which have been updated to reflect the above-mentioned data movement. In the example 3350, the mapping information 3360 has been updated to reflect the data movement as determined and controlled by the host to move data portions of host logical device X to DS2 LUN3. The mapping information may be updated by software on the host as data movements are made. Additionally, software on the host may utilize the mapping information 3360 to route or direct host I/O operations to the appropriate data storage system and LUN at the current time an I/O is issued.

In connection the optimizer performing techniques herein being located on the host, the host may perform processing, for example, to obtain and calculate the statistics needed for performing optimization (e.g., evaluating whether to perform a data movement, determining thresholds, data movement candidates and the like) from the host perspective. The host may use the gathered or collected statistics in connection with performing data movement and also performing ongoing evaluation of candidate data portions as described elsewhere herein. Additionally, the host may use the gathered or collected statistics for validating or assessing in an ongoing manner discovery information collected using automated techniques described herein (e.g, the performance classifications such as storage tier assigned to each of the different LUNs as part of the host's automated discovery processing to discover information about the LUNs, and the LUNs determined as having PD dependencies). For example, the host may use subsequently gathered RT information for a LUN to ensure that a storage tier classification previously assigned to the LUN is still valid. Over time, the underlying PDs upon which a LUN has its storage provisioned may be physically changed and such ongoing validation is one way in which the host may ensure any such changes are detected and information used by the host accordingly updated.

The host may control aspects of processing described herein such as, for example, collection and management of statistics, controlling evaluation of candidates for data movement, and moving or relocating data based on I/O activity or workload to the data. The host may perform such actual data movement using any suitable data migration or relocation technique. For example, with reference to FIG. 20, the host 1502 may issue commands to DS1 to initiate the data migration of P1 from DS1, LUN A to DS2, LUN C using connections between DS1 and DS2 such as techniques using RDF products and functionality by EMC Corporation as described elsewhere herein. As another example, the host may include code which performs and controls the data migration by issuing read commands to read all the data of P1 from LUN A, DS1 and then writes all the P1 data just read to LUN C, DS2.

It should also be noted that the foregoing, such as with reference to FIG. 20, is made with respect to a single or client using the one or more data storage systems. However, it may be that there are multiple such hosts or other clients using (e.g., issuing reads and writes to) the data storage systems. In this case, each such client may perform processing as described herein. However, it should be noted that when a client such as a host is evaluating where to move data or using the statistics collected, the host needs to consider the activity or workload contributed by the other hosts, if any, by summing or adding the statistics across all such hosts or clients to find out/determine how busy an extent of storage really is at a point in time. For example, with reference back to FIGS. 14 and 14A, the histogram that is populated should include collectively or in the aggregate all I/Os across all hosts. As an alternative arrangement, rather than run an instance of the optimizer and other software on each host for performing techniques herein, there may be a single instance on a single host or other component external from the data storage systems which may perform the processing as described herein collectively for all host logical devices.

Figure 29C:
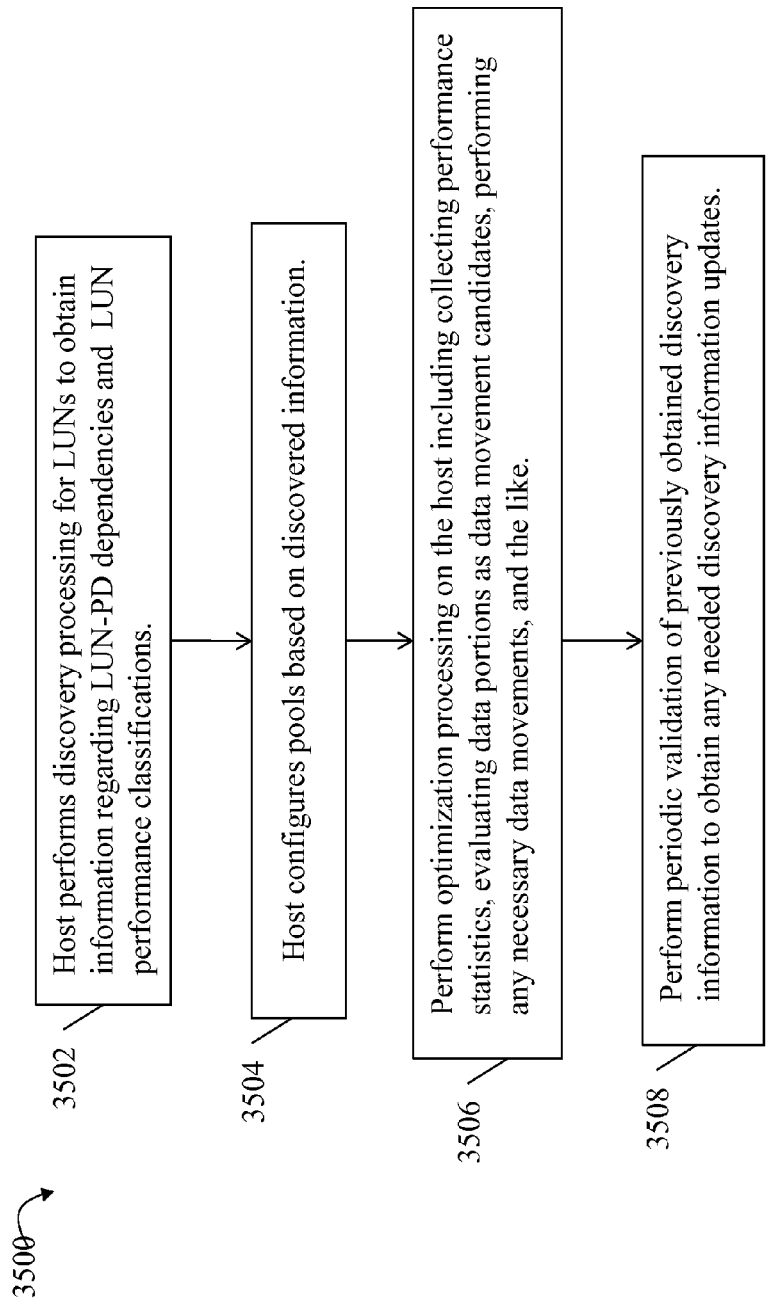

Referring to FIG. 29C, shown is a flowchart of processing steps as may be performed on a host in an embodiment in accordance with techniques herein. The flowchart 3500 generally summarizes processing as may be performed on a host having an optimizer that performs automated discovery processing in addition to data storage optimizations as described herein. In step 3502, the host performs discovery processing for LUNs to obtain discovery information including LUN-PD dependencies and assign each LUN a performance classification. At step 3504, the host may configure pools based on the discovered information. In step 3506, the host may perform optimization processing. As described elsewhere herein, step 3506 may include collecting performance statistics for the data portions stored in different LUNs of one or more data storage systems, evaluating data portions as data movement candidates, performing any necessary data movements, and the like. Step 3506 may be performed in an ongoing manner to dynamically respond to changes in system workload. In step 3508, the host may perform periodic validation of previously obtained discovery information and obtain any needed discovery information updates (e.g., reassign a new performance classification to a LUN as the underlying PDs configured to store the LUNs data may be changed or replaced, add information for any new LUNs or new data storage systems, remove information for any deleted LUNs, and the like).

What will now be described are additional exemplary uses of where an optimizer may be located where the optimizer may perform techniques described herein for discovery and/or data storage optimizations. With reference, for example, back to FIG. 20, one exemplary embodiment is illustrated where the optimizer 1504 is located on the host and performs such automated discovery of PD dependencies among LUNs and also for LUN performance classification. There may be other system arrangements and component configurations where an optimizer 1504 performs the automated discovery techniques and processing, data movement optimizations, and the like, as described herein. In such arrangements, the optimizer may reside on a data storage system or data storage system appliance but may perform such processing to discover information about one or more other data storage systems (e.g., PDs which are external with respect to the appliance, data storage system, or other component upon which the optimizer is executing).

Figure 30:
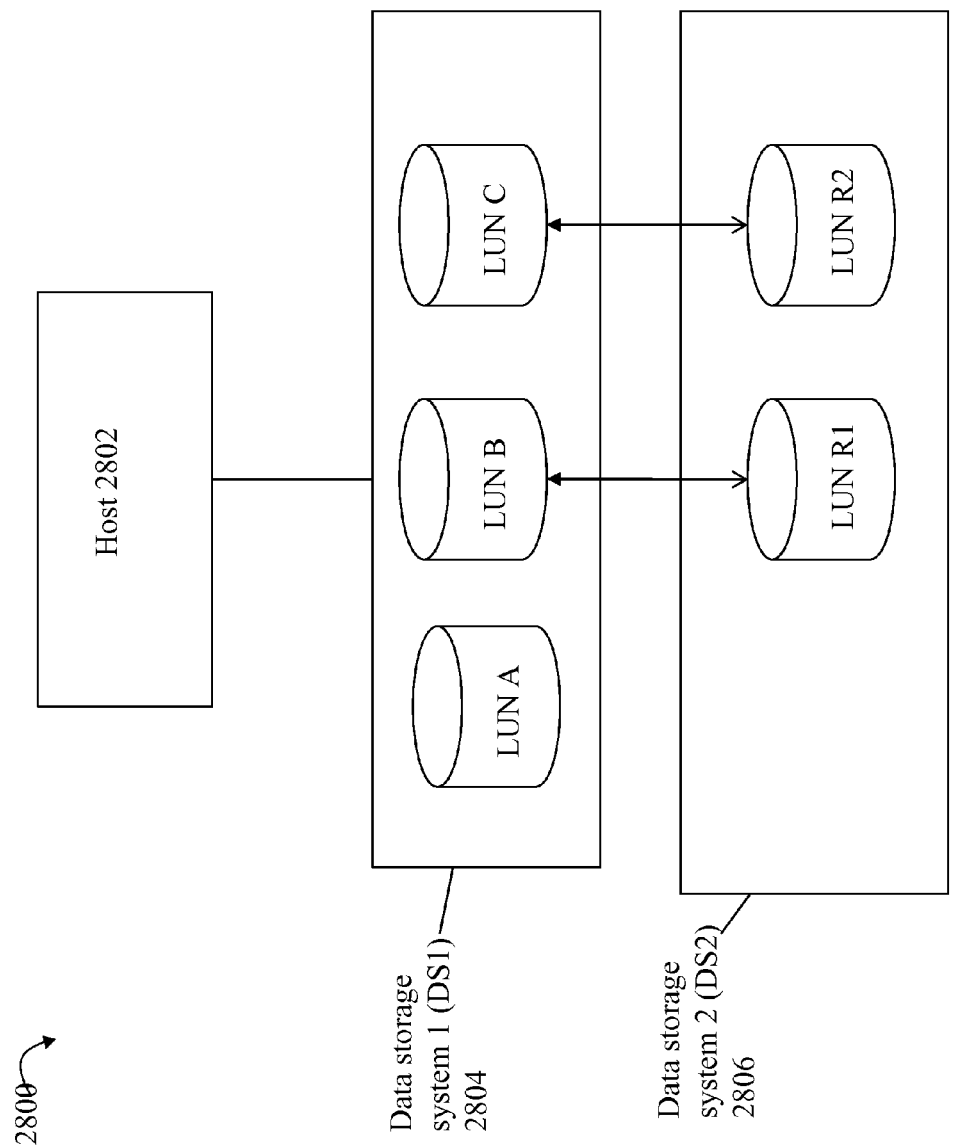
FIGS. 30 and 31 are examples of additional embodiments in accordance with techniques herein.

Referring to FIG. 30, shown is an example of an embodiment in accordance with techniques herein. The example 2800 includes a host 2802, data storage system 1 (DS1) 2804 and data storage system 2 (DS2) 2806. DS1 2806 may provide for presenting to the host 2802 storage on both DS1 and DS2. LUNs A, B and C may be presented as devices of DS1 where LUN A may have underlying storage provisioned on DS1 and LUNs B and C may have underlying storage provisioned on DS2. For example, as illustrated, DS1 may map LUNs B and C (presented to the host as devices of DS1) to LUNs R1 and R2, respectively, of DS2.

DS1 may utilize one or more components providing a "virtualized backend" to DS2 such as, for example, where a DA of DS1 communicates with an FA of DS2 to access LUNs R1 and R2 of DS2. In connection with SCSI terminology, a port of a DA of DS1 may be an initiator and a port of an FA of DS2 may be a target forming a path over which DS1 may access a LUN of DS2 (e.g., access one of the LUNs R1, R2). Thus, the example 1000 is an illustration whereby the host 1002 communicates directly with DS1 1004 issuing commands and operations to LUNs A-C. Host 2802 is provided access to storage and devices of DS2 only indirectly through DS1. As such, DS1 may want to know about any existing PD dependencies and storage tier classifications regarding the underlying PD storage from which LUNs R1 and R2 of DS2 are provisioned in connection with providing data services, performing data storage optimizations such as in connection with data movement as described elsewhere herein, and the like. Information regarding the configuration of LUNs R1 and R2 of DS2 may not be available to DS1 (e.g. DS1 may not be provided with information regarding the PD dependencies, if any, between LUNs R1 and R2, and may not be provided with information regarding the storage tier classification of the underlying PDs from which storage is configured for storing data of LUNs R1 and R2). Since such information is not provided to DS1, an embodiment may utilize the techniques herein to discover such information regarding the LUNs of DS2. The techniques herein may be performed by executing code on DS1 to determine such PD dependencies and performance classifications or storage tiers of underlying PDs providing storage for LUNs R1 and R2. The foregoing information may be used as described elsewhere herein in connection with optimizations whereby an optimizer of DS1 does data movement and placement of LUN data of LUNs A-C. For example, DS1 may control movement and placement of data for LUNs B and C on selected ones of LUNs R1, R2 of DS2 based on particular storage tier classifications of PD groups for LUNs R1 and R2. For example, LUN R1 of DS2 may be classified as having its data stored on a first group of PDs which are EFDs and LUN R2 may be classified as having its data stored on a second group of PDs which are rotating FC disk drives. At a first point in time, DS1 may store data of LUN B which is frequently accessed by the host on LUN R1 and may store data of LUN C which is much less frequently accessed by the host on LUN R2 as illustrated in the example 2800. At a second point in time, the optimizer may determine that the data of LUN B is now much less frequently accessed than the data of LUN C and may relocate or move data of LUN B to LUN R2 and may move data of LUN C to LUN R1. Thus, DS1 may address each LUN of DS2 in a manner similar to one of its own PDs for placement and data movement optimizations.

It should be noted that the foregoing example describes performing data movement and placement with reference to an entire LUN. However, as described elsewhere herein and also appreciated by those skilled in the art, such data movement and placement may be performed with respect to varying and different levels of storage granularity rather than per LUN. For example, the foregoing may be used in connection with data movement and placement for a portion of a LUN such as LUN B whereby a first very active portion of LUN B may have its data stored on LUN R1 and a second much less active portion of LUN B may have its data stored on LUN R2 and yet a third portion of LUN B may have its data stored on PDs of DS1. DS1 may then perform processing to appropriately and suitably move such data portions as workload and activity for each such portion may change over time.

Figure 31:
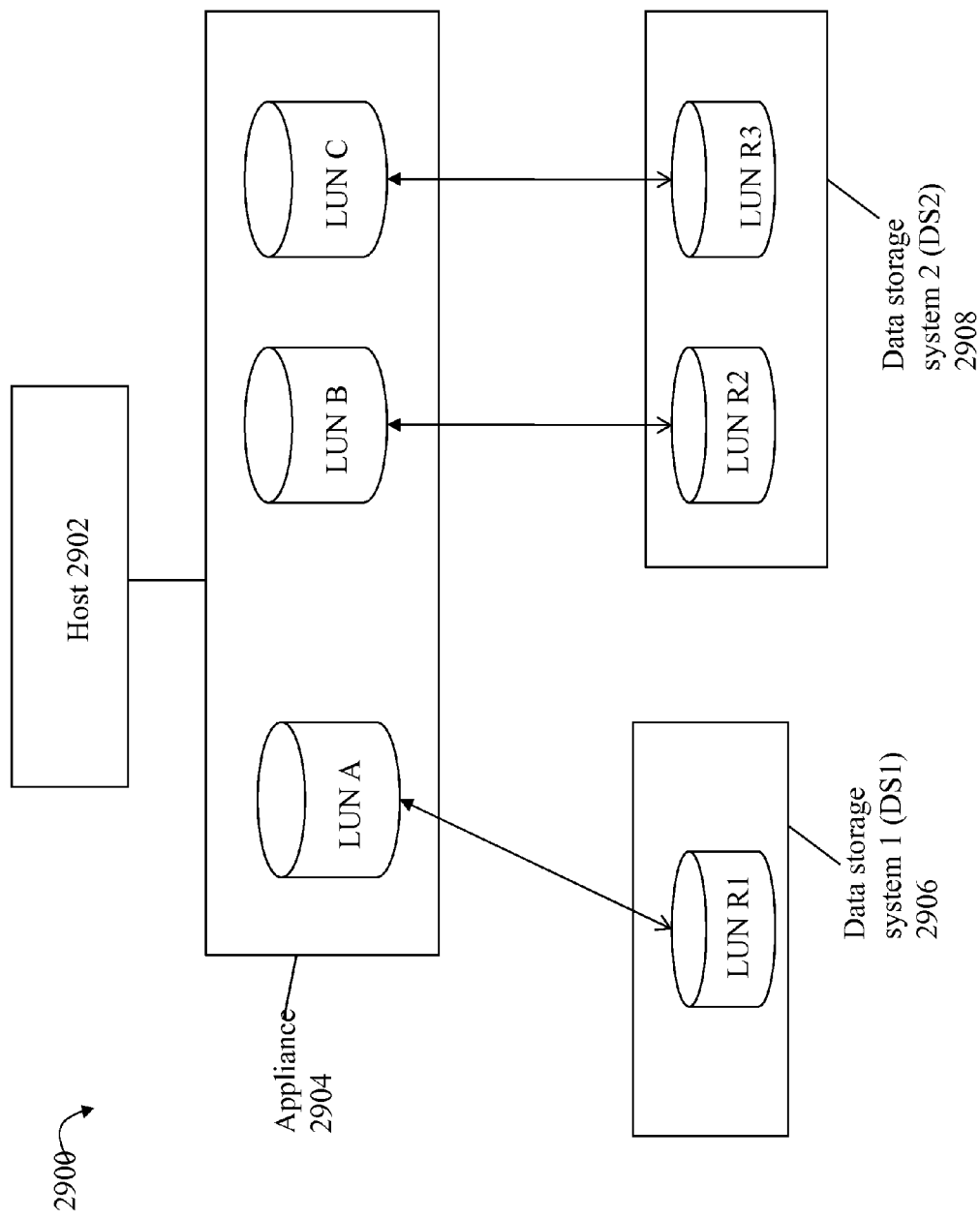

With reference now to FIG. 31, shown is another example of another embodiment that may utilize the techniques herein. The example 2900 includes a host 2902, appliance 2904 and DS1 2906 and DS2 2908. The appliance 2904 may be a data storage virtualization appliance such as an EMC® VPLEX™ appliance which accesses and aggregates storage from multiple data storage systems DS1 and DS2 whereby each such data storage system may be of the same or different types (e.g., same or different manufacturers as well as different array types that may be from a same manufacturer). In this manner, the appliance 2904 may present storage of DS1 and DS2 in an aggregated virtualized environment to the host 2902 and other clients. The host 2902 communicates with the appliance 2904 to access data on any one of the virtualized storage devices LUNs A-C exposed to the client and each such virtualized storage device of the appliance may be mapped to one or more other LUNs R1-R3 of one or more other data storage systems such as DS1 2906 and DS2 2908. To illustrate, the appliance 2904 may expose or present to the host LUNs A-C. As such, the appliance 2904 may want to know about any existing PD dependencies and storage tier classifications regarding the underlying PD storage from which LUNs R1, R2, and R3 are provisioned in connection with providing data services, performing optimizations such as data movement as described elsewhere herein, and the like. Such information regarding the configuration and performance classification of LUNs R1, R2 and R3 may not be available to the appliance 2904 (e.g. the appliance may not be provided with information regarding the PD dependencies, if any, between LUNs R2 and R3, regarding the storage tier classification of the underlying PDs from which storage is configured for storing data of LUNs R1, R2, and R3). Since such information is not provided to the appliance, an embodiment may utilize the techniques herein to discover such information regarding the LUNs R1-R3 of DS1 and DS2. The techniques herein may be performed by executing code on the appliance to determine such PD dependencies and storage classifications of underlying PDs providing storage for LUNs R1, R2 and R3. The foregoing information may be used as described elsewhere herein in connection with optimizations whereby an optimizer of the appliance may perform data movement of LUN data of LUNs A-C. For example, the appliance may at a first point in time map LUN A, or a portion thereof, to LUN R1 of DS1 determined to have its data stored on PDs of the EFD storage tier. Such mapping may be performed when the host is frequently accessing LUN A's data (e.g., when LUN A, or portion thereof, has a high workload and the optimizer determines to place such a highly active portion of data on the highest EFD storage tier). At a later point in time, assume the workload to LUN A, or the portion thereof, mapped to the LUN R1 of DS1 greatly decreases. The appliance may now determine that LUN A, or the portion thereof, has its data relocated or moved from the EFD storage tier of LUN R1 to LUN R2 of DS2 (whereby LUN R2 is determined to be of a lower performing tier than EFD (e.g., LUN R2 may be classified as having underlying PDs which are FC or SATA rotational disk drives rather than EFD drives).

It should be noted that an embodiment may perform processing to obtain the characteristic curves, RTs, and the like, for the particular environment and configuration in which techniques herein may be utilized. For example, if the techniques herein are executed on a host where the host is performing the processing to compare obtained RT to a set of baseline RTs for the LUNs of the data storage system, then the RTs used as the baseline should be those expected by the host (e.g. may include a time factor due to the communications with the data storage system hosting the LUNs). Similarly, with reference to the embodiments of FIGS. 30 and 31, if the techniques herein are executed on an appliance or data storage system, the set of baseline RTs should be those expected for the particular arrangement and configuration.

The techniques herein may be used in an embodiment where the optimizations such data movements are performed external with respect to the data storage system subject to data movement. Performing such techniques on a host or other component other than the data storage systems being managed provides for a global view whereby the data movement optimizations may be performed viewing multiple data storage systems as a single entity for data movement where the source may be any device location in the single entity or aggregated view, and the target may be any device location in the single entity or aggregated view (e.g. may perform data movement optimizations within a single or same DS and/or across or between different DSs within a data center).

As described above, an embodiment in accordance with techniques herein may perform any one or more of the above-mentioned techniques alone, or in combination with others. For example, an embodiment may use the techniques for data storage optimizations described herein such as to evaluate which data portions are subject to data movements in connection with storage on one or more data storage systems where the optimizer performing such optimizations is located on a host, or more generally, any component external from the data storage system(s) to which the optimizations are being applied. In some embodiments, the data storage systems may be further characterized as different unitary storage systems, and the data storage movements and evaluation of candidate data portions for such data movements may be include performing such optimizations spanning multiple physical data storage systems, such as data storage arrays. The different physical data storage systems to which the data movement optimization may be applied may be heterogeneous such as from different data storage vendors, having different PD technologies and performance classifications, and the like. As also described herein, an embodiment may have such an external component include code which performs the optimizations described herein in combination with other techniques for determining LUN-PD dependency and/or LUN performance classification through observed response times (e.g., where the external component may be characterized as external with respect to the data storage systems to which such techniques are applied).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for discovering physical device dependencies between logical devices comprising:
   receiving, for a plurality of logical devices of a data storage system, a set of baseline response times obtained when issuing data operations to the plurality of logical devices, each of said plurality of logical devices having storage provisioned on one or more physical devices;
   selecting a first of the plurality of logical devices, wherein a remaining set of logical devices includes each of the plurality of logical devices other than the first logical device;
   issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device;
   receiving a set of observed response times for the remaining set of logical devices;
   determining, for each logical device of the remaining set of logical devices, whether said each logical device has a corresponding one of the observed response times of the set that is significantly more than a corresponding one of the baseline response times for said each logical device; and
   determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device.

2. The method of claim 1, wherein each logical device of the first logical device set has at least a portion of data stored on a physical device of a same physical device group of one or more physical devices.

3. The method of claim 2, wherein each logical device of the first logical device set other than the first logical device has at least some data stored on a same physical device as at least some data of the first logical device.

4. The method of claim 1, wherein said set of observed response times are obtained using data collected while performing said issuing data operations to the first logical device and while also performing said issuing data operations to each logical device in the remaining set.

5. The method of claim 1, wherein said issuing data operations to each logical device of the remaining set issues data operations to said each logical device of the remaining set at about a same rate as when a corresponding one of the baseline response times is obtained for said each logical device.

6. The method of claim 1, wherein the set of observed response times is an adjusted set of observed response times determined by adjusting an original set of observed response times using the set of baseline response times.

7. The method of claim 1, wherein said first rate is higher than a rate at which data operations are issued to the first logical device in obtaining the set of baseline response times.

8. The method of claim 1, wherein said set of baseline response times are obtained by maintaining a same average queue depth for each of the plurality of logical devices.

9. The method of claim 8, wherein said average queue depth for said each logical device represents an average number of I/O operations outstanding for said each logical device.

10. The method of claim 9, wherein said average queue depth maintained for each of the plurality of logical devices in obtaining the set of baseline response times is a first average queue depth and said issuing data operations to each logical device of the remaining set is at about a same rate as when a corresponding one of the baseline response times is obtained for said each logical device.

11. The method of claim 10, wherein said first rate is determined in accordance with maintaining a second average queue depth for the first logical device, the second average queue depth being larger than said first average queue depth.

12. The method of claim 11, wherein said first average queue depth is equal to or less than 1 and said second average queue depth is 32.

13. The method of claim 1, wherein each logical device of the first logical device set has a corresponding observed response time that is greater than a corresponding one of the baseline response times for said each logical device by a threshold amount determined in accordance with a threshold factor and the corresponding one baseline response time for said each logical device.

14. The method of claim 13, wherein the threshold factor is any of one and a half or twice the corresponding one baseline response time for said each logical device thereby resulting in a varying threshold amount for each of the plurality of logical devices, wherein each logical device of the first logical device set has a corresponding observed response time that is greater than a corresponding one of the baseline response times for said each logical device by an amount, said amount being at least the threshold factor multiplied by the corresponding one baseline response time for said each logical device.

15. The method of claim 1, wherein logical devices of the first logical device set have data stored on a first physical device group of one or more physical devices and the method further comprising:
    determining a set of one or more aggregated response times for said first physical device group using response times for the first logical device set; and
    classifying said one or more physical devices of the first physical device group as being physical devices of a first of a plurality of storage device tiers, said classifying using information including the set of one or more aggregated response times in comparison to expected response times for physical devices of each of the plurality of storage tiers.

16. The method of claim 1, wherein the method is executed on any of a host to determine information about a data storage system, a first data storage system to determine information about the plurality of logical devices included in a second data storage system, and an appliance presenting to a client a set of virtualized storage devices having storage provisioned across a plurality of physical devices on one or more data storage systems.

17. The method of claim 1, wherein a current set of logical devices is determined by removing the first logical device set from the plurality of logical devices, and the method includes performing said selecting, said issuing data operations, said receiving, said first determining and said second determining with respect to the current set of logical devices rather than the plurality of logical devices.

18. A non-transitory computer readable medium comprising code stored thereon for discovering physical device dependencies between logical devices, the non-transitory computer readable medium comprising code stored thereon that, when executed by a processor, performs a method comprising:
    receiving, for a plurality of logical devices of a data storage system, a set of baseline response times obtained when issuing data operations to the plurality of logical devices, each of said plurality of logical devices having storage provisioned on one or more physical devices;
    selecting a first of the plurality of logical devices, wherein a remaining set of logical devices includes each of the plurality of logical devices other than the first logical device;
    issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device;
    receiving a set of observed response times for the remaining set of logical devices;
    determining, for each logical device of the remaining set of logical devices, whether said each logical device has a corresponding one of the observed response times of the set that is significantly more than a corresponding one of the baseline response times for said each logical device; and
    determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device.

19. The non-transitory computer readable medium of claim 18, wherein each logical device of the first logical device set has at least a portion of data stored on a physical device of a same physical device group of one or more physical devices.

20. A system comprising:
    a set of one or more data storage systems; and
    a first component in communication with the one or more data storage systems, the first component including a computer readable medium comprising code stored thereon that, when executed by a processor, performs a method comprising:
        receiving, for a plurality of logical devices of the one or more data storage systems, a set of baseline response times obtained when issuing data operations to the plurality of logical devices, each of said plurality of logical devices having storage provisioned on one or more physical devices;
        selecting a first of the plurality of logical devices, wherein a remaining set of logical devices includes each of the plurality of logical devices other than the first logical device;
        issuing data operations to the first logical device at a first rate while also issuing data operations to each logical device of the remaining set, wherein said first rate is sufficient to result in a first observed response time for the first logical device that is significantly more than a corresponding one of the baseline response times for the first logical device, and wherein said first rate is sufficient to result in an observed response time for each logical device of the remaining set having a portion of data stored on a same physical device as a portion of data of the first logical device whereby the observed response time for said each logical device of the remaining set is significantly more than a corresponding one of the baseline response times for said each logical device;
        receiving a set of observed response times for the remaining set of logical devices;
        determining, for each logical device of the remaining set of logical devices, whether said each logical device has a corresponding one of the observed response times of the set that is significantly more than a corresponding one of the baseline response times for said each logical device; and determining a first logical device set of one or more logical devices having physical device dependencies, said first logical device set including the first logical device and each logical device of the remaining set determined to have a corresponding observed response time of the set of observed response times that is significantly greater than a corresponding one of the baseline response times for said each logical device.

\* \* \* \* \*